United States Patent
Tewari

(10) Patent No.: US 11,849,745 B2
(45) Date of Patent: Dec. 26, 2023

(54) METHOD AND APPARATUS FOR EXTENDING SHELF-LIFE OF MEAT AND POULTRY

(71) Applicant: Gaurav Tewari, Richmond Hill (CA)

(72) Inventor: Gaurav Tewari, Richmond Hill (CA)

( * ) Notice: Subject to any disclaimer, the term of this patent is extended or adjusted under 35 U.S.C. 154(b) by 462 days.

(21) Appl. No.: 16/821,649

(22) Filed: Mar. 17, 2020

(65) Prior Publication Data

US 2020/0315220 A1 Oct. 8, 2020

(51) Int. Cl.
| | | |
|---|---|---|
| *A23L 3/3436* | (2006.01) | |
| *A23B 4/16* | (2006.01) | |
| *A23B 4/24* | (2006.01) | |
| *A23B 4/20* | (2006.01) | |
| *B65D 81/26* | (2006.01) | |
| *B01D 53/02* | (2006.01) | |
| *B65B 31/02* | (2006.01) | |

(52) U.S. Cl.
CPC ............. *A23L 3/3436* (2013.01); *A23B 4/16* (2013.01); *A23B 4/20* (2013.01); *A23B 4/24* (2013.01); *B01D 53/02* (2013.01); *B65B 31/024* (2013.01); *B65D 81/266* (2013.01); *A23V 2002/00* (2013.01); *B01D 2253/102* (2013.01); *B01D 2253/108* (2013.01)

(58) Field of Classification Search
CPC ... A23L 3/3436; A23L 3/3445; B65D 81/266; B65D 31/024
See application file for complete search history.

(56) References Cited

U.S. PATENT DOCUMENTS

| | | | | |
|---|---|---|---|---|
| 3,968,629 | A * | 7/1976 | Gidewall | B65B 25/067 53/374.8 |
| 6,269,946 | B1 * | 8/2001 | Colombo | A23L 3/3418 206/213.1 |
| 2001/0018480 | A1 * | 8/2001 | Chiang | B01D 53/04 428/327 |
| 2007/0014947 | A1 * | 1/2007 | Mengel | A23L 5/41 428/34.1 |
| 2007/0082570 | A1 * | 4/2007 | Boehmer | D04H 1/43835 442/361 |

OTHER PUBLICATIONS

Tendring Physical Testing, "Gurley Standard Densometers" pp. 1-7 printed Jun. 8, 2021 https://tendringphysicaltesting.com/product/gurley-standard-densometers/ (Year: 2021).*

* cited by examiner

*Primary Examiner* — Donald R Spamer
*Assistant Examiner* — Philip A Dubois
(74) *Attorney, Agent, or Firm* — Chen-Chi Lin

(57) ABSTRACT

A meat-packaging procedure and a machine for packaging meat cuts for long-term storage is operated at temperatures of between 28° and 42° F. The process includes sealing meat cuts or full poultry birds or bird pieces within a master bag containing (i) oxygen scavenger materials capable of reducing the residual oxygen content of the atmosphere within the bag to 0 ppm within 96 hours of sealing, and (ii) a CO2 generator capable to generate CO2 in the amount of at least 100 mL per pound of meat or poultry within 7 days of sealing. Gas is injected into the master bag to form a CO2-rich storage environment of at least 50% CO2. For meat trays containing meat with poor color stability, oxygen scavengers are preferably placed within the meat trays. For cuts with good color stability, the oxygen scavengers may be placed outside the meat trays.

12 Claims, 26 Drawing Sheets

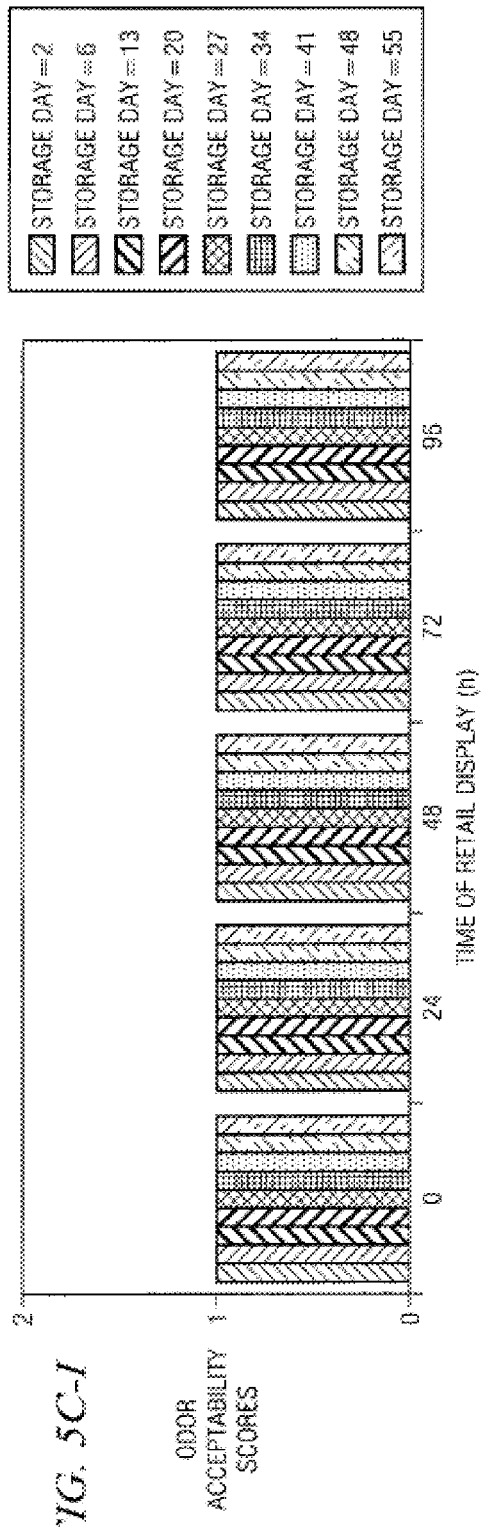
FIG. 5C-I
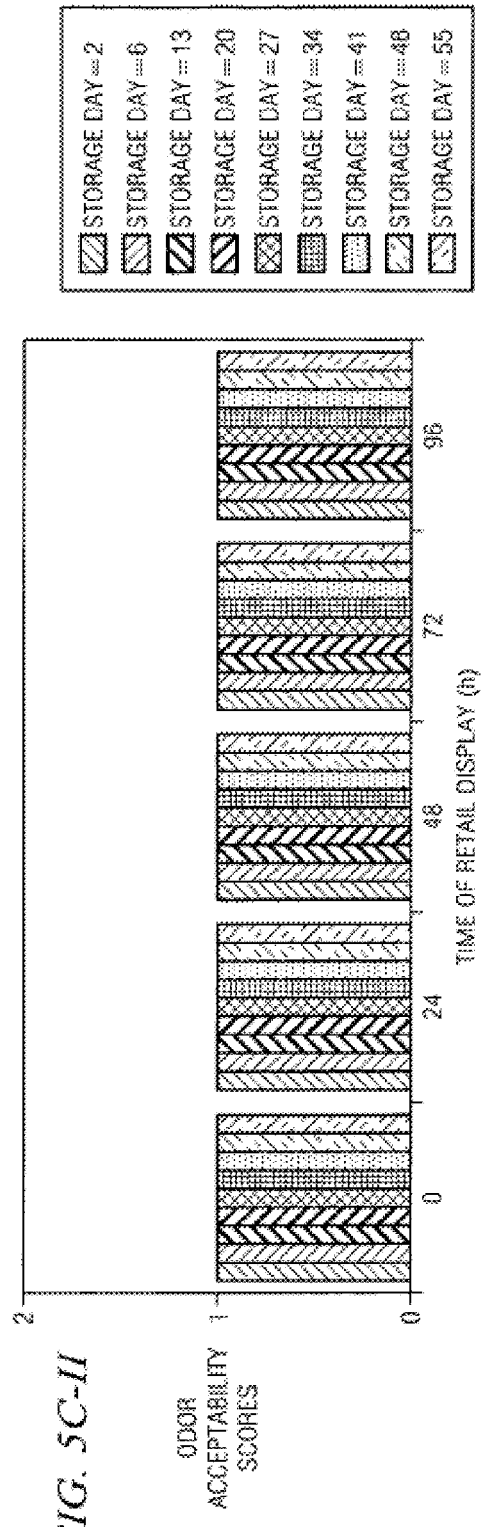
FIG. 5C-II

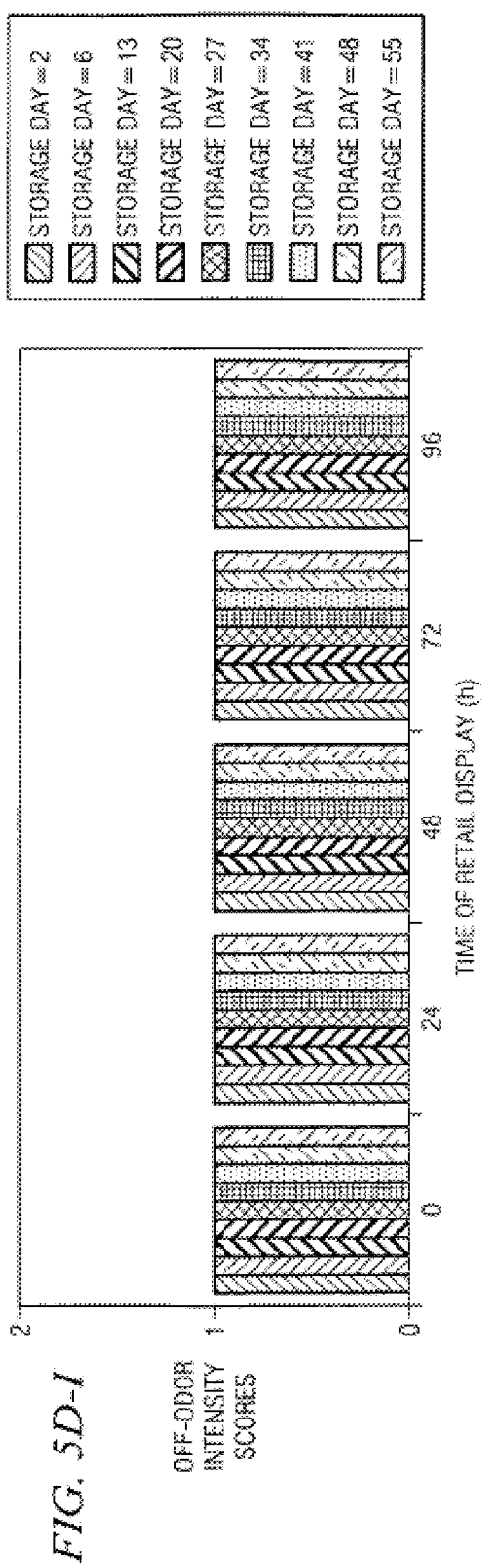
FIG. 5D-I
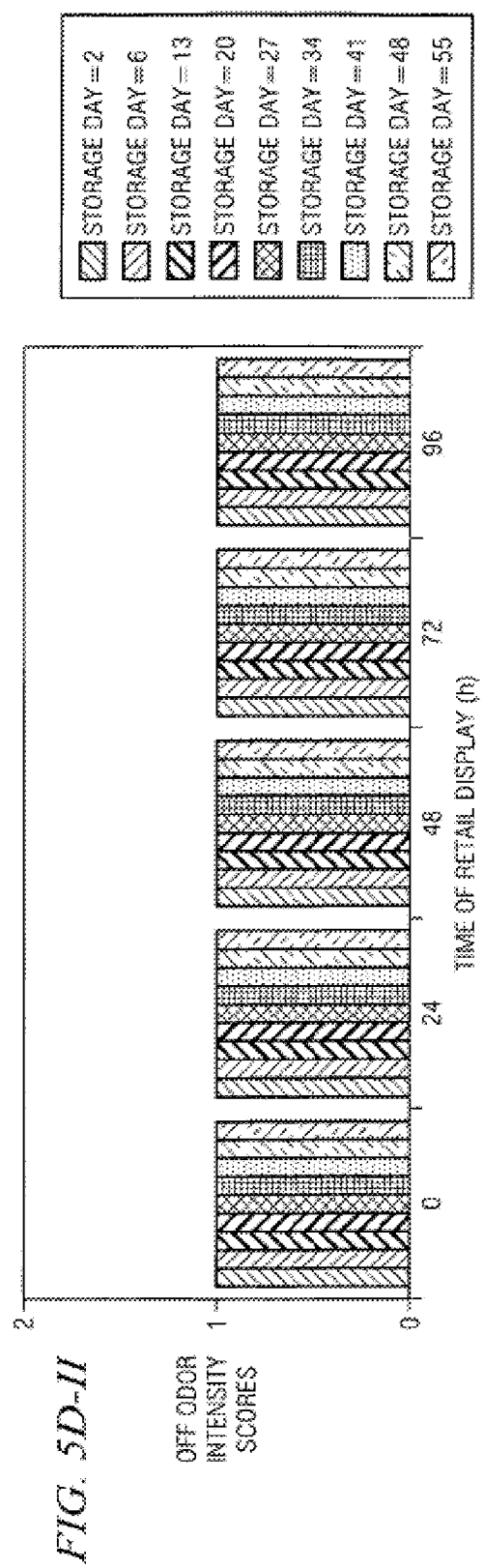
FIG. 5D-II

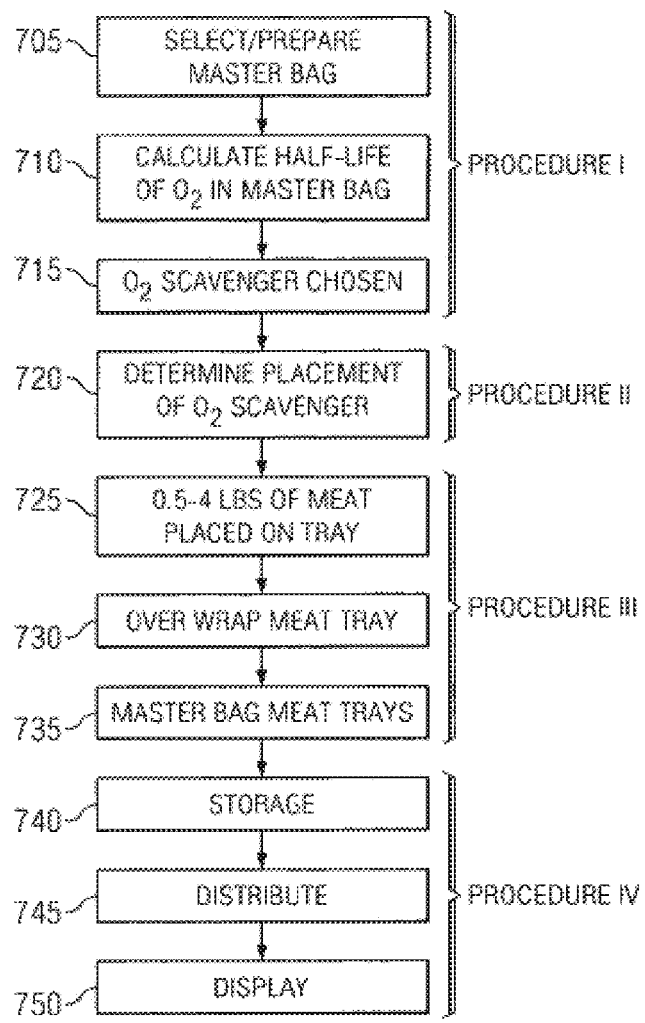
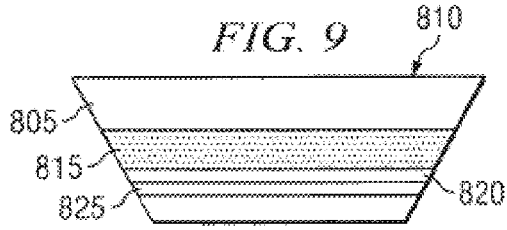

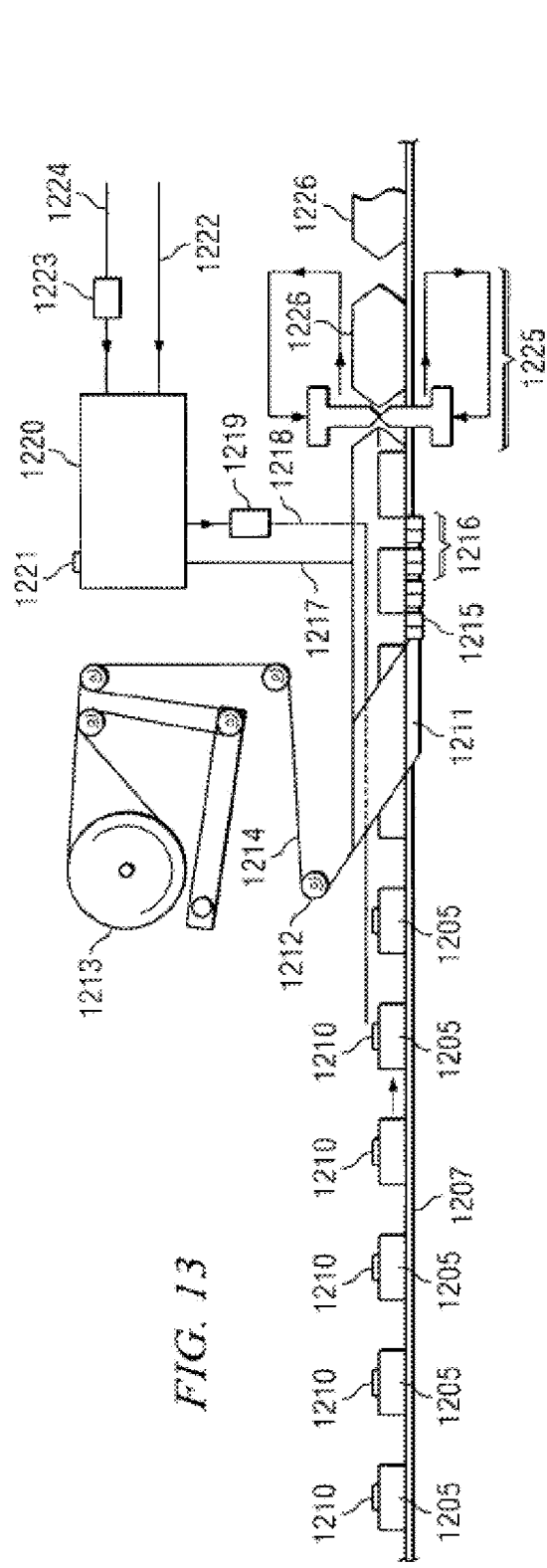

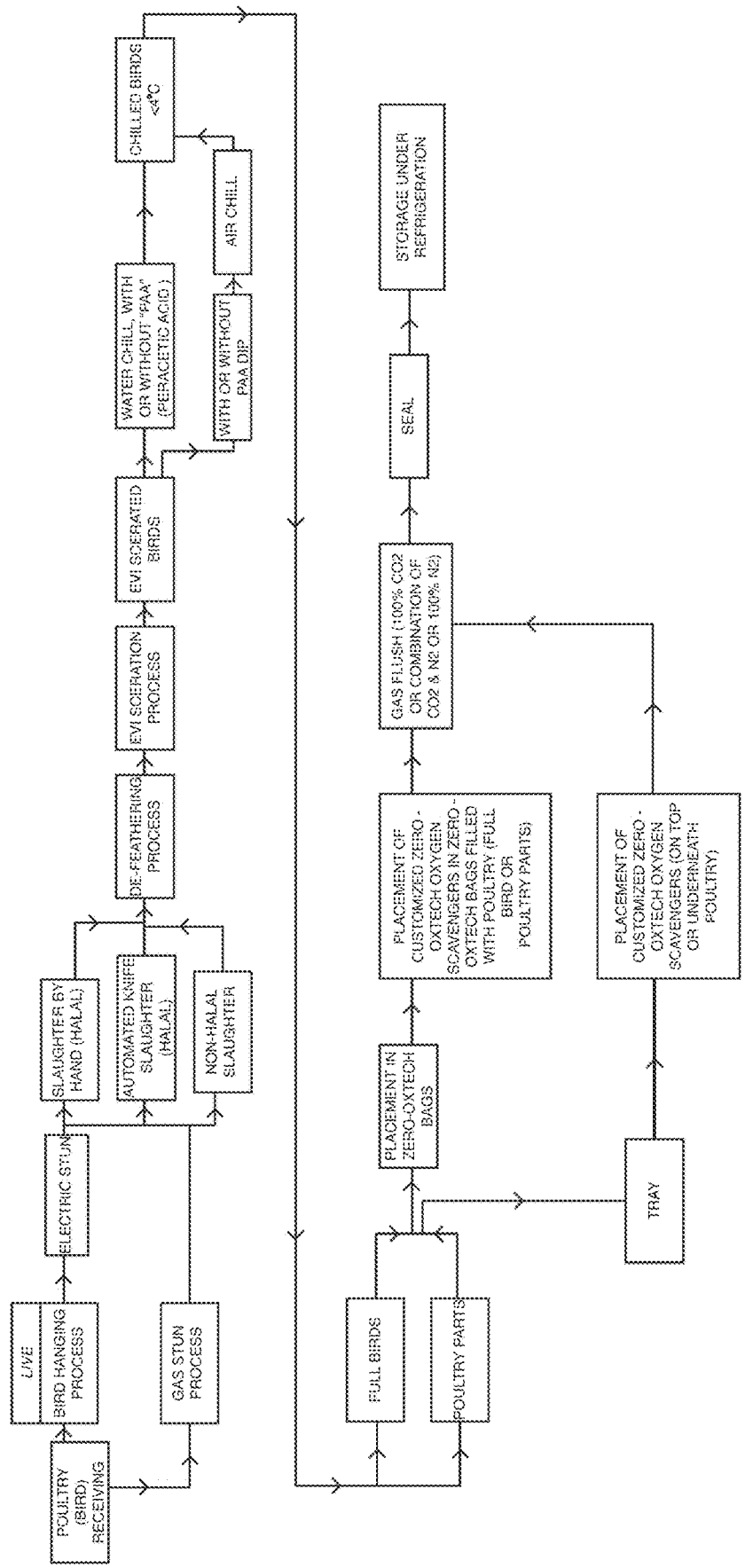
FIG. 14 SHELF LIFE EXTENSION PROCESS - OPERATION OF POULTRY USING "ZERO-OXTECH" PROCESS

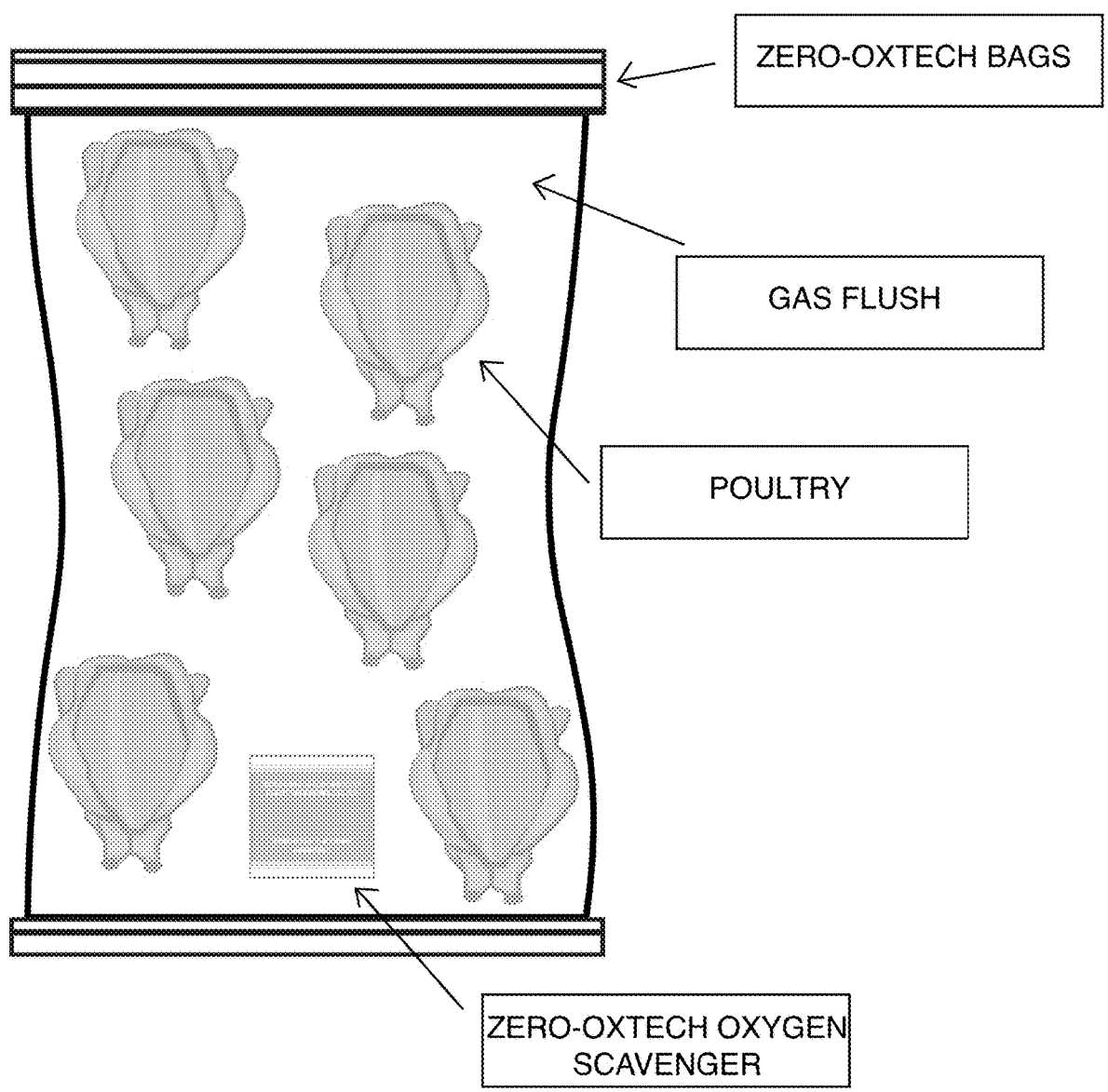
FIG. 15 ZERO-OXTECH BAGS WITH POULTRY

FIG. 16 POULTRY TRAY USING ZERO-OXTECH PROCESS
(A)
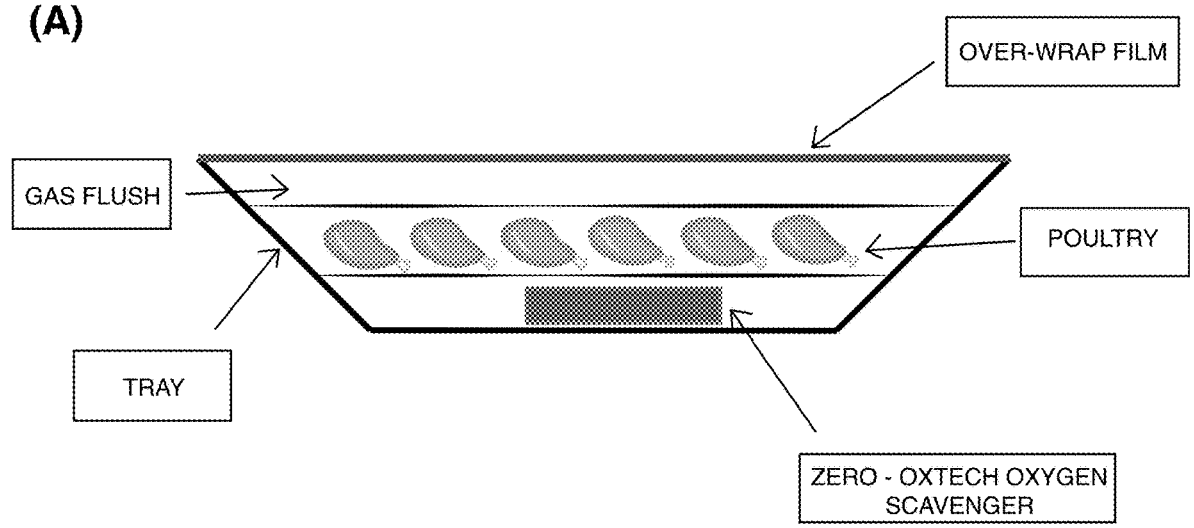
(B)
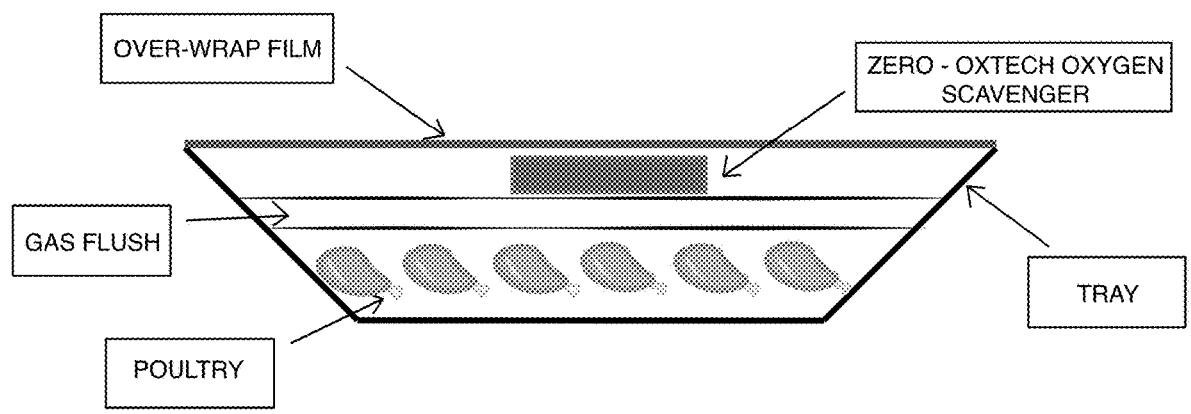

Figure 17: Shelf-life data for PAA [Peracetic Acid]-treated poultry using Tewari's Zero-OxTech® process [Bag application].

| Product | Package-Type | Sample day | Sample# | Product Temp/°C | O₂ concentration [%] | O₂ concentration [%]: Zero-OxTech Bag | O₂ concentration [%]: Zero-OxTech Bag and Zero-OxTech scavengers | CO₂ concentration [%] | CO₂ concentration [%]: Zero-OxTech bag | CO₂ concentration [%]: Zero-OxTech Bag with Zero-OxTech scavengers | Organoleptic Test: control | Organoleptic Test: Zero-OxTech bag | Organoleptic Test: Zero-OxTech bag with Zero-OxTech scavengers | SPC: control | SPC: Zero-OxTech Bag | SPC: Zero-OxTech Bag with Zero-OxTech Scavengers | E.coli: control | E.coli: Zero-OxTech bag | E.coli: Zero-OxTech bag with Zero-OxTech Scavengers |
|---|---|---|---|---|---|---|---|---|---|---|---|---|---|---|---|---|---|---|---|
| Boneless legs | Bag | 2 | 1 | 3.8 | 8.5 | | 11.2 | 0 | 82.4 | 45 | 58 Normal | Normal | Normal | 20000 | 15000 | 10000 | 10 | 10 | 10 |
| Boneless legs | Bag | 2 | 2 | 3.4 | 15.4 | | 11.9 | 0.4 | 34.8 | 41 | 65 Normal | Normal | Normal | 15000 | 25000 | 20000 | 10 | 10 | 10 |
| Boneless legs | Bag | 9 | 1 | 3.6 | 7.9 | | 17.7 | 0 | 5 | 9.3 | 95 off-odor | Normal | Normal | 300000 | 50000 | 30000 | 10 | 10 | 10 |
| Boneless legs | Bag | 9 | 2 | 3.3 | 20.5 | | 18.4 | 0 | 3.4 | 6.9 | 86 off-odor | Normal | Normal | 410000 | 100000 | 50000 | 10 | 10 | 10 |
| Boneless legs | Bag | 14 | 1 | 3.5 | 15.4 | | 11.4 | 0 | 3.4 | 35.5 | 88 Spoilage | Normal | Normal | 500000 | 60000 | 100000 | 30 | 10 | 10 |
| Boneless legs | Bag | 14 | 2 | 3.2 | 18.4 | | 12.6 | 0 | 0.6 | 25.2 | 78 Spoilage | Normal | Normal | 580000 | 150000 | 150000 | 40 | 10 | 10 |
| Boneless legs | Bag | 16 | 1 | 2.4 | 12.3 | | 11.9 | 0 | 5.3 | 33.6 | 65 Spoilage | Normal | Normal | 650000 | 300000 | 180000 | 20 | 10 | 10 |
| Boneless legs | Bag | 16 | 2 | 2.2 | 14.1 | | 7.4 | 0 | 6.5 | 56.2 | 83 Spoilage | Normal | Normal | 800000 | 350000 | 200000 | 30 | 10 | 10 |
| Boneless legs | Bag | 20 | 1 | 2 | 4.6 | | 2.8 | 0 | 5.8 | 75.3 | 74 Spoilage | Normal | Normal | 1000000 | 500000 | 300000 | 40 | 10 | 10 |
| Boneless legs | Bag | 20 | 2 | 2.1 | 6.2 | | 8.5 | 0 | 7.2 | 68.5 | 73 Spoilage | Normal | Normal | 1200000 | 600000 | 400000 | 50 | 10 | 10 |

Figure 18: Shelf-life data for PAA [Peracetic Acid]-treated poultry using Tewari's Zero-OxTech® process [MAP TRAY application].

| Product | Package Type | Sample day | Sample # | Product Temp °C | O2 concentration [%] | O2 concentration [%]: Zero-OxTech MAP TRAY [UNDERNEATH LOADING OF ZERO-OXTECH OXYGEN SCAVENGERS] | O2 concentration [%]: Zero-OxTech MAP TRAY [TOP LOADING OF ZERO-OXTECH OXYGEN SCAVENGERS] | CO2 concentration [%] | CO2 concentration [%]: Zero-OxTech MAP TRAY [UNDERNEATH LOADING OF ZERO-OXTECH OXYGEN SCAVENGERS] | CO2 concentration [%]: Zero-OxTech MAP TRAY [TOP LOADING OF ZERO-OXTECH OXYGEN SCAVENGERS] | Organoleptic Test: control | Organoleptic Test: Zero-OxTech MAP TRAY [UNDERNEATH LOADING OF ZERO-OXTECH OXYGEN SCAVENGERS] | Organoleptic Test: Zero-OxTech MAP TRAY [TOP LOADING OF ZERO-OXTECH OXYGEN SCAVENGERS] | SPC: control | SPC: Zero-OxTech MAP TRAY [UNDERNEATH LOADING OF ZERO-OXTECH OXYGEN SCAVENGERS] | SPC: Zero-OxTech MAP TRAY [TOP LOADING OF ZERO-OXTECH OXYGEN SCAVENGERS] | Ecoli: control | Ecoli: Zero-OxTech MAP TRAY [UNDERNEATH LOADING OF ZERO-OXTECH OXYGEN SCAVENGERS] | Ecoli: Zero-OxTech MAP TRAY [TOP LOADING OF ZERO-OXTECH OXYGEN SCAVENGERS] |
|---|---|---|---|---|---|---|---|---|---|---|---|---|---|---|---|---|---|---|---|
| Boneless skinless legs | MAP TRAY | 1 | 1 | 3.8 | 2 | 0 | 0 | 15.2 | 8.5 | 5.1 Normal | Normal | Normal | 50000 | 40000 | 35000 | 10 | 10 | 10 |
| Boneless skinless legs | MAP TRAY | 1 | 2 | 3.4 | 2.1 | 0 | 0 | 15.2 | 7.5 | 4.5 Normal | Normal | Normal | 45000 | 45000 | 40000 | 10 | 10 | 10 |
| Boneless skinless legs | MAP TRAY | 10 | 1 | 1.4 | 1.7 | 0 | 0 | 16.7 | 5.7 | 3.8 Off odor | Normal | Normal | 1000000 | 80000 | 70000 | 10 | 10 | 10 |
| Boneless skinless legs | MAP TRAY | 10 | 2 | 1.8 | 1.8 | 0 | 0 | 15.8 | 5.1 | 3.9 Off odor | Normal | Normal | 900000 | 100000 | 60000 | 10 | 10 | 10 |
| Boneless skinless legs | MAP TRAY | 14 | 1 | 1.2 | 0.8 | 0 | 0 | 17.2 | 8.2 | 2.8 Spoilage | Normal | Normal | 1200000 | 500000 | 80000 | 10 | 10 | 10 |
| Boneless skinless legs | MAP TRAY | 14 | 2 | 1.1 | 1.2 | 0 | 0 | 16.8 | 7.8 | 3.2 Spoilage | Normal | Normal | 1500000 | 400000 | 100000 | 10 | 10 | 10 |
| Boneless skinless legs | MAP TRAY | 17 | 1 | 1.8 | 0.5 | 0 | 0 | 18.2 | 10.5 | 2.4 Spoilage | Normal | Normal | Not analyzed | 700000 | 200000 | Not analyzed | 10 | 10 |
| Boneless skinless legs | MAP TRAY | 17 | 2 | 2 | 1.3 | 0 | 0 | 18.6 | 11.2 | 1.8 Spoilage | Normal | Normal | Not analyzed | 800000 | 300000 | Not analyzed | 10 | 10 |
| Boneless skinless legs | MAP TRAY | 20 | 1 | 1.5 | 1.1 | 0 | 0 | 19.4 | 15.2 | 1.2 Spoilage | Spoilage | Normal | Not analyzed | 1500000 | 500000 | Not analyzed | 10 | 10 |
| Boneless skinless legs | MAP TRAY | 20 | 2 | 1.7 | 0.9 | 0 | 0 | 19.8 | 16.8 | 1.4 Spoilage | Spoilage | Normal | Not analyzed | 2000000 | 700000 | Not analyzed | 10 | 10 |

Figure 19: Shelf-life data for Non-PAA [Peracetic Acid]-treated poultry using Tewari's Zero-OxTech® process [MAP TRAY application].

| Produce | Package Type | Sample day | Sample# | Product Temp°C | O₂ concentration [%] | O₂ concentration [%]: Zero-OxTech MAP TRAY [UNDERNEATH LOADING OF ZERO-OXTECH OXYGEN SCAVENGERS] | O₂ concentration [%]: Zero-OxTech MAP TRAY [TOP LOADING OF ZERO-OXTECH OXYGEN SCAVENGERS] | CO₂ concentration [%] | CO₂ concentration [%]: Zero-OxTech MAP TRAY [UNDERNEATH LOADING OF ZERO-OXTECH OXYGEN SCAVENGERS] | CO₂ concentration [%]: Zero-OxTech MAP TRAY [TOP LOADING OF ZERO-OXTECH OXYGEN SCAVENGERS] | Organoleptic Test: control | Organoleptic Test: Zero-OxTech MAP TRAY [UNDERNEATH LOADING OF ZERO-OXTECH OXYGEN SCAVENGERS] | Organoleptic Test: Zero-OxTech MAP TRAY [TOP LOADING OF ZERO-OXTECH OXYGEN SCAVENGERS] | SPC control | SPC: Zero-OxTech MAP TRAY [UNDERNEATH LOADING OF ZERO-OXTECH OXYGEN SCAVENGERS] | SPC: Zero-OxTech MAP TRAY [TOP LOADING OF ZERO-OXTECH OXYGEN SCAVENGERS] | E.coli control | E.coli: Zero-OxTech MAP TRAY [UNDERNEATH LOADING OF ZERO-OXTECH OXYGEN SCAVENGERS] | E.coli: Zero-OxTech MAP TRAY [TOP LOADING OF ZERO-OXTECH OXYGEN SCAVENGERS] |
|---|---|---|---|---|---|---|---|---|---|---|---|---|---|---|---|---|---|---|---|
| Drum | TRAY MAP | 1 | 1 | 1 | 2.8 | 1.8 | 0 | 14.8 | 2.6 | 0 | 1.8 Normal | Normal | Normal | 50000 | 35000 | 30000 | 10 | 10 | 10 |
| Drum | TRAY MAP | 1 | 1 | 2 | 2.2 | 2 | 0 | 15.2 | 2.6 | 0 | 2 Normal | Normal | Normal | 45000 | 40000 | 40000 | 10 | 10 | 10 |
| Drum | TRAY MAP | 8 | 1 | 1 | 2 | 1.9 | 0 | 15.4 | 0.8 | 0 | 0.7 Normal | Normal | Normal | 1000000 | 70000 | 60000 | 10 | 10 | 10 |
| Drum | TRAY MAP | 8 | 2 | 2 | 1.8 | 1.5 | 0 | 15.6 | 1 | 0 | 1.2 Normal | Normal | Normal | 900000 | 80000 | 70000 | 10 | 10 | 10 |
| Drum | TRAY MAP | 11 | 1 | 1 | 2.2 | 1 | 0 | 13.8 | 1.8 | 0 | 1.8 Normal | Normal | Normal | 1200000 | 100000 | 80000 | 10 | 10 | 10 |
| Drum | TRAY MAP | 11 | 2 | 2 | 2.4 | 1.2 | 0 | 14.5 | 1.2 | 0 | 1.7 Normal | Normal | Normal | 1500000 | 150000 | 90000 | 10 | 10 | 10 |
| Drum | TRAY MAP | 14 | 1 | 1 | 2.8 | 0.5 | 0 | 16.5 | 1.8 | 0 | 1.6 Slight off odor | Normal | Normal | 1000000 | 300000 | 150000 | 10 | 10 | 10 |
| Drum | TRAY MAP | 14 | 2 | 2 | 2.2 | 1.6 | 0 | 16.2 | 0.5 | 0 | 1.8 Slight off odor | Normal | Normal | 1500000 | 350000 | 200000 | Not analyzed | 10 | 10 |
| Drum | TRAY MAP | 17 | 1 | 1 | 1.8 | 1.1 | 0 | 18.2 | 0.7 | 0 | 0.8 Spoilage | Normal | Normal | Not analyzed | 800000 | 600000 | Not analyzed | 10 | 10 |
| Drum | TRAY MAP | 17 | 2 | 2 | 1.9 | 0.9 | 0 | 18.8 | 1.1 | 0 | 0.9 Spoilage | Normal | Normal | Not analyzed | 1000000 | 800000 | Not analyzed | 10 | 10 |
| Drum | TRAY MAP | 20 | 1 | 1 | 2 | 1.8 | 0 | 18.2 | 0.8 | 0 | 1.1 Spoilage | Spoilage | Normal | Not analyzed | 900000 | 1000000 | Not analyzed | 10 | 10 |
| Drum | TRAY MAP | 20 | 2 | 2 | 2.1 | 1.7 | 0 | 18.6 | 1.1 | 0 | 1.2 Spoilage | Spoilage | Normal | Not analyzed | 850000 | 900000 | Not analyzed | 10 | 10 |

Figure 20: Shelf-life data for PAA AND Non-PAA [Peracetic Acid]-treated poultry using Tewari's Zero-OxTech® process [REISER VACPAC application].

| Product | Package Type | Sample day | Sample # | Product Temp °C | O₂ concentration [%] | O₂ concentration [%] Zero-OxTech REISER VACPAC [PAA TREATED] | O₂ concentration [%] Zero-OxTech REISER VACPAC [NON-PAA TREATED] | CO₂ concentration [%] | CO₂ concentration [%] Zero-OxTech REISER VACPAC [PAA TREATED] | CO₂ concentration [%] Zero-OxTech REISER VACPAC [NON-PAA TREATED] | Organoleptic Test: control | Organoleptic Test: Zero-OxTech REISER VACPAC [PAA TREATED] | Organoleptic Test: Zero-OxTech REISER VACPAC [NON-PAA TREATED] | SPC: control | SPC: Zero-OxTech REISER VACPAC [PAA TREATED] | SPC: Zero-OxTech REISER VACPAC [NON-PAA TREATED] | E. coli: control | E. coli: Zero-OxTech REISER VACPAC [PAA TREATED] | E. coli: Zero-OxTech REISER VACPAC [NON-PAA TREATED] |
|---|---|---|---|---|---|---|---|---|---|---|---|---|---|---|---|---|---|---|---|
| Boneless skinless breast | Reiser VACPAC | 1 | 1 | 3.1 | N/A | N/A | N/A | N/A | N/A | N/A | Normal | Normal | Normal | 20000 | 25000 | 15000 | 10 | 10 | 10 |
| Boneless skinless breast | Reiser VACPAC | 1 | 2 | 2.8 | N/A | N/A | N/A | N/A | N/A | N/A | Normal | Normal | Normal | 35000 | 30000 | 20000 | 10 | 10 | 10 |
| Boneless skinless breast | Reiser VACPAC | 8 | 1 | 2.6 | N/A | N/A | N/A | N/A | N/A | N/A | OFF-ODOR | Normal | Normal | 1000000 | 50000 | 30000 | 10 | 10 | 10 |
| Boneless skinless breast | Reiser VACPAC | 8 | 2 | 2.5 | N/A | N/A | N/A | N/A | N/A | N/A | OFF-ODOR | Normal | Normal | 1500000 | 60000 | 40000 | 10 | 10 | 10 |
| Boneless skinless breast | Reiser VACPAC | 11 | 1 | 1.8 | N/A | N/A | N/A | N/A | N/A | N/A | SPOILAGE | Normal | Normal | Not analyzed | 80000 | 50000 | Not analyzed | 10 | 10 |
| Boneless skinless breast | Reiser VACPAC | 11 | 2 | 1.2 | N/A | N/A | N/A | N/A | N/A | N/A | SPOILAGE | Normal | Normal | Not analyzed | 100000 | 100000 | Not analyzed | 10 | 10 |
| Boneless skinless breast | Reiser VACPAC | 14 | 1 | 2.2 | N/A | N/A | N/A | N/A | N/A | N/A | SPOILAGE | SLIGHT OFF-ODOR | Normal | Not analyzed | 500000 | 150000 | Not analyzed | 10 | 10 |
| Boneless skinless breast | Reiser VACPAC | 14 | 2 | 1.7 | N/A | N/A | N/A | N/A | N/A | N/A | SPOILAGE | SLIGHT OFF-ODOR | Normal | Not analyzed | 700000 | 200000 | Not analyzed | 10 | 10 |
| Boneless skinless breast | Reiser VACPAC | 17 | 1 | 1.8 | N/A | N/A | N/A | N/A | N/A | N/A | SPOILAGE | OFF-ODOR | Normal | Not analyzed | 1000000 | 300000 | Not analyzed | 10 | 10 |
| Boneless skinless breast | Reiser VACPAC | 17 | 2 | 1.9 | N/A | N/A | N/A | N/A | N/A | N/A | SPOILAGE | OFF-ODOR | Normal | Not analyzed | 1500000 | 500000 | Not analyzed | 10 | 10 |
| Boneless skinless breast | Reiser VACPAC | 20 | 1 | 1.9 | N/A | N/A | N/A | N/A | N/A | N/A | SPOILAGE | Spoilage | Normal | Not analyzed | 5000000 | 700000 | Not analyzed | 10 | 10 |
| Boneless skinless breast | Reiser VACPAC | 20 | 2 | 2.1 | N/A | N/A | N/A | N/A | N/A | N/A | SPOILAGE | Spoilage | Normal | Not analyzed | 40000000 | 850000 | Not analyzed | 10 | 10 |

Fig 21: APC's for Deli Birds over time using Zero-OxTech process.
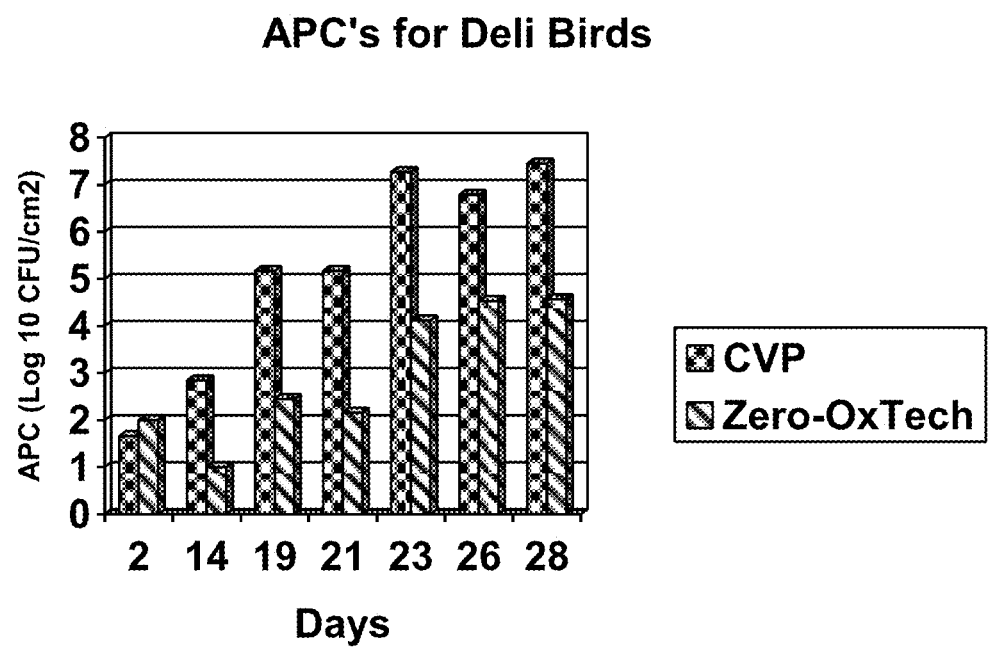
Fig. 22: Anaerobic APC's for Deli Birds over time using Zero-OxTech process.
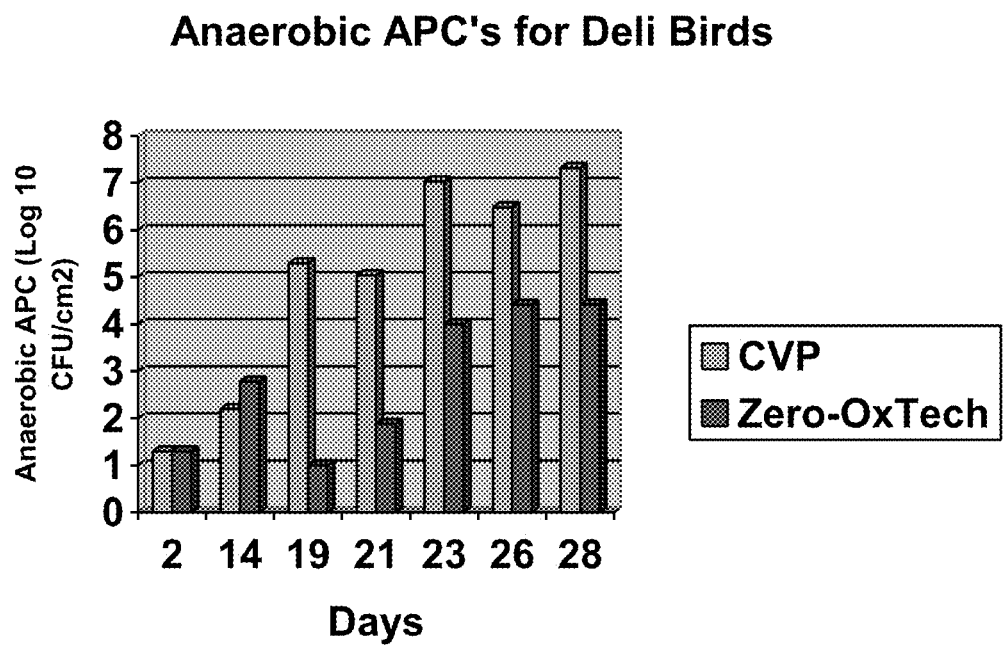

FIG. 23: Lactic Acid Bacteria for Deli Birds over time using Zero-OxTech process.
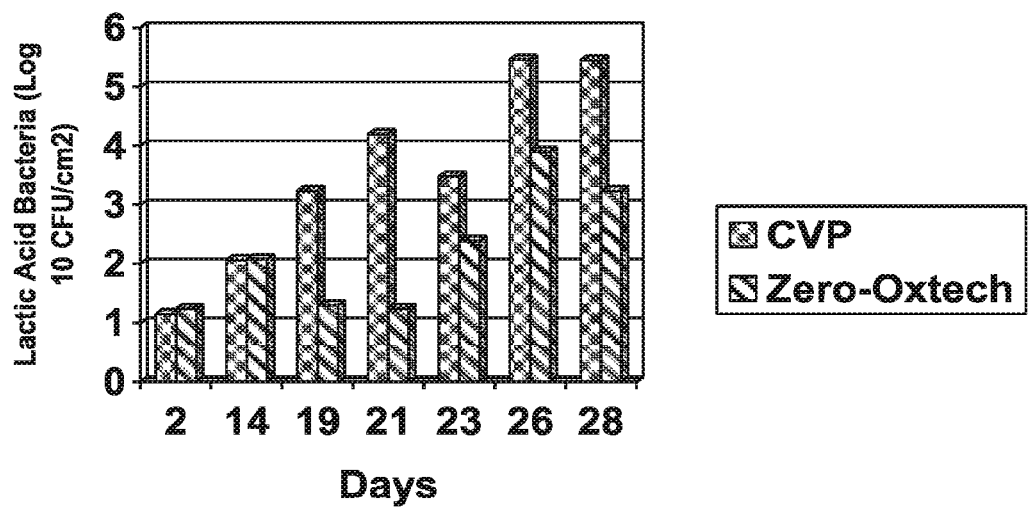

METHOD AND APPARATUS FOR EXTENDING SHELF-LIFE OF MEAT AND POULTRY

TECHNICAL FIELD OF THE INVENTION

The present invention relates to a packaging system, method, and apparatus of increasing the shelf-life of retail-ready meat & poultry cuts.

BACKGROUND OF THE INVENTION

Meat production and packaging is well known in the industry. Traditionally, once a primal cut of meat has been made, it is placed in a package containing ambient air and the lidding material is fed from a roll and over the tray covering the meat cut. The tray edges are typically sealed to form the finished product. However, since the air allows the meat to become discolored due to the onset of metmyoglobin, the meat normally undergoes vacuum skin packaging in order to maintain freshness and reduce spoilage of the meat cut.

The conventional vacuum packaging process normally does not allow the meat cut to exhibit a deep red pigment desired by retailers and consumers. Subsequently, once these vacuum-packed meat cuts reach the supermarkets or meat distribution centers, the primal cuts are cut into smaller cuts. These smaller cuts are then repackaged or displayed in a case for sale. In a very short time, the meat cuts lose the desired red color and start to brown or otherwise become discolored, losing its aesthetic fresh, healthy appearance and often not sold as a result.

Specifically, meat cuts lose their healthy color due to metmyoglobin (aka browning of meat). Metmyoglobin occurs because of oxidation of deoxymyoglobin, and this chemical reaction of the meat is irreversible. Under a reduced oxygen condition, the rate of the metmyoglobin is high. Transient discoloration can occur in a reduced oxygen environment, because meat muscle possesses a limited enzymatic activity known as metmyoglobin reducing activity (MRA) which converts metmyoglobin back to deoxymetmyoglobin However, this process, which can decrease and possibly reverse discoloration, takes several days and is detrimental to centralized meat operations. Furthermore, the MRA is extremely limited and once consumed by the meat cannot be rejuvenated.

Despite the inherent drawback, centralized packaging of retail meat cuts is gaining in popularity in the food industry due to its economies and the potential to maintain quality, enhance safety, and extend the shelf-life of fresh meat. However, the general requirements to optimize shelf-life of centrally prepared retail-ready meat cuts are slightly different from those needed to extend shelf-life of fresh chilled meat for periods of up to fifteen weeks. Deterioration of chilled meats primarily takes place at the cut or uncut muscle surface. In long term storage at a centralized packaging and storage operation, primal cuts are placed in an atmosphere saturated with carbon dioxide ($CO_2$) (100%) which contains very low residual oxygen ($O_2$), and these primal cuts stored at $-1.5+/-0.5°$ C.

At the end of required storage, meat is removed and fabricated into retail or food service cuts. New fresh surfaces are created in the process, revitalizing the appearance of the meat cuts; and when the new surfaces of the meat cuts are prepared for retail display the normal expectation is a further four days of shelf-life. Depending on the variability of the meat species, the shelf-life is usually limited by development of undesirable organoleptic changes, where defects in color are usually independent of the microbial presence. The latter has a lactic acid bacterial population, which maximizes under storage conditions at levels about $10^8$ $cfu/cm^2$ well before the shelf-life expiration.

However, with centralized distribution of retail ready fresh meat, circumstances and storage requirements are different. The wholesale storage period following initial packaging of the retail cuts is in the range of 20-30 days and prepared products must withstand the rigor of retail display for up to two days thereafter without further manipulation of the contents of the package. Retail packages are simply moved from their storage container (usually a unit or over-wrap containing a modified atmosphere) to retail display where desirable meat color develops upon exposure to air. The present commercial centralized meat operations only provide one to two weeks of shelf-life. Whereas, in North America, total shelf-life of several weeks (i.e. at least greater than four weeks) is desired because of distant markets and intent of North American meat industry to export to distant countries. Hence, the goal is to extend the shelf-life of retail-ready meat cuts.

A number of approaches have been taken to extend the shelf-life of meat. The basic approach is to package meat cuts with an inert gas atmosphere after the meat has been shipped from a processing facility to a retail outlet. Thereafter, when the retail outlet receives the packaged meat, the inert gas within the package is replaced with an oxygen-containing atmosphere.

One example of such a packaging system is depicted in U.S. Pat. No. 4,055,672 issued in 1977. The '672 patent provides for a system in which a meat product is packaged with one of the package walls formed from a gas impermeable material and another package wall formed as an inner gas permeable layer and an outer gas impermeable layer. The meat cut is initially packaged in an inert gas atmosphere which is maintained within the package by the package walls including the outer gas impermeable wall layer. If the outer gas impermeable layer is removed, this enables the oxygen-containing ambient air to flow into the package through the gas permeable layer. However, the '672 patent allows the meat to deteriorate after the impermeable layer has been removed, unless an additional impermeable layer is added. Nevertheless, placing a gas impermeable film layer over a gas permeable film layer is expensive to produce and difficult to seal to a container.

Another example of packaging containing an inert gas atmosphere is depicted in U.S. Pat. No. 6,302,324 issued in 2001. The '324 patent provides for packaging a food product in a receptacle containing an inert gas atmosphere and sealing a film to the receptacle. The receptacle includes a sealing flange and a tab portion extending from the sealing flange to which the film is sealed. The tab and the film are removed from the package to form an opening between the film and the receptacle when the food product is ready to be displayed to consumers. An atmosphere exchange operation is carried out through the opening, by inserting a nozzle through the opening and introducing an oxygen-containing gas into the receptacle cavity through the opening. The inert gas atmosphere initially contained within the receptacle is exhausted through the opening and the nozzle is withdrawn from the opening. The opening is closed by sealing the film to the receptacle. The '324 patent allows an inert gas atmosphere within the interior of the package to be easily and quickly replaced with an oxygen-containing atmosphere.

U.S. Pat. No. 6,408,598 also provides for a modified atmosphere packaging process including the steps of providing a tray, providing an upper film which includes a sealant layer which is sealable to the tray, orienting the film to an orientation ratio of from about 6.0:1 to about 16.0:1 positioning, a high profile product on the tray, extending the upper film above the tray and product, drawing the upper film into a concavity by differential pressure, maintaining the concave shape of the upper film while heating the film, removing gases from the space between the upper film and the tray and product, introducing a desirable gas into the space, releasing the upper film such that it shrinks toward the product and the tray while the desirable gas is retained within the space preventing close contact of the film with the lowermost portions of the product and sealing the upper film to the flange of the tray, wherein at least the step of heating the film shrinks the film, thereby tensioning it onto and across the underlying product.

Another patent for extending the shelf-life of meat has been depicted in the process for pre-packing fresh meat seen in U.S. Pat. No. 4,683,139. The '139 patent describes a process where the meat is treated with an aqueous solution containing three active components, namely phosphate compounds, a reducing agent and a sequestering agent; and then packaging the meat in a controlled gaseous atmosphere containing from about 20% to 80% carbon dioxide and from about 2% to 30% oxygen, with the balance being nitrogen. Specifically, the process includes (1) placing at least one pork chop on each of a plurality of semi-rigid trays; (2) placing a gaseous mixture over and around the chops on each of the trays; (3) sealing the trays with a gas permeable film; (4) placing a plurality of the trays on a thermoformed tray; and (5) covering and sealing the thermoformed tray with a gas impermeable film. However, the '139 patent concentrates on the centralized pre-packing of fresh meats at the meat packing plant prior to shipment to the point of storage or retail sale. Further, the '139 patent fails to include 100% nitrogen gas filling a master bag before the placement of the tray.

Other examples of inventions desiring to extend the shelf-life of food products are U.S. Pat. Nos. 5,527,105 and 5,705,215 issued to Riach, Jr. The '105 and '215 patents provide for a magnetic method for extending the shelf-life of food products wherein magnetic strips, matting formed from the strips and pads having magnetic north sides and magnetic south sides. Here, the negative magnetic north sides of the magnetic strips or pads are arranged to impinge on the fresh food products stored in a low-temperature environment. However, the '105 and '215 patents achieve a wetter condition thereby establishing a longer shelf-life condition for foods which are stored in a combined environment to include a north magnetic field and a selected low temperature.

Another example of a shelf-life extender for food use is depicted in U.S. Pat. No. 5,985,303 issued to Okada in 1999. The '303 shelf-life extender incorporates an isothiocyanic acid compound being supported on a matrix, where the compound is packaged in synthetic resin film or non-woven fabric. However, the '303 patent concentrates on acidic chemical compounds and gelling agents as opposed to integrating a zero oxygen packaging system as described by the present invention.

U.S. Pat. No. 6,153,241 describes another method and a package for extending the shelf-life of a food. Specifically, the method of achieving an extended shelf life for a food includes enclosing the food in a discrete container having a first and a second container position, treating the food in the discrete container with heat in a treatment chamber while the container maintains the first container position and raising the container to the second container position under which the container is distributed, sold or used. However, contrary to the present invention, the '241 patent describes a method of heat treating a pumpable food carried out in a treatment chamber.

U.S. Pat. Nos. 6,183,790 to Delducca et al and 6,666,988 to Carr et al utilize an external oxygen accelerator to activate an oxygen scavenger to reduce the oxygen concentration to 500 parts-per-million (ppm) within 90 minutes. However, even at these low oxygen levels metmyoglobin formation remains very high (See FIG. 1). This stems from the fact that transient discoloration occurs because of limited metmyoglobin reducing activity (MRA) with the meat muscle, and these patents fail to address this process.

U.S. Pat. No. 6,269,946 to Colombo includes use of a meat tray over-wrapped with a gas permeable film. This patent uses metal chloride inside a meat tray to combine with water and acid to produce chlorine dioxide to help preserve meat cuts packaged therein. The disclosed invention also claims oxygen absorbers packaged within a barrier bag, but the patent fails to discuss the importance and advantages of sealing oxygen scavengers inside the meat tray or the need to quickly obtain a zero-oxygen gas environment for long-term cold storage of meat cuts both within the meat tray and the barrier (e.g. master) bag. The patent only provides for very low oxygen environment of about less than 0.05% volume of oxygen and does not attain zero oxygen levels. Further, the meat tray adds a receptacle for injecting carbon dioxide into the meat tray, and does not recommend a nitrogen-rich gas environment for storage, instead favoring carbon dioxide. Carbon dioxide is not preferred for several reasons.

Other U.S. Patents and publications (U.S. Pat. Nos. 6,230,883, 6,447,826, 6,586,651, 6,592,919) recommend using an atmospheric mixture containing carbon dioxide or discuss methods to create an atmosphere of carbon dioxide. However, in these inventions, although carbon dioxide has antimicrobial activity, solubility increases at low temperature and it is absorbed into the meat cuts, and after long storage the meat starts to discolor from the inside out. For this reason, carbon dioxide is only successful for long-term storage of primal or sub-primal meat cuts or uncut carcasses. However, for retail ready cuts, use of carbon dioxide is detrimental to the meat color if long-shelf life of case-meat is desired. Solublization of carbon dioxide into the meat prevents and/or delays meat cuts from re-blooming when master bags containing retail meat cuts are opened and the meat exposed to air.

In other systems utilizing activated oxygen scavengers as mentioned by Delducca et al and Carr et al, the presence of carbon dioxide hinders the rate of oxygen absorption by oxygen scavengers due to formation of carboxylic acid (carbon dioxide reacting with residual oxygen), hence the lowest oxygen concentrations obtained with these systems is 500 ppm within 90 minutes, and other issues regarding transient meat discoloration remain unsolved.

Present commercial centralized meat operations employ master packaging in which three or more trays, each containing retail-ready meat cuts, are placed in a gas-impermeable master bag. However, residual oxygen may be present inside the packages due to the entrapment of oxygen during controlled atmosphere packaging (CAP). Specifically, the residual oxygen may be present due to any one of the following factors: (1) insufficient oxygen evacuation; (2) insufficient flushing times during CAP-machine operations;

(3) use of an improper ratio of meat-mass to package atmosphere resulting in dead space in the master bag; (4) oxygen entrapment in the retail trays themselves, in absorbent pads or under the meat cut; (5) oxygen ingress through seams of a film used to over-wrap a master pack; (6) film defects; or (7) oxygen release from meat muscle. Since some of these factors are inevitable in commercial meat packaging operations, the plain use of master packaging has found limited application in commercial centralized meat operations. Therefore, a system is needed to reduce the oxygen concentration in a relatively short period of time in order to restore the metmyoglobin reducing activity.

Previously issued patents and prior art procedures reduce the oxygen concentration to at best 500 ppm within 90 minutes. These processes can result in some extension of shelf life of case-ready meat cuts for retail sale, however these oxygen concentrations still lead to transient meat disclosure. For meat-packaging implementing national and international centralized meat packing operations, extremely long shelf life in the range of 8-10 weeks is desired. This long of a shelf-life can only be obtained if the transient meat discoloration can be avoided. Consequently, premature temporary discoloration limits the advantages of centrally packaged retail ready meat cuts using current oxygen depleted master packaging methods because a zero-oxygen storage environment is not attained.

Discoloration is also dependent on the specific muscle packaged since tissue vary in capacity to withstand low oxygen concentrations (<500 ppm). Centrally prepared beefsteaks and ground beef packaged under controlled atmospheres are shown to be susceptible to very low oxygen concentrations. Beef muscle with high color stability are least susceptible to metmyoglobin formation if the atmosphere is maintained at <600 ppm $O_2$ at temperatures <0° C. However, beef with poor stability is highly susceptible to metmyoglobin formation even at very low $O_2$ concentrations and subzero temperatures, and these cuts require a zero-storage environment for long-term storage.

If the enzymes causing MRA are retained in the meat, longer shelf life of meat cuts is possible. To accomplish this, the oxygen concentration in the master-bags used to ship meat from a central meat operation containing groups of meat trays must be zero. Under zero-oxygen concentration, meat color will go to the de-ox state and will come back to ox-state with the master-bags containing trays are opened and exposed to atmosphere. By doing this procedure, the enzymes causing MRA are retained and the meat does not go through a transient discoloration and long shelf-lives can be attained. The present invention has been developed to alleviate the above-identified drawbacks and provide further benefits to the meat distribution centers, supermarkets and the consumer.

The goal of the invention is to provide meat packers with an integrated packaging system that incorporates oxygen scavengers along with automatic formation of master-bags to fit the size of meat-trays, family size or multi-individual trays, and gas-flushing and sealing. The packaging system reduces the oxygen concentration to 0 ppm within a short period of time after pack closure. The invention uses modified horizontal, form, fill, and seal equipment with different packaging size options. The packaging equipment is intended to operate exclusively in meat and poultry operations utilizing oxygen scavengers, but may be adapted for operations with long-term storage in a carbon dioxide environment.

SUMMARY OF THE INVENTION

The present invention in its several disclosed embodiments alleviates the drawbacks described above with respect to traditional meat packaging and incorporates several additionally beneficial features. The process of packaging meat, namely retail-ready meat, is known in the prior art. Disclosed herein is a packaging system and method of same developed to prevent meat discoloration of prepared fresh meat cuts, such as beef, pork, lamb, and chicken. Specifically, different packaging configurations use self-activated oxygen scavengers and structures to extend the shelf life of fresh meat cuts by attaining a zero oxygen-packaged environment.

When fresh meat is exposed to oxygen, two effects normally occur. First, bacteria begins to grow and subsequently the fresh meat color disappears. By eliminating exposing the meat to oxygen, the chances of reducing bacteria and extending the fresh meat color improve dramatically. As a result, the present invention effectively removes oxygen very rapidly from a sealed package thereby increasing the shelf-life of the meat up to 12 weeks or more for different meat types.

The disclosed packaging system extends the shelf-life of centrally prepared retail-ready meat cuts by restoring metmyoglobin reducing activity of the meat-muscle through zero oxygen packaging. This achieves extremely long shelf-life for storage of retail-ready meat cuts. A retail-ready meat cut is placed in a tray having an activated oxygen scavenger based upon an iron chemical system and an absorbent pad. Several of these trays are placed in a master bag that is filled with a high nitrogen gas mixture and sealed. Several different combinations of placing scavengers (based upon iron chemical systems) and optimization of the oxygen scavenging capacity in each tray are achieved.

The tray or the master bag containing optimum oxygen scavenging capacity results in 0.6-2.0 hour half-life for oxygen in the master bag (depending upon the initial oxygen concentration and meat-type) and is the one desired for centrally prepared retail-ready meat cuts. Such a packaging system under 100% nitrogen atmosphere resulted in at least a ten week storage life for centrally prepared meat cuts, such as beef tender loin steaks, with a subsequent display life of at least three days.

Thus, the use of an activated oxygen scavenger and an absorbent pad inside a master bag having 100% nitrogen introduced therein provides a significant increase in profits by reducing spoilage. By reducing the partial pressure of oxygen to zero ppm in the master bags, the growth of the aerobic spoilage and pathogenic microorganisms is inhibited thereby extending the storage and display life of retail-ready fresh meat packages. Additionally, this process preserves the vivid, bright cherry red color of red meats, whereby longer shelf life and better looking meat products translate into higher sales and higher profits. Moreover, the master package will reduce purge due to temperature changes and will actually enhance the natural aging process producing more flavorful and tender cuts of fresh meat.

Another advantage of the present invention is that a retailer is capable of unpackaging a days' supply of fresh meat cuts at a time. The master package is protected from oxygen exposure until the seal is released and the individual packages are placed in the retail case. In essence, the shelf life clock does not begin ticking until the fresh meat is placed in the retail case. For central packaging operations, by utilizing the master packages, the shrinking of meat cuts due to handling, transportation and temperature fluctuations is greatly reduced to virtually zero shrinkage.

The main advantage of the invention is the zero-oxygen system gas environment in the master bag stops the formation of metmyoglobin, the agent that causes fresh meat to become discolored. By stopping metmyoglobins formation, the metmyoglobin reducing activity (MRA) of the meat muscle is retained. Because the oxygen concentration in the master bag is zero ppm, metmyoglobin cannot form and the discoloration process never occurs. Further, under the zero-oxygen system, only lactic acid and other slow growing anaerobic bacteria will grow; and the growth of faster growing aerobic bacteria causing rapid spoilage is restricted.

Shelf-life in the retail case is increased by one to seven additional days, depending upon the type of meat cut. The present packaging system preserves the enzymatic activities of meat-muscle that maintains the bright cherry red color of each meat cut, the retail display life of the meat is extended dramatically. The addition of carbon monoxide as part of the gas mixture environment also helps preserve the reddish color of the meat as a layer of carbon monoxymyoglobin is formed on the meat surface, The apparatus used in the invention will automatically package meat trays into a single master bag containing oxygen scavengers with appropriate oxygen absorption capacity to reduce the half-life of oxygen inside the master bags and meat packages to between 0.6 and 2.0 hours. The master bags are formed around the meat trays and the ambient air is flushed from the bag. The bag is then injected with the desired gas mixture environment that is preferably 100% nitrogen or nitrogen rich (>50%) with the balance a mixture of other gases, preferably carbon monoxide and carbon dioxide. Some small quantity of carbon monoxide ($\geq 0.1\%$) is preferred. The master bags can then be stored for several weeks at freezing or below freezing temperatures (28°-32° F.) until needed for placing into a retail display for several days before meat discoloration occurs.

DETAILED DESCRIPTION OF THE PREFERRED EMBODIMENTS

As required, detailed embodiments of the present invention are disclosed herein; however, it is to be understood that the disclosed embodiment(s) are merely exemplary of the invention that may be embodied in various and alternative forms. Specific structural and functional details disclosed herein are not to be interpreted as limiting, but merely as a basis for the claims and as a representative basis for teaching one skilled in the art to variously employ the present invention. Further, the particular materials and amounts thereof, as well as other conditions and details, recited in these examples should not be used to unduly limit this invention.

The present invention in its several disclosed embodiments alleviates the drawbacks described above with respect to traditional meat packaging and incorporates several additionally beneficial features. The process of packaging meat, namely retail-ready meat, is known in the prior art. Disclosed herein is a packaging system and method of the same developed to prevent meat discoloration of prepared fresh meat cuts, such as beef, pork, lamb, and chicken. Specifically, different packaging configurations of components of the system use self-activated oxygen scavengers and structures to extend the shelf life of fresh meat cuts. A number of different options have been tested.

Oxygen Scavengers

Oxygen scavengers based on iron chemical systems were employed. A sachet placed within the packaging bag contains chemical granules ranging from 0.001 mm to 1.5 mm in diameter. The half-life of oxygen in a bag containing these oxygen scavengers was in the range of 30 to 1500 minutes, with the quantity of oxygen absorption material ranging from 1 gram to 300 grams. The oxygen absorption material was placed in a package, which was either laminated or unlaminated with porosity levels ranging from 20 to 120 Gurley a second, and an active surface area of 4 to 64 square inches. The preferred material for the bag is tyvek. The scavengers are typically formed from iron (<25%, preferably 15-20%), carbon (<35%, preferably 20-30%), vermiculite (<20%, preferably 10-15%), and de-ionized water (<10%, preferably 5%), salt [NaCl] (<10%, preferably 5%). A small amount (<10%) of zeolites can also be added for increased oxygen absorption rates. Oxygen scavengers can also be based on magnesium, copper, and enzymes. The oxygen scavengers are activated upon exposure to air and/or oxygen in an atmosphere greater than 60% relative humidity, and work under a temperature range of 28° to 45° F.

Carbon Dioxide Generators $CO_2$ generators based on chemical reactions are being employed. The sachet within the packaging bag contains chemical granules ranging from 0.001 mm to 3.0 mm in diameter. The $CO_2$ generating time in a bag containing these $CO_2$ generators was in the range of 300 to 10,080 minutes, with the quantity of $CO_2$ generating material ranging from 10 gram to 500 grams. The $CO_2$ generating material was placed in a package, which was either laminated or unlaminated with porosity levels ranging from 20 to 120 Gurley a second, and an active surface area of 4 to 256 square inches. The preferred material for the bag is tyvek or any material with similar characteristics. The $CO_2$ generators are typically formed from combination of sodium carbonate (<80%, preferably 65-85%) and malic acid (<30%, preferably 20-35%). The $CO_2$ generators are activated by injecting small amount of water (5-50 mL) into the sachet containing chemicals, and work well under a temperature range of 28° to 42° F.

Meat Characteristics

The meat can be of any type such as pork, lamb, beef, veal, chicken, fish, turkey, venison, or any other meat type. In the actual meats studied developing the invention, meats used included beef, veal, pork, lamb, and chicken. The cuts used were primal and/or sub-primal, and the grades of fresh meat cuts were prime, choice, and/or select. The meats included both boned and boneless cuts, and the size of fresh cut meat product was in the range of 1 to 5 lbs. The meat carcass was cooled either though blast cooling and/or cold room storage, with a cooling temperature of between 5° to 40° F. The time between slaughter and packaging was in the range of 24 hours to 120 hours. Packaging temperatures were less than 40° F.

Retail Tray Characteristics

The retail tray composition was of plastic and/or polystyrene and/or combination of both. The inherent oxygen content of the retail tray was in the range of 10 to 23,000 ppm. The surface of the retail tray exhibited either a grid or ridged pattern, or a flat surface upon which to place the fresh meat product. The retail tray cover was either lidded or over-wrapped. The retail tray surface area was in the range of 15,000 to 325,000 square mm. A moisture absorbent pad was either placed in the retail tray before the fresh meat product or was not included. The oxygen scavenger pads were placed in the retail tray or exterior to the retail tray.

The retail tray overwrap used has an oxygen permeability in the range of 3,000 to 10,000 cc of oxygen per square meter per 24 hours at 73° F. and 70% relative humidity. Additional atmospheric permeability of the retail tray overwrap consisted of additional ambient atmosphere flow with multiple holes, each having a diameter of less than 5 mm, punched through the overwrap or a single needle hole with a diameter of less than 5 mm.

Master Bag Characteristic

The meat trays containing different meat cuts in different numbers (one to six retail trays) are placed in a master bag possessing good seal strength. The master bag possesses good seal strength with either a foil lining or an ethyl vinyl alcohol (EVOH) lining. The oxygen permeability of the master bag was less than 13 cc of oxygen per square meter per 24 hours at 73° F. and 70% relative humidity. The master bag was gas-flushed with different gas-compositions and sealed.

The modified atmosphere characteristics were composed of different gas mixtures of carbon dioxide, carbon monoxide, and nitrogen/inert gas. Typical gas mixtures either consisted of 100% nitrogen and/or any inert gas or contained 100% carbon dioxide or different percentages of gases generally in the concentrations of <1% carbon monoxide, <40% carbon dioxide, and the balance either nitrogen and/or some other inert gas. The oxygen scavengers of different characteristics were placed in the master bags or in the retail trays or both. The residual oxygen content in the master bag after gas flushing using single or multiple cycles was less than 6%. The storage temperature of the master bags was less than 40° F., and the master bags were stored for up to 15 weeks.

Display and Sampling of Retail-Trays

Upon removal from primary storage at weekly intervals, and on day 0 of retail display, master packaging was removed and retail trays placed in the center of the display shelf. The displayed meat cuts were examined for discoloration, retail acceptability, off odor intensity, and odor acceptability, and odor description for every 24 hours for up to nine days. A similar procedure was repeated for all storage intervals for up to 15 weeks.

Visual Assessment of Master-Packaged Meat Cuts

A five-member panel was used for the subjective evaluation of the meat cuts. Surface discoloration was evaluated using a seven-point descriptive scale: 1=0% (none), 2=1-10%, 3=11-25%, 4=26-50%, 5=51-75%, 6=76-99%, 7=100%. Retail appearance was assessed on a seven-point hedonic scale: 1=Extremely undesirable, 2=undesirable, 3=Slightly undesirable, 4=Neither desirable nor undesirable, 5=Slightly undesirable, 6=Desirable, and 7=Extremely desirable.

Odor Assessment of Master-Packaged Meat Cuts

A five-member panel was used for odor assessment. Off odor intensity scores were assessed using a four-point descriptive scale: 1=No off odor, 2=Slight off odor, 3=Moderate off odor, 4=Prevalent off odor. Odor acceptability scores were assessed using a five-point scale: 1=Acceptable, 2=Slightly acceptable, 3=Neither acceptable no unacceptable, 4=Slightly unacceptable, 5=Unacceptable.

Microbial Analysis

A 10 cm$^2$ sample was obtained at each sampling time (on day 0 and last day of each storage interval) from each meat cut using a sterile cork borer. The sample was the placed into a stomacher bag with 10 mL of 0.1% peptone solution and was massaged for 120 seconds using a commercial stomacher, yielding a dilution of $10^0$. The homogentate was further diluted 10-, 100-, and 10,000-, and 100,000-fold, after which 0.1 mL volumes of undiluted homogenate. Each dilution prepared was spread on duplicate plates of All Purpose Tween (APT). The plates were then incubated aerobically for 3 days at 25° C. The micro flora was determined from plates bearing 20-200 colonies.

Results Summary

The oxygen concentration was 0 ppm (zero) after 24 hours of storage, and was 0 ppm throughout the storage period of up to 15 weeks. Based on sensory and microbial analysis:
1) beef cuts were acceptable for 10 weeks storage plus 5 days at the retail display,
2) pork chops were acceptable for 15 weeks during storage plus 9 days at the retail display,
3) lamb chops were acceptable for 8 weeks during storage plus 7 days at the retail display, and
4) chicken pieces were acceptable for up to 6 weeks storage plus 6 days at the retail display.

Discussion

Referring to FIG. 1, there are three chemical states for myoglobin. Metmyoglobin is at a peak level at low oxygen pressures of about 2 mm of mercury. At sea-level, the atmospheric pressure of oxygen is approximately 160 mm of mercury, while the total atmospheric pressure is approximately 760 mm of mercury. As can be observed graphically, in order to begin minimizing formation of metmyoglobin, the atmospheric partial pressure needs to be reduced to less than 1 mm of mercury, or an oxygen content at sea level of less than 0.13%. To have no metmyoglobin formation, the atmospheric partial pressure of oxygen needs to be reduced to 0 mm mercury for an $O_2$ content at sea-level of 0 ppm (e.g. zero oxygen).

Example 1 depicts the first phase of the present invention involving a detailed oxygen absorption study of oxygen scavengers based upon an iron chemical system and enzymatic activity. The iron chemical system based scavengers are dependent upon the chemical reaction of ferrous iron to ferric oxide or ferric hydroxide. Specifically, Example 1 indicates that oxygen scavengers modified based upon the iron chemical system have the potential for reducing the oxygen concentration to 0 ppm within a few hours of master packaging, provided an appropriate selection of oxygen scavengers is combined with appropriate placement in the package.

Two factors restricting the activity of the oxygen scavengers are sub-zero temperatures such as −1.5° C. and a low oxygen concentration. Thus, the rate of the iron chemical reaction is greatly reduced at subzero temperatures, and low oxygen concentrations prevent random movement of oxygen molecules due to diffusion, which results in lower oxygen absorption rates. Therefore, the activation of a custom-designed oxygen scavenger of an appropriate capacity is capable of yielding short half-life of oxygen, i.e. a high rate of oxygen absorption. Furthermore, the packaging film, preferably having a high oxygen permeability, acts as an oxygen barrier under sub-zero temperatures and low oxygen concentrations. Thus, the first phase of the invention concentrates on the placement of oxygen scavengers positioned inside the tray and being surrounded by the packaging film.

In the second phase as illustrated in Example 2, the scavengers were interiorly placed within the trays containing meat muscles. Here, the meat muscles had poor color stability since the packaging films covering the trays (seen in Example 1) act as oxygen barriers under sub-zero temperatures and low oxygen concentrations. Hence, the presence of $O_2$ scavengers of appropriate capacity (at least 10 cc per pound of meet) is required. During the second phase, several experiments concentrated on the effect of varying the oxygen-absorbing capacities on the display life. Further, the need for knowing the initial concentration of oxygen in the package, calculating the needed half-life of oxygen in the package and subsequently designing the oxygen scavenger required to obtain the desired half life of oxygen.

Example 3 depicts the third phase of the present invention whereby preventing transient discoloration of the meat cuts, namely the retail-ready meat cuts. Lastly, the fourth phase as shown in Example 4 shows that the restoration of metmyoglobin reducing activity will result in extending the shelf-life of retail ready meat cuts. For example, the shelf-life of the retail-ready beef tender loin cuts was ten weeks with a display life of three days after each weekly storage differing from the conventional one to two weeks with a display life of one and half days.

Example 1

Oxygen Absorption Kinetics of Enzymatic and Iron Chemical Systems Based Oxygen Scavengers The current uses of $O_2$ scavengers generally involve packs in which the atmosphere contains some substantial fraction of $O_2$, if not air, at the time of pack sealing and the inhibition of chemical reactions or proliferation of microorganisms that proceed relatively slowly. Consequently, commercial $O_2$ scavengers are designed to remove a specified amount of $O_2$ from a relative high $O_2$ atmosphere over periods of a day or more. The rate of $O_2$ absorption has then not been a principal concern in the design of commercial $O_2$ scavengers. However, there are applications such as centralized meat operations where the rate of $O_2$ absorption is of prime importance.

The $O_2$ absorption rates of $O_2$ scavengers vary with the natures of their reactants and other materials used in their construction. Rates of absorption may also be affected by factors such as temperature and the compositions of the atmospheres to which they are exposed. Therefore, the objective of this study was to design an oxygen scavenger for centralized meat operation after studying the $O_2$ absorption kinetics of $O_2$ scavengers based upon enzymes and iron chemical systems.

Materials and Methods

1. $O_2$ Scavengers

Self-activated $O_2$ scavengers based upon iron chemical systems and enzymes were manufactured. Since scavengers based upon iron chemical system may form carboxylic acid in the presence of $CO_2$ atmosphere, nitrogen atmosphere should only be used to obtain maximum oxygen absorption rates from these scavengers.

2. Absorption of $O_2$ by Scavengers $O_2$ scavengers were placed in gas impermeable bags composed of a laminate of polyester, oriented nylon, and an EVOH/EVA co extrusion with an $O_2$ transmission rate of 0.55 mL per $m^2$ per 24 hours at 23° C., 70% relative humidity. Bags containing scavengers were either emptied of air by flattening each bag around the scavengers it contained, or were evacuated then filled with a known volume of $N_2$ or $CO_2$, using a controlled atmosphere packaging (CAP) machine, before being sealed. Then, a quantity of air was injected into each bag using a gas-tight syringe inserted through a stick-on septum (Modem Controls, Inc., Minneapolis, Minn., USA).

Immediately after the injection of air, the puncture-point was sealed using a hot iron. Each filled bag was stored at room or a constant temperature. Samples (8 mL) of the atmosphere in each bag were obtained every hour for 8 hours by means of a gas tight syringe inserted through a stick-on septum. If no substantial $O_2$ absorption was noticed within 8 hours, samples were taken after every 12 hours for up to 96 hours. Immediately after each sampling, the $O_2$ concentration in the sample was determined using an $O_2$ analyzer (Mocon MS0750, Modem Controls, Inc., Minneapolis, Minn., USA) with a zirconium oxide sensor, and the puncture-point was then sealed using a hot iron. Residual air in the emptied bag was measured as the volume of water displaced by the emptied bag, and was used in the calculation.

To examine the effects of temperature and initial $O_2$ concentrations on $O_2$ absorption rates, scavengers were placed in bags after the scavengers, in their original sealed package, had been held overnight at the temperature at which $O_2$ absorption was to be measured. For each of the two scavengers at each temperature, six bags were prepared. Three of the bags were emptied of air, and sealed, and then 240 mL of air was injected into each. The other three were each filled with 4.5 L of $N_2$ before being sealed, and then 15 mL of air was injected into each. For each of the two scavenger types based upon scavenging mechanism, two sets of six bags were prepared, with one set being stored at each of the temperatures 25, 12, 2 or −1.5° C.

To characterize $O_2$ absorption when $O_2$ scavengers were placed inside over-wrapped retail trays within master packs, a 216×133×25 mm (L×W×H) retail tray over-wrapped with a film of $O_2$ transmission rate of 8000 mL per $m^2$ per 24 hours at 23° C., 70% relative humidity, containing scavengers, based upon iron chemical system, was placed in each of the six bags. A 5 mm hole was made at one corner of the over-wrapped film to allow free exchange of atmospheres during gas flushing, three bags were emptied of air and sealed, and then 240 mL of air was injected into each. The other three bags were each filled with 4.5 L of $N_2$ to which 15 mL of air was added by injection.

3. Data Analysis

The half-life of $O_2$ in a pack atmosphere was calculated as the time required for the $O_2$ concentration in the pack atmosphere to be reduced to half the initial value. The half-life was calculated from the volumes of $O_2$ at successive time intervals during the storage of the pack. In calculating the volumes of $O_2$ absorbed from each atmosphere of air by the scavenger, the initial volume of air was taken to be the 240 mL added to the pack plus the measured volume of residual air. The volume of $O_2$ in a pack at the end of any period was calculated as the volume of atmosphere at the end of the period multiplied by the concentration of $O_2$ in the atmosphere at that time. The volume of atmosphere at the beginning of each period was taken to be the volume of atmosphere at the beginning of the previous period less the volume of the atmosphere removed as a sample at the end of the period and the volume of $O_2$ calculated to have been absorbed during the previous period.

The volume of $O_2$ absorbed during a period was calculated as the volume of atmosphere at the start of the previous period multiplied by the concentration of $O_2$ in the atmosphere at the beginning of the period less the volume of atmosphere at the start of the period multiplied by the concentration of $O_2$ at the end of the period. In calculating the volumes of $O_2$ remained in the pack in atmospheres of $N_2$ or $CO_2$ to which air was added, the volumes of the atmosphere removed during sampling and the volumes of $O_2$ absorbed during a period were neglected.

To determine the order of reaction, plots were prepared of the natural logs (ln) and the reciprocals of the volumes of $O_2$ remaining in the pack atmosphere against time. If the ln plot approximated a straight line, the reaction was regarded as first order. If the reciprocal plot approximated a straight line, the reaction was regarded as second order. Rate-constants were calculated using the following equations:

for first-order reactions $-\ln[A]_t = -kt + \ln[A]_0 -$ and for second-order reactions $-\frac{1}{[A]_t} = kt + \frac{1}{[A]_0}$ where, $[A]_t$=amount of reactant A at time t (h),
k=the rate-constant (hour$^{-1}$), and
$[A]_o$=the initial amount of reactant.

Frequency factors and activation energies were calculated from the Arrhenius Equation of the form:

$$\ln(k) = \left(\frac{-E_a}{R}\right)\left(\frac{1}{T}\right) + \ln(A)$$

where,
A=frequency factor (frequency of collisions),
$E_a$=activation energy (J mol$^{1-}$),
R=universal gas constant (8.314 J mol$^{-1}$ K$^{-1}$), and
T=temperature (K).

4. Results

Using scavengers based upon iron chemical system in bags containing air, the $O_2$ half-life was four times longer at −1.5° C. than at 25° C., but with a $N_2$ atmosphere, the $O_2$ half-life at −1.5° C. was only double that at 25° C. The $O_2$ half-life in bags containing air and scavengers based upon enzymes was seven times longer at −1.5° C. than at 25° C., but was only two and a half times longer at −1.5° C. than at 25° C. with a $N_2$ atmosphere. The $O_2$ absorption reaction was first order for all the $O_2$ scavengers.

Discussion

The $O_2$ concentrations affected the $O_2$ half-lives substantially for any scavenger type resulting in longer $O_2$ half-lives for the low initial $O_2$ concentration of 500 ppm in $N_2$ atmospheres than for the high initial $O_2$ concentration of 200,000 ppm in air at the same temperature. Scavengers based upon iron chemical systems have shorter $O_2$ half-lives than the scavengers based upon enzymes. The kinetic data of the present study showed that the $O_2$ absorption reaction was first-order at both high (20%) and low (500 ppm) initial $O_2$ concentrations and included $O_2$ concentration as a limiting factor.

At high initial $O_2$ concentration, other factors, such as the scavenger surface area and environment, may also affect the $O_2$ absorption rates. However, at low initial $O_2$ concentrations a diffusion-phenomenon, which is a derivative of $O_2$ concentration, was the dominant influence and resulted in low $O_2$ absorption. A threshold $O_2$ concentration existed where there was a dramatic decrease in $O_2$ absorption rate and $O_2$ concentration became the primary limiting factor for the $O_2$ absorption rate. Consequently, different rate-constants were observed for the same $O_2$ absorption curve at the same temperature, depending upon initial $O_2$ concentration. Therefore, the overall $O_2$ absorption curve produced by the scavenger was bi-phasic.

The effect of the positioning of scavengers within packs was also substantial which suggests that despite its high $O_2$ permeability, the barrier film acted as an $O_2$ barrier at low $O_2$ concentrations. Additionally, its barrier effect may increase with decreasing temperature. Consequently, the size of the hole in the lidding film is likely the limiting factor for $O_2$ absorption when retail trays were placed in a bag.

Due to significant variation in $O_2$ absorption rates of $O_2$ scavengers based upon iron chemical systems and enzymes, appropriate selection of $O_2$ scavengers is of importance in situations where high $O_2$ absorption is initially required. For centralized meat operations, scavengers based upon iron chemical system should be employed. Also, total oxygen absorbing capacity of these oxygen scavengers should be such that resulting oxygen half-life is less than two hours. However, due to significant positioning effects, they should be placed either inside the retail trays containing $O_2$ sensitive products, inside the retail trays as well as in the surrounding gas-impermeable bags, or outside the retail tray depending on the oxygen sensitivity of the meat cut.

Example 2

Testing of Different Master Packaging Options for Centralized Meat Operations

Materials and Methods

1. Oxygen ($O_2$) Scavengers $O_2$ scavengers, based on iron-chemical systems, were used. These scavengers require moisture for activation and operating in air of $N_2$ atmospheres but not in $CO_2$ atmospheres.

2. Master Packaging and Storage of Steaks and Chops

Experiment 1: Ten fresh beef tenderloins (psoas major, PM) and twenty fresh pork loins (longissimus dorsi, LD) from animals slaughtered 24 hours previously, at local commercial beef-and pork-abattoirs, respectively, were obtained. The meat cuts were vacuum-packaged and stored at 2° C. for 14 to 21 days and then used in the experiments. A total of 39 steaks and 39 pork chops were prepared from the stored samples.

Each steak or pork chop was placed on a solid polystyrene tray with dimensions of 216×133×25 mm (L×W×H) containing $O_2$ scavengers with $O_2$ absorbing capacity of at least 10 mL per pound of meat and a single absorbent pad. Each retail tray was lidded with a shrinkable film with an $O_2$ transmission rate of 8000 mL per m$^2$ per 24 hours at 23° C., 70% relative humidity, using commercial glue. Two 3 mm holes were burned through the film in opposite corners of each tray using a soldering iron to allow free exchange of atmospheres during gas flushing. Three retail trays were placed on a plastic cafeteria tray, which as then placed in a 595 ×447 mm (L×W) bi-metalized, plastic laminate bag with an $O_2$ transmission rate of 0.55 m$^2$ per 24 hours at 23° C., 70% relative humidity. The bag was then evacuated, filled with 2.5 L of $N_2$, and heat-sealed using a controlled atmosphere packaging (CAP) machine. Twelve master packs each containing three steaks or three pork chops, were prepared and randomly allocated within species to different treatments including treatments where scavengers were placed either in retail trays or in the master package. Three retail trays containing steaks or pork chops were not stored and served as controls.

Master-packaged steaks and pork chops were stored at 2° C. for one week. The $O_2$ concentration in each master pack was then measured. The retail trays were then placed on retail display and evaluated for visual characteristics by a 4-member trained sensory panel Experiment 2: Twenty-five beef rib-eyes (longissimus thoracis, LT) from animals slaughtered 24 hours previously were obtained from a local commercial beef-abattoir and were vacuum-packaged and stored at 2° C. Following storage for 3 weeks, steaks (96, 2 cm thick) were placed in solid polyethylene trays with dimensions of 216×133×25 mm containing $O_2$ scavengers with $O_2$ absorbing capacity of at least 10 mL per pound of meat underneath an absorbent pad. Retail trays were lidded with a shrinkable permeable film and were prepared as in Experiment 1. Four retail trays were placed on a cafeteria tray, which in turn was placed into a master-pack bag. The master-pack bags were evacuated, filled with 3.25 L of $N_2$, and heat-sealed using the CAP machine. Six such packs were prepared containing one of four treatment combinations (G, H) and G2 and H2, which were over-wrapped instead of lidded. Please note treatments, G2 and H2, differ from other treatments (G and H), by having retail trays over-wrapped instead of lidded. The master-packs were stored and evaluated using procedures similar to those used in Experiment 1.

Experiment 3: Twenty-five Beef tenderloins (psoas major, PM) from animals slaughtered 24 hours previously were obtained from a local commercial beef-abattoir. Steaks (2 cm thick) were placed in 216×133×25 mm-solid polyethylene trays containing $O_2$ scavengers with $O_2$ absorbing capacity of 200 mL (S2), 400 mL (S4), 600 mL (S6), or 800 mL (S8) underneath an absorbent pad. Each retail tray was over-wrapped with a highly $O_2$ permeable and shrinkable film as previously described. Containing the same treatment combination (S2, S4, S6, or S8), four retail trays were placed in a master pack, which was evacuated, filled with 4.5 L of $N_2$, and heat-sealed using the CAP machine. Three retail trays served as un-stored controls.

Following one week of storage at −1.5° C., the $O_2$ concentration in each master pack was measured as previously described. All master bags were removed and the retail trays were placed on retail display and evaluated for visual characteristics daily for four days.

3. Display and Evaluation of Retail Trays

All retail trays were placed at the center of the display shelf. Displayed steaks (PM or LT) and pork chops (LD) were evaluated for color, extent of discoloration, and retail appearance 30-45 min after master pack opening by a 4-5 member trained sensory panel. The details of the eight-point descriptive scale for the color of beef, the six-point descriptive scale for the color of pork, the seven-point descriptive scale for discoloration of both beef and pork, and the seven-point hedonic scale for retail appearance for both beef and pork are given. Reflectance spectra from the meat surfaces were obtained to estimate the proportions of metmyoglobin, deoxymyoglobin, and oxymyoglobin.

4. Estimation of the Oxidative Status of Myoglobin

Each retail tray containing a steak or a chop was evaluated by reflectance spectrophotometry (Macbeth Color eye 1500/ Plus, Kollmorgen Corp., Newburg, N.Y., USA), at three anatomical locations on each cut. Proportions of the different chemical states of myoglobin (deoxy-, met-, and oxy-) were estimated using standard procedures, by converting the readings (R) to K/S values [K is the absorption coefficient and S is the scattering coefficient, determined at selected wavelengths using the formula: $K/S=(1-R)^2/2R$]. Ratios of wavelengths used for calculations are: K/S 474÷K/S 525 for % deoxymyoglobin, K/S 572÷K/S 525 for % metmyoglobin, and K/S 610÷K/S 525 for % oxymyoglobin.

5. Statistical Analysis

The influences of different treatments on factors influencing meat color were compared statistically for significant differences ($p<0.05$) using Analysis of Variance (proc ANOVA and LSD means) in SAS (SAS Institute Inc., Cary, N.C., USA).

Results

Experiment 1 a. Oxygen Concentration

The $O_2$ concentration in every fifth bag at initial packaging was 150-200 ppm. After being stored for one week at 2° C. the $O_2$ concentration in most bags with $O_2$ scavengers was 0 ppm, except for bags with treatments H, G, and G1 with beef. Bags without $O_2$ scavengers contained small amounts of $O_2$, occasionally up to 1150 ppm.

b. Visual Properties

Pork color scores in all treatments ranged from 2.4 to 3.3, and would be considered normal except in treatment D1, where the chops were slightly pale. Chops in all treatments could be considered to be without discoloration, except in treatments A and B, where the chops were slightly discolored. Chops in all treatments were rated desirable to extremely desirable except in treatments A, B, and D1. Chops in treatment A were rated slightly undesirable and chops in treatments B and D1 were rated slightly desirable. (Table 2c) Beef steaks in all treatments were perceived to be bright cherry red to moderately dark red, except in treatments E and G1, where color scores were reduced due to complete discoloration of one or more steaks. Steaks in all treatments without $O_2$ scavengers either inside the retail tray or in the master pack were moderately discolored. Steaks in treatments H and G1 were also moderately discolored, undoubtedly as a result of $O_2$ ingress through the pack. Steaks in all treatments with $O_2$ scavengers inside the retail tray were perceived to be at least slightly desirable, except in treatments H and G1, due to extensive discoloration as a result of apparent $O_2$ ingress. (FIG. 2A)

Comparison of retail appearance scores for beef steaks stored with and without $O_2$ scavengers indicates the necessity of including $O_2$ scavengers in master packaged, display ready meat cuts, stored in controlled atmospheres. Comparison of treatments D and F with D1 and F1 for beef clearly demonstrates the $O_2$ scavengers should be positioned inside the retail tray.

c. Chemical States of Myoglobin

Pork chops in all treatments previously stored with $O_2$ scavengers had 62.0% or more oxymyoglobin and essentially 0.0% metmyoglobin when displayed in air, except in treatments G and H1. Chops in treatment G had 2.1% and chops in treatment H1 had 6.8% metmyoglobin. Beef steaks in treatments containing $O_2$ scavengers had >90.0% oxymyoglobin, and <2.5% metmyoglobin, except in treatment H and G1. Steaks in treatment H had 78.5% oxymyoglobin and 7.8% metmyoglobin; and steaks in treatment G1 had 58.9% oxymyoglobin and 37.3% metmyoglobin, presumably as a result of $O_2$ ingress into the package. This data confirm the visual data and the requirement for $O_2$ scavengers inside the retail tray when master packing display-ready meat cuts in controlled atmospheres.

Experiment 2 a. Oxygen Concentration

The initial $O_2$ concentration in every fifth bag was about 120 ppm. After one week of storage, the $O_2$ concentration in all bags was 0 ppm, except for one bag (Bag 2, treatment H) which contained 2650 ppm $O_2$ and was a "leaker" and was consequently eliminated from further evaluation.

b. Visual and Reflectance Properties

Although significant ($p<0.05$) differences existed between treatments in visual color ratings, all steaks were perceived to be bright cherry red and no differences of practical importance existed. Retail trays containing grids resulted in steaks with greater amounts of surface discoloration. However, no differences in surface discoloration attributable to lidding or over-wrapping were detected. Consequently, steaks in retail trays containing grids were rated less desirable in retail appearance (p<0.05). However, the magnitudes of these differences in retail appearance were approximately 0.8 of a panel unit making them of only marginal practical importance. (FIG. 2B)

Steaks in over-wrapped trays containing a grid had the highest proportions of oxymyoglobin and the lowest proportions of metmyoglobin (p<0.05). Despite this finding, the visual data clearly indicates inclusion of a grid in the tray is not so productive, and the overall data clearly demonstrates similar advantages for either lidding or over-wrapping the trays. Consequently, the most feasible retail packaging system for use with controlled atmosphere, master packaging is the over-wrapped tray containing $O_2$ scavengers underneath an absorbent pad.

Experiment 3 a. Oxygen Concentration

The $O_2$ concentration at packaging was approximately 80 ppm. After 7 days of storage at −1.5° C., the $O_2$ concentration in all bags was 0 ppm.

b. Visual and Reflectance Properties

Steaks in retail trays containing $O_2$ scavengers with absorbing capacity of <600 mL were more discolored than the un-stored controls at all display intervals, but discolored essentially the same rate as the un-stored controls. (FIG. 2C) Steaks in retail trays containing $O_2$ scavengers with 800 mL of absorbing capacity also discolored at essentially the same rate as the un-stored controls, but did not discolor as extensively. Un-stored controls deteriorated rapidly in retail appearance and had a retail case-life of 2.5 days. (FIG. 2D)

Steaks stored with less than or equal to six $O_2$ scavengers resulting in $O_2$ absorbing capacity of less than 600 mL also deteriorated rapidly in retail appearance and had shorter retail-case lives than un-stored controls. Steaks stored with $O_2$ scavengers having absorbing capacity of >600 mL deteriorated more slowly in retail appearance and had retail-case lives in excess of 4 days. (FIG. 2D) The rate of metmyoglobin and oxymyogloin (% oxymyoglobin=100-% metmyoglobin) formation during retail display (FIG. 2E) clearly demonstrates the advantage of using $O_2$ scavengers and indicates a minimum requirement for $O_2$ scavengers with absorbing resulting in an $O_2$ half-life of 0.6-0.7 hours in the pack atmosphere, where the $O_2$ concentration could otherwise remain less than or equal to 500 ppm at any time during storage (a deficiency noted in prior art methods).

c. Discussion

At low temperatures pork color is stable at several hundred ppm of $O_2$. The present study confirmed this finding. Beef, especially PM, discolors even at very low $O_2$ concentrations, which is also evident from the results of the present study. The present results clearly demonstrate $O_2$ scavengers are essential to prevent and/or reduce discoloration in master-packaged meats. The use of $O_2$ scavengers in master packing of pork should provide protection to complement the intrinsic ability of pork muscle tissue to resist oxidative discoloration and may provide increased display life. The use of $O_2$ scavengers reduced $O_2$ concentrations to 0 ppm in most treatments in the present study. The appropriate absorbing capacity of $O_2$ scavengers to be used appears to be >600 mL based upon present results.

Steaks and chops used in the present study were vacuum-packaged and stored for two to three weeks at 2° C. before master packaging, which lowers their metmyoglobin-reducing capacity, and therefore presented a worst-case scenario for centralized packaging operations.

Therefore, greater storage ability should be expected with fresh, un-stored beef or pork. Although pork can probably be master packaged using any treatment-combination with $O_2$ scavengers, the presence of $O_2$ scavengers inside the retail tray appears to be imperative when master packaging beef. Treatments G, G2, H, and H2 were selected as retail packaging systems, which may be commercially adaptable. Additional replicates of each of these treatments were evaluated in part II of the present study to determine the importance of a grid inside the retail tray and to obtain a comparison of lidded and over-wrapped retail trays. Results indicated a grid was not required and there was little difference between lidded and over-wrapped trays. With CAP master-packages, selection of an appropriate retail packaging system should include an assessment of the number of $O_2$ scavengers required in each retail tray to minimize residual $O_2$ concentrations.

High $O_2$-permeable film over-wrap has been shown to act as an $O_2$ barrier at low $O_2$ concentration. Consequently, two isolated systems affect the $O_2$ concentration in the overall package-atmosphere of master packs. The probability of having $O_2$ entrapped inside the retail tray is high due to the absorbent pad and space between over-wrap and edges of the tray.

The amount of $O_2$ absorbing capacity in each retail tray will also dictate the retail display life of meat cuts. Steaks packaged with higher absorbing capacity, i.e., with a high absorbing capacity $O_2$ scavengers tend to have more retail display life than those packaged with low absorbing capacity $O_2$ scavengers. As the present study demonstrated, longer retail display life for steaks packaged with $O_2$ scavengers of absorbing capacity >600 mL are achieved relative to $O_2$ scavengers of low capacity. The higher the absorbing capacity, the shorter the $O_2$ half-life is in the pack atmosphere, resulting in faster removal of residual $O_2$, which in turn prevents transient discoloration. With prevention of transient discoloration, the limited metmyoglobin reducing capacity of the muscle is preserved. This activity further delays development of discoloration during retail display and yields acceptable retail appearance even after four days of retail display, as shown in the present study.

The present study further demonstrated little importance for placing meat cuts on a grid and little advantage for lidding retail-trays. However, $O_2$ scavengers based upon iron chemical system with oxygen absorbing capacity >600 mL must be placed inside the retail trays to attain an $O_2$ concentration of 0 ppm in the pack atmosphere of a master pack of the size 595 ×447 mm. The number of $O_2$ scavengers can vary provided they can provide an $O_2$ half-life of 0.3-0.4 hours in the master pack. Another combination, depending upon the color stability of meat cuts, can be placing some oxygen scavengers in the master pack (outside the retail tray) and only a few in the retail tray. However, the commercial system that can deliver a total storage and shelf-life of retail-ready eat cuts should have clear plastic tray with oxygen scavengers underneath the absorbent pad, and the meat cuts placed on top of the absorbent pad. (FIG. 2D)

Example 3

Prevention of Transient Discoloration of Retail-Ready Beef Cuts

Centrally-prepared retail beef cuts stored in controlled atmospheres containing nearly 100% carbon dioxide ($CO_2$)

or nitrogen ($N_2$), which may have small amounts of $O_2$, are susceptible to the formation of metmyoglobin due to the presence of the residual $O_2$. If the $O_2$ concentration is not excessive, the meat will absorb the residual $O_2$ and any metmyoglobin formed will be reduced to deoxymyoglobin as a result of metmyoglobin reducing activity (MRA) within the muscle tissue. In packaged fresh beef 2-4 days are required for reduction of metmyoglobin to deoxymyoglobin. When stored meat is removed from the controlled atmosphere, it blooms to the desirable, bright, red color associated with freshly cut meat, but this will not occur if a substantial amount of metmyoglobin is present. The MRA of muscle tissue is limited and once exhausted cannot convert any metmyoglobin formed back to myoglobin. This results in inevitable transient discoloration problem.

Transient discoloration of meat is not a major concern when the product is in storage, transit, or both for long periods. However, such discoloration is highly undesirable when commercial conditions require periodic rapid distribution and display of centrally packaged meat. Consequently, premature temporary discoloration limits the advantages of centrally packaged retail ready meat cuts using $O_2$-depleted master packaging technology. Such discoloration is also dependent upon the specific muscle packaged since tissues vary in their capacity to withstand "low" $O_2$ concentrations (<500 ppm). Centrally prepared beefsteaks and ground beef packaged under controlled atmospheres were shown to be susceptible to very low $O_2$ concentrations. Beef muscles with high color stability (LD) are least susceptible to metmyoglobin formation if atmospheres contained <600 ppm of $O_2$ at temperatures <0° C.; however, beef with poor color stability (PM) was highly susceptible to metmyoglobin formation even at very low $O_2$ concentrations and sub-zero temperatures.

The objective of this study was to determine whether $O_2$ absorbent technology might be used in conjunction with CAP to prevent inevitable transient discoloration of PM beef.

Materials and Methods

1. Oxygen Scavengers $O_2$ scavengers, based on iron chemical systems, and having $O_2$ absorbing capacity of at least 10 cc per pound of meat product were used in the study.

2. Master Packaging, Storage, and Sampling of Steaks

Twenty fresh beef tenderloins (psoas major, PM) from animals slaughtered within 24 hours were obtained from a local beef-packing plant. Four 2 cm thick steaks were prepared from each tenderloin and were randomly distributed. Each steak was placed on an absorbent pad of dimensions 152×114 mm in a 216×133×25 mm solid polystyrene tray. $O_2$ scavengers with $O_2$ absorbing capacity of at least 10 cc per pound of meat product were placed underneath the absorbent pad. Each retail tray was over-wrapped with a shrinkable film having an $O_2$ transmission rate of 8000 mL/($m^2$ 24 hour) at 23° C. and 70% relative humidity.

After sealing, the film was shrunk to the tray using a hot-air gun. Two 3-mm holes were made in the film at the corners of the tray to allow free exchange of atmospheres during gas flushing. Four such retail trays were placed in a 595×447 mm bimetalized, plastic laminate pouch. The master packs were evacuated, filled with 4.5 L $N_2$, and sealed using a CAP machine. Eight such master packs were prepared. Similarly, eight master packs, each having four retail trays containing two of another type of $O_2$ scavengers underneath the absorbent pads; and an additional eight master packs, each containing four retail trays with no $O_2$ scavengers (controls), were prepared. Each pack was labeled accordingly.

The master-packaged steaks were stored at 1±0.5° C. On day 0, four retail trays served as fresh controls and were kept for visual evaluation in the retail-display case and to obtain reflectance spectra of the steak surfaces. Three master packs (one having one type and another one having another type of $O_2$ scavengers, and one having no $O_2$ scavenger), were opened at 1 day intervals for 8 days and placed in a retail display case. The $O_2$ concentration in each pack was measured immediately before being opened.

3. Display and Sampling of Retail Trays

All retail trays were placed in the center of the display shelf of a horizontal, fan-assisted retail display case. The PM steaks on display were examined for color, discoloration, and retail appearance at 30-45 min after opening of the master-packs, and reflectance spectra of the steak surfaces were obtained to estimate metmyoglobin, deoxymyoglobin, and oxymyoglobin content.

4. Visual Assessment of Master-Packaged Steaks

A five-member trained panel was used for the subjective evaluation of the steaks. Surface discoloration was evaluated using a seven-point descriptive scale: 1=0% (none), 2=1-10%, 3=11-25%, 4=26-50%, 5=51-75%, 6=76-99%, 7=100%. Retail appearance was assessed using a seven-point hedonic scale: 1=extremely undesirable, 2=undesirable, 3=slightly undesirable, 4=neither desirable nor undesirable, 5=slightly desirable, 6=desirable, 7=extremely desirable.

5. Estimation of Myoglobin States

The average reflectance spectrum was obtained from three locations of the steak covered with a shrinkable film using a reflectance spectrophotometer. Reflectance values (R) of the different myoglobin oxidation states were estimated at specified wavelengths, and converted to K/S values (K is the absorption coefficient and S is the scattering coefficient). The K/S values are used for quantifying the proportion of deoxy-met-, and oxy-myoglobin, and are calculated using selected wavelengths (474, 525, 575, and 610 nm) for fresh meat color. The ratios and wavelengths used for the calculations were: K/S 474÷K/S 525 for percent deoxymyoglobin, K/S 575÷K/S 525 for percent metmyoglobin, and K/S 610÷K/S 525 for percent oxymyoglobin.

5. Statistical Analysis

The effects of treatment differences (control and both types of $O_2$ scavengers) were examined statistically using analysis of variance (proc ANOVA, SAS Institute, Inc., Cary, N.C.) at a level of 0.05. Only the main effects were analyzed.

Results a. Visual Assessment of Steaks

Discoloration: On day 0, all steaks received discoloration scores of 1 (0%: discoloration). After subsequent daily storage intervals, steaks packaged with no $O_2$ scavengers had discoloration scores of either 2 (1-10% discoloration), 3 (11-25% discoloration) or 4 (26-50% discoloration). Steaks packaged with type-one $O_2$ scavengers received a discoloration score of 1 (0% discoloration) after 2, 4, 7, and 8 days, and 2 (1-10% discoloration) after 1, 3, 5, and 6 days. Steaks packaged with type-two $O_2$ scavengers received discoloration scores of 1 (0% discoloration) at storage intervals of 1, 2, 4, 6 and 8 days, and discoloration scores of 2 (1-10% discoloration) at storage intervals of 3, 5, and 7 days (FIG. 3A).

Retail Appearance (RA): On day 0, control steaks received retail appearance scores of 7 (extremely desirable).

After subsequent daily storage intervals, steaks packaged with no $O_2$ scavengers received RA scores of 5 (slightly desirable) or 6 (desirable) after 1, 2, 5, and 7 days. However, these scores were down to 3 (slight undesirable) or 4 (neither desirable nor undesirable) after 3, 4, 6, and 8 days of storage. Steaks packaged with type-one $O_2$ scavengers received RA scores of 6 (desirable) or 7 (extremely desirable) for all storage intervals, and steaks packaged with type-II $O_2$ scavengers received RA scores of 6 or 7 for all storage intervals, except after 7 days when they received RA scores of 5 (slightly desirable) (FIG. 3B).

b. Metmyoglobin on the Steak Surface

Metmyoglobin content was not significantly different for control steaks (with no $O_2$ scavengers) after most storage intervals when compared to fresh controls ($p>0.05$), except after 3 and 7 days. Metmyoglobin content increased from 3.5% on day 0 to 22.8% on day 3, then decreased to 4.7% on day 4, and again increased to 16.1% on day 7 but decreased to 5.2% on day 8. (FIG. 3C) Discoloration was visible at the edges of these steaks for all storage intervals. However, these areas were not exposed during reflectance spectrophotometry, and thus, the reflectance spectra did not report this discoloration, which would have undoubtedly increased the proportion of inetmyoglobin. (FIG. 3C)

Metmyoglobin content of steaks packaged with type-I $O_2$ scavengers was not significantly different when compared to control steaks (steaks packaged with no $O_2$ scavengers), for all storage intervals ($p>0.05$), except after 3 and 7 days of storage. Also, the metmyoglobin content was comparable with that of the fresh control for all storage intervals ($p>0.05$). (FIG. 3C).

The metmyoglobin content of steaks packaged with type-II $O_2$ scavengers was not different when compared with fresh controls and steaks packaged with type-II $O_2$ scavengers, for all storage intervals ($p>0.05$). However, steaks packaged with no $O_2$ scavengers had higher metmyoglobin content than the steaks packaged with type-II $O_2$ scavengers after 3 and 7 days of storage ($p<0.05$). Differences were most noticeable at 2, 3, 6, and 7 days of storage, where the metmyoglobin content of steaks packaged with type-II $O_2$ scavengers was reduced to zero. (FIG. 3C)

Discussion

Reduced $O_2$ concentration has been demonstrated to have an adverse effect on meat color, and PM has been shown to have the least color stability, discoloring rapidly even at very low $O_2$ concentrations (<100 ppm) irrespective of the storage temperature. Consequently, $O_2$ absorbent technology might be used in conjunction with CAP to prevent inevitable transient discoloration, and this constituted the hypothesis of the present study. On day 0, the $O_2$ concentration was 78 ppm and this rose to 477 ppm in master packs without $O_2$ scavengers after 1 day of storage.

Master packs containing $O_2$ scavengers had no measurable $O_2$ at most storage times, except after 1 and 2 days in the case of type-I $O_2$ scavengers. As a consequence, steaks with $O_2$ scavengers had low metmyoglobin content and almost no discoloration, which resulted in significantly higher RA scores. Steaks packaged without $O_2$ scavengers had an increase in metmyoglobin content from day 0 to day 3 of storage. After 4 days storage, metmyoglobin content decreased, but then gradually increased until after 7 days storage, when it decreased again. This indicated these steaks underwent two cycles of transient discoloration, regaining color due to MRA or other reducing factors.

Steaks packaged with $O_2$ scavengers did not undergo such transient discoloration. Moreover, steaks packaged with type-II $O_2$ scavengers had lower metmyoglobin content than the fresh control after all storage intervals, and metmyoglobin content was reduced to zero in some cases. In the present study, PM steaks expected to have poor color stability were used, but, very low metmyoglobin contents and high RA scores were observed in samples packaged with $O_2$ scavengers. Thus, the hypothesis of combining $O_2$ absorbent technology with CAP to prevent transient discoloration was proven. (FIGS. 3B and 3C)

The $O_2$ concentration during initial packaging was 78 ppm, and it went up to 477 ppm after 1 day of storage. Therefore the amount of time required to reduce the $O_2$ concentration from 477 ppm to 0 ppm would be almost four times the half-life of $O_2$ in the package atmosphere. For type-I and type-II $O_2$ scavengers, incorporating the number of scavengers used in the study, the $O_2$ half-life is 0.31 and 0.65 hours, respectively (Example 1). Steaks will also contribute to the total $O_2$ absorbing capacity to some extent (<10%). Thus, at $1\pm0.5°$ C., transient discoloration of PM steaks can be prevented if residual $O_2$ is reduced to 0 ppm within 3 hours of pack closure.

Selection of a suitable retail-packaging system is another critical aspect of master packaging technology using CAP. It is evident from the results of the present study that the $O_2$ concentration in the master pack may initially increase drastically after packaging. Such an increase may be attributed to $O_2$ entrapment either in the absorbent pad or under the over-wrap film during evacuation. In addition, meat tissue itself initially releases dissolved, unreacted $O_2$ causing reduction of oxymyoglobin to deoxymyoglobin in the presence of low partial pressures of $O_2$ in the head space during CAP storage. This increase is inevitable. Therefore, $O_2$ entrapment must be minimized to prevent $O_2$ concentrations increasing in the pack to the point where transient discoloration may occur.

It has been found that over-wrap film with high $O_2$ permeability acts as an $O_2$ barrier at low initial $O_2$ concentrations (Example 1), and the barrier property increases at low storage temperatures. It is also evident that $O_2$ concentration may increase due to entrapment of $O_2$ in either the absorbent pad or the over-wrap. It is recommended that each retail tray within the master pack contain $O_2$ scavengers to absorb any $O_2$ entrapped inside tray, which may affect meat color. Less discoloration occurs on steak surfaces in a system where $O_2$ scavengers are placed in the master pack. Placing $O_2$ scavengers directly inside the retail tray will also reduce the number of $O_2$ scavengers required.

The present work was designed to examine meat samples with the highest pigment instability stored under conditions conducive to discoloration during centralized distribution. Beef (PM) was placed in over-wrapped retail trays (which may have $O_2$ entrapped in the absorbent pad or over-wrap or both). Although a storage temperature of $1\pm0.5°$ C. is not recommended to optimize storage life of fresh meat cuts in centralized systems, it is closer to the optimum ($-1.5°$ C.) than the commercial norm. Rates of myoglobin oxidation and metmyoglobin reducing activity increase and decrease, respectively, at temperatures above $0°$ C. Thus, better results can be expected at $-1.5°$ C. Nevertheless, under worst-case conditions, the use of $O_2$ scavengers in conjunction with CAP prevented transient discoloration of PM beefsteaks. It is probable that the system used in the present study will easily prevent transient discoloration in beef steaks with higher color stability, such as LD, especially if stored below $0°$ C. Oxygen scavengers should prevent transient discoloration of all centrally prepared beef cuts, but, factors such as selection of packaging systems, $O_2$ scavenger type, and package atmospheres ($N_2/CO_2$) may affect results.

Example 4

Total Shelf Life of Retail-Ready Meat Cuts Using the Designed Packaging System and Optimized Oxygen Absorption Technology Exploration of an appropriate master-packaging system, which will minimize both color instability and microbial spoilage, is imperative for centralized meat operations. Although research has been done on microbiological and sensory aspects of meat during centralized meat packaging under various modified atmospheres, meat discoloration due to residual $O_2$ in controlled atmospheres remained a challenge as the rate of metmyoglobin formation increases at low partial pressures of $O_2$.

Beef steaks made from muscles of poor color stability, such as psoas major (PM), discolor rapidly even at $O_2$ concentrations of <100 ppm and sub-zero temperatures, resulting in short storage life in CAP followed by short display life. Consequently, application of oxygen absorption technology in conjunction with CAP became an attractive option. In addition, a suitable retail packaging system is required to reduce residual $O_2$ in the controlled atmospheres due to the possibility of $O_2$ entrapment within retail trays. The objective of the present study was to examine the storage and retail display life of master packaged beef steaks (PM) stored under 100% nitrogen atmosphere along with $O_2$ absorbents at $-1.5°$ C.

Materials and Methods

1. Oxygen Scavengers $O_2$ scavengers, based on iron chemical system, were used in the study. The $O_2$ absorbing capacity was at least 10 mL per pound of meat.

2. Master Packaging, Storage, and Sampling of Steaks

Fresh beef tenderloins (psoas major, PM) from animals slaughtered 24 hours previously were obtained from a local beef abattoir. Eighty steaks of 2 cm thickness were prepared from these tenderloins. Each steak was placed on a 152×114 mm absorbent pad in a 216×133×25 mm (L×W×H) solid polystyrene tray with $O_2$ scavengers having $O_2$ absorbing capacity of at least 10 mL per pound placed underneath the absorbent pad. Each retail tray was over-wrapped with a shrinkable $O_2$ permeable film with an $O_2$ transmission rate of 8000 mL/$m^2$ per 24 hours at 23° C., 70% relative humidity, and atmospheric pressure. After sealing, the film was shrunk to the tray using a hot-air gun. Then, two 3-mm holes were made at the opposite corners of the tray to allow for exchange of atmospheres during gas flushing. Four such retail trays were placed in an EVA co-extruded master pack with $O_2$ transmission-rate of 0.55 mL/$m^2$ per 24 hours at 23° C., 70% relative humidity, and atmospheric pressure. The bags were evacuated, filled with 4.5 L of $N_2$, and sealed using a CAP machine. Twenty such bags were prepared. Additionally, 8 retail trays were prepared and treated as un-stored controls.

The master packs were stored at $-1.5\pm0.5°$ C. On week 0 and day 0 of retail display, four steaks in retail trays, serving as fresh, un-stored controls, were analyzed for visual, odor, taste, and microbial characteristics. Also, reflectance spectra were obtained from the surface of these steaks. The visual analysis was done daily for 4 days, and similarly reflectance spectra were obtained daily. On day 4 of retail display, odor, taste, and microbial analyses were done in addition to visual examination and reflectance spectra measurements. Two master packs were opened at subsequent 1 week storage intervals for 10 weeks. The $O_2$ concentration in each bag was measured immediately before opening the bag.

Master-bags containing meat cuts and oxygen scavengers having oxygen absorbing capacity of at least 10 mL per pound of meats, placed only outside the meat-trays, were also prepared. The over-wrap film of the meat-trays had at least one hole of less than 5 mm diameter. Such master-bags were flushed-back with a gas-mixture containing 64.6% Nitrogen, 0.4% CO, and 35% $CO_2$.

3. Display and Sampling of Retail Trays

Upon removal from primary CAP storage at weekly intervals, and on day 0 of retail display, master packaging was removed and each group of 8 retail trays was placed in the center of the display shelf:

The displayed PM steaks were examined for color, discoloration, retail-acceptability, off odor intensity, odor acceptability, and odor description, 45 min after opening of the master-packages. Also, reflectance spectra from the steak surfaces were obtained to estimate metmyoglobin, deoxymyoglobin, and oxymyoglobin. After visual scores and reflectance spectra were obtained, two steaks (one from each master bag) were removed from the display case, and samples were taken for microbial analysis. Then the steaks were cooked and analyzed for flavor acceptability and off-flavor intensity.

The remaining six steaks were left in the display case, and were examined for visual characteristics at subsequent intervals of 24 hours and reflectance spectra at 12 hours for 96 hours. After 96 hours of retail display, the steaks were analyzed in a similar fashion as on day 0 of retail display. During sensory evaluation, the samples remained in the display case and the well-trained panelists made judgments independently. A similar procedure was repeated for all storage intervals.

4. Visual Assessment of Master-Packaged Steaks

A five-member panel was used for the subjective evaluation of the steaks. Color scores were assessed using an eight-point descriptive scale: 0=Completely discolored, 1=White, 2=Pale pink, 3=Pink, 4=Pale red, 5=Bright cherry red, 6=Slightly dark red, 7=Moderately dark red, 8=Extremely dark red. Surface discoloration was evaluated using a seven-point descriptive scale: 1=0% (none), 2=1-10%, 3=11-25%, 4=26-50%, 5=51-75%, 6=76-99%, 7=100%. Retail appearance was assessed on a seven-point hedonic scale: 1=Extremely undesirable, 2=Undesirable, 3=Slightly undesirable, 4=Neither desirable nor undesirable, 5=Slightly desirable, 6=Desirable, 7=Extremely desirable.

5. Odor Assessments of Master-Packaged Steaks

A five-member panel was used for the odor assessment. Off odor intensity scores were assessed using a four-point descriptive scale: 1=No off odor, 2=Slight off odor, 3=Moderate off odor, 4=Prevalent off odor; odor acceptability scores were assessed using a five-point scale: 1=Acceptable, 2=Slightly acceptable, 3=Neither acceptable nor unacceptable, 4=Slightly unacceptable, 5=Unacceptable; and off odor description scores were assessed using a six-point scale: 1=Sour-sulfur rotten eggs), 2=Sour-lactic acid, 3=Putrid, 4=Dirty socks, 5=Floral/Fruity, 6=Other.

6. Microbial Analysis

A 10 $cm^2$ sample was obtained at each sampling time (on day 0 and 4 of each storage interval) from each of the two steaks using a sterile cork borer. Then, the sample was placed into a stomacher bag with 10 mL of 0.1% peptone solution and was massaged for 120 seconds using a commercial stomacher, yielding a dilution of $10°$. The homogenate was further diluted 10-, 100-, 10,000-, and 100,000-fold, after which 0.1 mL volumes of undiluted homogenate and of each dilution were prepared and were spread on duplicate plates of APT. The plates were incubated aerobically for 3 days at 25° C. The micro flora was determined from plates bearing 20-200 colonies.

7. Statistical Analysis

The main effects of storage interval and retail display period were examined statistically using analysis of variance (proc ANOVA, SAS Institute Inc., Cary, N.C.) at an a level of 0.05.

Results a. Measurement of $O_2$ Concentration

The $O_2$ concentration was <100 ppm at initial packaging, and after any CAP storage interval it was reduced to 0 ppm, except after 8 weeks storage when 24 ppm of $O_2$ was measured in one bag.

b. Evaluation of Steaks

Although significant ($p<0.05$) differences existed between CAP storage intervals in visual color rating on day 0 of retail display, that is, when steaks were removed from storage, all steaks were perceived to be bright cherry red or slightly dark red and no differences of practical importance existed. Generally, steaks remained stable in color until they became extremely dark (FIG. 4A) or completely discolored (data not shown) on the fourth day of retail display for any storage interval. Due to a leak in the master pack, steaks were completely discolored on day 1 of retail display after 1 week of storage. These steaks were removed from retail display and not analyzed further.

On day 0 of retail display for any CAP storage interval, no significant ($p>0.05$) surface discoloration was reported on the steaks. The retail display period significantly ($p<0.05$) increased the amount of surface discoloration on the steaks for any CAP storage interval. However, the steaks discolored at a faster rate than the un-stored controls for all storage intervals, and were relatively extensively discolored ($p<0.05$). (FIG. 4B)

Steaks were extremely desirable in retail appearance on day 0 of retail display for any storage interval ($p>0.05$). Despite the fact that they deteriorated more rapidly in retail appearance than the un-stored controls, they were still in the acceptable range (about 3.5) on the third day of retail display. (FIG. 4C)

From a practical perspective, steaks were perceived to have no off-odors on day 0 of retail display for any storage interval, however, significant differences existed between storage intervals with respect to off odor intensity ratings ($p<0.05$). The maximum difference in ratings was 0.3 of a panel unit, which is of marginal practical importance. Even on day 4 of retail display, only slight off odors were reported. (FIG. 4D) Generally, odor of steaks was acceptable on day 0 of retail display. (FIG. 4e) Maximum differences of 0.3 of a panel unit were noticed after 7 and 8 weeks of CAP storage, which has little practical significance. Despite significant ($p<0.05$) differences between storage intervals on odor acceptability ratings of day 4 of retail display, all steaks were perceived to be slightly acceptable. (FIG. 4E)

Despite differences ($p<0.05$) between CAP storage intervals on microbial numbers at day 0 of retail display, steaks had <$10^2$ cfu/cm$^2$ of total organisms, and no differences of practical importance existed. In most cases, microbial numbers were comparable with those of un-stored controls. (FIG. 4F) On day 4 of retail display, microbial numbers were <100 cfu/cm$^2$ in all cases. (FIG. 4F) When opened, meat-cuts in master-bags containing 0.4% CO bloomed quickly when compared with meat-cuts in master-bags containing 100% nitrogen.

c. Discussion

Centrally prepared retail beef cuts stored in controlled atmospheres containing nearly 100% carbon dioxide ($CO_2$) or nitrogen ($N_2$), which may have small amounts of residual $O_2$, are susceptible to the formation of metmyoglobin due to the presence of the residual $O_2$. If the $O_2$ concentration is not excessive, the meat tissue will metabolize some of the residual $O_2$ and any metmyoglobin formed will be reduced to deoxymyoglobin as a result of metmyoglobin reducing activity (MRA) within the muscle tissue.

In packaged fresh beef, 2-4 days are required for reduction of metmyoglobin to deoxymyoglobin. When stored meat is removed from the controlled atmosphere, it blooms to the desirable, bright red color associated with freshly cut meat, but this will not occur if a substantial amount of metmyoglobin is present. The MRA of muscle tissue is limited in stability and once exhausted is not available to convert metmyoglobin back to deoxymyoglobin.

To overcome this disadvantage and address the issue of transient discoloration during CAP storage of fresh beef, the present work was undertaken to combine the efficacies of CAP storage of fresh beef and $O_2$ absorbent technology and demonstrate the shelf life extension of retail-ready fresh beef under these conditions. Tenderloins are known to have very poor color stability and discolor rapidly even at very low $O_2$ concentrations and at a storage temperature of $-1.5\pm0.5°$ C. The effect of intermuscular differences on color stability adds another variable that complicates continuous prevention of meat discoloration. Biochemical factors, such as oxygen consumption rate (OCR) and MRA, have been reported to be different for different muscles. Therefore, the system was tested using a beef muscle type that had poor color stability and represented a worst-case challenge for centralized meat operations.

The performance of $O_2$ absorbent technology was also put on test during this study for its ability to prevent transient discoloration by rapidly reducing the residual $O_2$ concentration to essentially 0 ppm, and thereby preserving the limited MRA of muscle. Retained MRA may further enhance retail display life of steaks. It is also true that steaks packaged with an optimum $O_2$ absorbing capacity have more retail display life when compared with steaks packaged without such capacity. Thus, the system used in the present study was believed to have the capability to provide solutions for the major problems of residual $O_2$ concentrations encountered in centralized fresh meat distribution.

For all CAP storage intervals, the steaks had acceptable visual, odor, and flavor scores on day 0 of retail display. Additionally, metmyoglobin content and microbial growth were minimal and in some cases even lower than in fresh controls on the day packs were opened and displayed. Along with a low storage temperature of $-1.5\pm0.5°$ C., an important factor influencing microbial content was low initial microbial load. Beef tenderloins were used in the study, and these muscles are internally located and do not undergo much handling by meat-cutters as compared to other cuts. This protects them to some extent from cross-contamination, and hence yields low initial microbial load. The meat cuts used in the present study had very low initial microbial numbers, which would have delayed onset of spoilage levels of microorganisms, and thus may have reduced the occurrence of off-odors. It was not surprising that microbial growth and odor did not limit CAP storage and retail display life of steaks.

Due to the increased solubility of $O_2$ and reduction in the partial pressure of $O_2$ required for maximal metmyoglobin formation at sub-zero temperatures, maximum discoloration occurred several millimeters below the meat surface. Since meat is translucent, such discoloration is normally visible. The deeper in the tissue metmyoglobin occurs, the lower is its visibility, and this resulted in low levels of discernable discoloration and higher retail appearance scores during retail display. Also, use of optimum $O_2$ absorbing capacity in each retail tray prevented transient discoloration of beefsteaks, which probably retained MRA and delayed discoloration further. Prevention of such transient discoloration has been reported above. The combination of these hurdles resulted in reduced discoloration even on day 3 of the retail display period. Since the bright-red color of meat was restored, the steaks received acceptable retail appearance scores on day 3 of retail display for any CAP storage interval, after which the meat was in an unacceptable range. Thus, visual characteristics seem to be the limiting factor for acceptability of steaks.

Steaks had a slight off-flavor on day 0 of retail display after 8 weeks CAP storage and onwards. Considering the intrinsic variability in meat cuts, such slight deterioration of flavor and odor may be of no practical importance.

The relative success of the system used in the present study is noteworthy considering the poor color stability of PM muscle. The system is able to deliver longer CAP storage with longer subsequent retail display life if beef muscles with higher color stability are used. It can be conservatively concluded that the present system has the capability of providing a 10 week CAP storage life with a subsequent 3 day retail display life for centrally prepared beef tenderloin steaks. Master-bags filled with 0.4% CO will certainly need oxygen scavengers placed outside the meat-trays.

Example 5

Shelf Life Extension of Lamb Chops Utilizing Zero-Oxygen Tech

1. Master-Packaging, Storage, and Sampling of Steaks

Fresh lamb primal cuts from animals slaughtered 24 hours previously, were obtained from a lamb abattoir. Eighty chops of 2-cm thickness were prepared from these cuts. Each chop was placed on an absorbent pad and a foam tray, with $O_2$ scavengers having an absorption capacity of at least 10 cc (e.g. 10 mL) per pound placed underneath the absorbent pad. Each retail tray was over-wrapped with a shrinkable $O_2$ permeable film with an $O_2$ transmission rate of 8000 mL per $m^2$ per 24 hours at 23° C., 70% relative humidity, and atmospheric pressure. After sealing, the film was shrunk to the tray using a hot-air gun. One 3-mm hole was made at the opposite corners of the tray. Four such retail trays were placed in a master pack with $O_2$ transmission-rate of 0.55 mL per $m^2$ per 24 hours at 23° C., 70% relative humidity, and atmospheric pressure. Master bags containing $O_2$ scavengers outside the meat trays and inside the master bag were also prepared.

The bags were evacuated, filled with 4.5 L of $N_2$ and sealed using a CAP machine. Ten such bags were prepared. Similarly, ten such packages were prepared by using plastic trays instead of foam trays. During initial packaging, the $O_2$ concentration was measured in every fifth bag by using an $O_2$ analyzer (Mocon MS-750, Modern Controls Inc., Minneapolis, Minn.), which uses a solid state $O_2$ ion conduction material, zirconium oxide. The $O_2$ analyzer had an accuracy of ±5 ppm in the 0 ppm to 1000-ppm range, ±0.05% in the 0.1% to 10% range, and ±0.1% in the 10% to 100% ranges for $O_2$ concentrations. The resolution of the analyzer was smaller than the accuracy; that is, in the 0 to 1000 ppm $O_2$ concentration range the resolution was 1 ppm.

The master packs were stored at −1.5° C. Two master packs (one containing foam trays and the other containing plastic trays) were opened at subsequent 1 week storage intervals for 8 weeks. The $O_2$ concentration in each bag was measured immediately before opening the bag. Master bags containing meat cuts and oxygen scavengers having oxygen absorbing capacity of at least 10 cc per pound of meats, placed only outside the meat-trays, were also prepared. The over-wrap film of the meat-trays had at least one hole of less than 5 mm diameter. Such master-bags were flushed-back with a gas-mixture containing 64.6% Nitrogen, 0.4% CO, and 35% $CO_2$.

2. Display and Sampling of Retail Trays

Upon removal from primary CAP storage at weekly intervals, and on day 0 of retail display, master packaging was removed and each group of 8 retail trays was placed for sensory analysis. The displayed chops were examined for color, discoloration, retail-acceptability, off odor intensity, odor acceptability, and odor description, 20 min after opening of the master-packages. After visual and odor scores were obtained, two chops (one from each master bag) were removed from the display case, and samples were taken for microbial analysis. A similar procedure was repeated for all storage intervals.

3. Visual Assessment of Master-Packaged Lamb Chops

A three-four-member panel was used for the subjective evaluation of the steaks. Color scores were assessed using an eight point descriptive scale: 0=Completely discolored, 1=White, 2=Pale pink, 3=Pink, 4=Pale red, 5=Bright cherry red, 6=Slightly dark red, 7=Moderately dark red, 8=Extremely dark red. Surface discoloration was evaluated using a seven point descriptive scale: 1=0% (none), 2=1-10%, 3=11-25%, 4=26-50%, 5=51-75%, 6=76-99%, 7=100%. Retail appearance was assessed on a seven point hedonic scale: 1=Extremely undesirable, 2=Undesirable, 3=Slightly undesirable, 4=Neither desirable nor undesirable, 5=Slightly desirable, 6=Desirable, 7=Extremely desirable.

4. Odor Assessments of Master-Packaged Lamb Chops

A three to four-member panel was used for the odor assessment. Off odor intensity scores were assessed using a four point descriptive scale: 1=No off odor, 2=Slight off odor, 3=Moderate off odor, 4=Prevalent off odor; odor acceptability scores were assessed using a five-point scale: 1=Acceptable, 2=Slightly acceptable, 3=Neither acceptable nor unacceptable, 4=Slightly unacceptable, 5=Unacceptable; and off odor description scores were assessed using a six-point scale: 1=Sour-sulfur (rotten eggs), 2=Sour-lactic acid, 3=Putrid, 4=Dirty socks, 5=Floral/Fruity, 6=Other.

5. Flavor Assessment of Master-Packaged Lamb Chops

The lamb chops were cooked the lamb chops after 27 and 55 days of storage for flavor assessment.

6. Microbial Assessment

Analysis of the lamb chops, after every weekly storage interval, for aerobic, anaerobic, *E. coli*, Listeria, and Salmonella was performed.

Results a. Oxygen Concentration

The oxygen concentrations in the master packages were in the range of 0.5% immediately after packaging which went up to 2-5% within a few minutes of gas flushing and sealing. The oxygen concentration was reported to be 0 for each weekly storage interval.

b. Visual, Odor, Microbial and Flavor Assessment

The lamb chops had bright red to dark red color, zero to minimal discoloration, extremely acceptable appearance, and no off-odor for all the storage and display time intervals. (FIGS. 5CI-5J) The microbial load showed a gradual increase in the count, with no detrimental effect to the meat quality. Also, pathogen-growths were negative for all storage intervals. (FIGS. 5A-5B) The flavor was assessed to be extremely acceptable after 27 days of storage.

c. Discussion

The lamb chops were extremely desirable for all storage intervals and display periods. The testing showed no difference between chops packaged in plastic and foam trays with all having retail acceptability and no odor throughout the display period. (FIGS. 5C-I-5J) No substantial difference in desirability was reported for lamb cuts in the master bags with $O_2$ scavengers in meat trays or in master bags with $O_2$ scavengers placed only outside the meat trays; i.e. in the mater bags. It is believed this is due to preventing the metmyoglobin reducing activity of the muscle by absorbing the oxygen rapidly to zero levels. This enhances the display life of centrally prepared retail ready meat cuts. In addition, a nitrogen atmosphere provides an anaerobic atmosphere, and helps in reblooming of the meat once removed from the master package. When opened, meat-cuts in master bags containing 0.4% CO bloomed quickly when compared with meat-cuts in master-bags containing 100% nitrogen. Master bags filled with 0.4% CO will certainly need oxygen scavengers placed outside the meat-trays.

The zero oxygen packaging system for centralized meat operations extends the available display and storage times for the meat. A storage life of 8+ weeks with a subsequent display life of 4+ days was obtained for centrally prepared retail ready lamb chops by employing zero oxygen storage.

Example 6

Shelf Life Extension of Pork Chops by Employing "Zero Oxygen Packaging System"

1. Master Packaging, Storing, and Sampling of Pork Chops

Fresh pork loins from animals slaughtered 24 hours previously, were obtained from a local beef abattoir. One hundred and twenty chops of 2 cm thickness, were prepared from these porkloins. Each pork chop was placed on a 152×114 mm absorbent pad in a 216×133×25 mm (L×W×H) solid polystyrene tray with $O_2$ scavengers of $O_2$ absorption capacity of at least 10 mL per pound of meat placed underneath the chop. Master bags where $O_2$ scavengers were placed only outside the meat trays were also prepared. Each retail tray was over-wrapped with a shrinkable $O_2$ permeable film with an $O_2$ transmission rate of 800 mL/m² per 24 hours at 23° C., 70% relative humidity, and atmospheric pressure. After sealing, the film was shrunk to the tray using a hot-air gun. Then, two 3-mm holes were made at the opposite corners of the tray to allow free exchange of atmospheres during gas flushing. Four such retail trays were placed in an EVA co-extruded master pack with $O_2$ transmission-rate of 0.55 mL/m² per 24 hours at 23° C., 70% relative humidity, and atmospheric pressure. The bags were evacuated, filled with 4.5 L of $N_2$, and sealed using a CAP machine. Thirty such bags were prepared. An additional 8 retail trays were prepared and treated as un-stored controls.

The master packs were stored at −1.5±0.5° C. On week 0 and day 0 of retail display, four steaks in retail trays, serving as fresh, un-stored controls, were analyzed for visual, odor, taste, and microbial characteristics. The visual analysis was done daily for 6 days. On day 6 of retail display, odor, taste, and microbial analyses were done in addition to visual examination. Two master packs were opened at subsequent 1 week storage intervals for 15 weeks. The $O_2$ concentration in each bag was measured immediately before opening the bag. Master bags containing meat cuts and oxygen scavengers having oxygen absorbing capacity of at least 10 cc per pound of meats, placed only outside the meat-trays, were also prepared. The over-wrap film of the meat-trays had at least one hole of less than 5 mm diameter. Such master-bags were flushed-back with a gas-mixture containing 64.6% Nitrogen, 0.4% CO, and 35% $CO_2$.

2. Display and Sampling of Retail Trays

Upon removal from primary CAP stroage at weekly intervals, and on day 0 of retail display, master packaging was removed and each group of 8 retail trays was placed in the center of the display shelf. The displayed pork chops were examined for color, discoloration, retail-acceptability, off odor intensity, odor acceptability, and odor description, 45 min after opening of the master-packages.

After visual scores were obtained, two chops (one from each master bag) were removed from the display case, and samples were taken for microbial analysis. The remaining six chops were left in the display case, and were examined for visual characteristics at subsequent intervals of 24 hours and reflectance spectra at 12 hours for 96 hours. After 144 hours of retail display, the chops were analyzed in a similar fashion as on day 0 of retail display. During sensory evaluation, the samples remained in the display case and the well-trained panelists made judgments independently. A similar procedure was repeated for all storage intervals.

3. Visual Assessment of Master-Packaged Chops

A five-member panel was used for the subjective evaluation of the steaks. Color scores were assessed using an five-point descriptive scale: 0=Completely discolored, 1=Extremely pale, 2=Pale, 3=Normal, 4=Dark, 5=Extremely dark. Surface discoloration was evaluated using a seven-point descriptive scale: 1=0% (none), 2=1-10%, 3=11-25%, 4=26-50%, 5=51-75%, 6=76-99%, 7=100%. Retail appearance was assessed on a seven-point hedonic scale: 1=Extremely undesirable, 2=Undesirable, 3=Slightly undesirable, 4=Neither desirable nor undesirable, 5=Slightly desirable, 6=Desirable, 7=Extremely desirable.

4. Odor Assessments of Master-Packaged Chops

A five-member panel was used for the odor assessment. Off odor intensity scores were assessed using a four-point descriptive scale: 1=No off odor, 2=Slight off odor, 3=Moderate off odor, 4=Prevalent off odor, odor acceptability scores were assessed using a five-point scale: 1=Acceptable, 2=Slightly acceptable, 3=Neither acceptable nor unacceptable, 4=Slightly unacceptable, 5=Unacceptable; and off odor description scores were assessed using a six-point scale: 1=Sour-sulfur (rotten eggs), 2=Sour-lactic acid, 3=Putrid, 4=Dirty socks, 5=Floral/Fruity, 6=other.

5. Microbial Analysis

A 10 cm² sample was obtained at each sampling time (on day 0 and 4 of each storage interval) from each of the two chops using a sterile cork borer. Then, the sample was placed into a stomacher bag with 10 mL of 0.1% peptone solution and was massaged for 120 seconds using a commercial stomacher, yielding a dilution of $10^0$. The homogenate was further diluted 10-, 100-, 1000-, 10000-, and 100,000-fold, after which 0.1 mL volumes of undiluted homogenate and of each dilution were prepared and the spread on duplicate plates of APT. The plates were incubated aerobically for 3 days at 25° C. The micro flora was determined from plates bearing 20-200 colonies. (FIG. 6F)

Results
 a. Measurement of $O_2$ Concentration
 The $O_2$ concentration was 5% at initial packaging, and after a CAP storage interval it was reduced to 0 ppm. The oxygen concentration was down to 0 ppm within three hours of master pack closure.
 b. Evaluation of Chops
 A storage life of at least 15 weeks and a retail display life of at least six days for pork chops packaged by employing "zero oxygen packaging systems approach" were obtained. (FIGS. 6A-6F) When opened, meat-cuts in master-bags containing 0.4% CO bloomed quickly when compared with meat-cuts in master-bags containing 100% nitrogen. Master bags filled with 0.4% CO will certainly need oxygen scavengers placed outside the meat-trays.
 It is interesting to note that the visual and microbial characteristics of the pork chops remained in an acceptable condition even after such a long storage in cooler and at retail display case.

Example 7

Shelf Life Extension of Chicken Using "Zero-Oxygen Technology"

1. Master Packaging, Storing, and Sampling of Chicken
 Different treatment of birds slaughtered <48 hours, were obtained. Either full bird or different pieces of bird with $O_2$ scavengers of $O_2$ absorption capacity of at least 10 mL per pound of bird and CO2 generator with the generation capacity of 15-20 liters of CO2 over period of 4 days were placed in master bags. Master-bags containing bird and/or different bird pieces on trays over-wrapped with a shrinkable $O_2$ permeable film with an $O_2$ transmission rate of 800 mL/m$^2$ per 24 hours at 23° C., 70% relative humidity, and atmospheric pressure with appropriate $O_2$ scavengers and CO2 generators were also prepared. Similar master-bags were prepared with only oxygen scavengers, and no CO2 generators. After sealing, the film was shrunk to the tray using a hot-air gun. Then, two 3-mm holes were made at the opposite corners of the tray to allow free exchange of atmospheres during gas flushing. The bags were evacuated, filled with atleast 5 liters of $CO_2$, and sealed using a Controlled Atmosphere Packaging machine. A minimum of thirty such master bags, either containing birds and pieces or containing retail-trays with birds and pieces were prepared. An additional 8 master-bags of each type were prepared and treated as un-stored controls. Both peracetic acid [PAA] and non-PAA treated poultry birds were used in the study.
 The master packs were stored at 28-40 F. On week 0 and day 0 of retail display, four poultry pieces in retail trays, serving as fresh, un-stored controls, were analyzed for visual, odor, taste, and microbial characteristics. The visual analysis was done daily for 6 days. On day 6 of retail display, odor, taste, and microbial analyses were done in addition to visual examination. Two master packs were opened at subsequent 1 week storage intervals for 6 weeks. The $O_2$ concentration in each bag was measured immediately before opening the bag.
 2. Display and Sampling of Products
 Upon removal from primary CAP stroage at weekly intervals, and on day 0 of retail display, master packaging was removed and each group of 8 retail trays was placed in the center of the display shelf. The displayed pork chops were examined for color, discoloration, retail-acceptability, off odor intensity, odor acceptability, and odor description, 45 min after opening of the master-packages.

3. Visual Assessment of Master-Packaged Birds
 A five-member panel was used for the subjective evaluation of the steaks. Color scores were assessed using an five-point descriptive scale: 0=Completely discolored, 1=Extremely pale, 2=Pale, 3=Normal, 4=Dark, 5=Extremely dark. Surface discoloration was evaluated using a seven-point descriptive scale: 1=0% (none), 2=1-10%, 3=11-25%, 4=26-50%, 5=51-75%, 6=76-99%, 7=100%. Retail appearance was assessed on a seven-point hedonic scale: 1=Extremely undesirable, 2=Undesirable, 3=Slightly undesirable, 4=Neither desirable nor undesirable, 5=Slightly desirable, 6=Desirable, 7=Extremely desirable.
 4. Odor Assessments of Master-Packaged Birds
 A five-member panel was used for the odor assessment. Off odor intensity scores were assessed using a four-point descriptive scale: 1=No off odor, 2=Slight off odor, 3=Moderate off odor, 4=Prevalent off odor, odor acceptability scores were assessed using a five-point scale: 1=Acceptable, 2=Slightly acceptable, 3=Neither acceptable nor unacceptable, 4=Slightly unacceptable, 5=Unacceptable; and off odor description scores were assessed using a six-point scale: 1=Sour-sulfur (rotten eggs), 2=Sour-lactic acid, 3=Putrid, 4=Dirty socks, 5=Floral/Fruity, 6=other.
 5. Microbial Analysis
 A 10 cm$^2$ sample was obtained at each sampling time (on day 0 and 4 of each storage interval) from each of the two chops using a sterile cork borer. Then, the sample was placed into a stomacher bag with 10 mL of 0.1% peptone solution and was massaged for 120 seconds using a commercial stomacher, yielding a dilution of 10°. The homogenate was further diluted 10-, 100-, 1000-, 10000-, and 100,000-fold, after which 0.1 mL volumes of undiluted homogenate and of each dilution were prepared and the spread on duplicate plates of APT. The plates were incubated aerobically for 3 days at 25° C. The micro flora was determined from plates bearing 20-200 colonies.
Results
 a. Measurement of $O_2$ Concentration
 The $O_2$ concentration was 8% at initial packaging, and after a CAP storage interval it was reduced to 0 ppm. The oxygen concentration was down to 0 ppm within 24 hours of master pack closure, and remained 0 ppm throughout the testing period of 6 weeks.
 b. Evaluation of Birds and Pieces
 A storage life of 6 weeks and a retail display life of at least six days for birds and pieces in trays packaged by employing "zero oxygen packaging systems approach" were obtained, in both instances, where both oxygen scavengers and CO2 generators were used OR where only oxygen scavengers were used. Master-bags containing both CO2 generators and Oxygen scavengers had better retention of CO2 levels in the bag, however, the microbial-growth level was similar in both instances. The Aerobic and Anaerobic plate count of bacteria remained less than 6 logs throughout the storage time of 6 weeks. Both, PAA treated and non-PAA treated poultry showed shelf-life extension using the current invention.

Example 8

Shelf-Life Extension of Deli-Birds Using Zero-OxTech® Process

Purpose and Objective: The purpose and objective of this study was to extend the shelf-life of small birds to a 21+ day shelf-life using Zero-OxTech®.

Project Design:

Small birds were collected from and packaged <48 hours postmortem. Birds were placed into one of two treatments. The first treatment was the control group, which was packaged using the current CVP system with the addition of a high barrier bag (Zero-OxTech® bag). The second treatment used current CVP equipment using a high barrier Zero-OxTech® bag, Zero-OxTech® $CO_2$ generator and six Zero-OxTech® $O_2$ scavengers. Both treatments were stored for up to 28 days after packaging and tested for aerobic plate counts (APC), lactic acid bacteria, and anaerobic plate counts on days 2, 14, 16, 19, 21, 23, 26, and 28. In addition, pH and headspace were measured on the previously mentioned days. All tests were done in duplicates. All products were stored under refrigeration.

Results:

Below are the results for aerobic plate counts, anaerobic plate counts, and lactic acid bacteria for Deli Bird shelf-life extension. The two treatments in this study included the currently used CVP system with a high barrier Zero-OxTech® bag and Zero-OxTech® process (high barrier bag, $CO_2$ generator and oxygen scavenger) with current CVP equipment. By utilizing the existing equipment with a few changes would allow for a smoother transition. There are added costs with the MAP system and evaluation must be done to weigh the economical impact of this system to extend the shelf-life of deli birds.

It appears that use of the Zero-OxTech® process [high barrier bag along with a $CO_2$ generator and Oxygen scavenger] can supply a significant increase in shelf-life to Deli Birds. The APC's for birds packaged in the Zero-OxTech system did not reach above 4.5 logs by day 28 (FIG. 21). The High barrier bag alone had a level of 5 logs of APCs at day 19 and 21 (FIG. 21). Growth of APC's was clearly inhibited by the Zero-OxTech® process. The numbers presented in the below tables show a very positive effect of the use of the Zero-OxTech® process [high barrier bag, as well as the use of $CO_2$ generators and $O_2$ scavengers]. Anaerobic bacteria behaved similarly to the APCs as they also remained lower over the 28 d testing period in the Zero-OxTech® process versus the Control product (FIG. 22). Lactic acid bacteria growth did increase over time; however, remained at acceptable ranges through out the study, especially in the Zero-OxTech® product (FIG. 23). It appears that the lower oxygen transmission high barrier Zero-OxTech® bags seemed to have a very positive effect in extending the shelf-life of the deli birds.

Demonstrated Principles:

1. Metmyoglobin reducing activity is capable of being restored provided the oxygen concentration in the master package which contains meat cuts is reduced to zero ppm within a few hours of sealing the package.

2. Oxygen absorption kinetics by an oxygen scavenger is bi-phasic where the rate of oxygen absorption varies with the initial oxygen concentration.

3. Pre-treating the oxygen scavengers by moisture causes faster activation.

4. Oxygen scavengers based on an iron chemical system can be effectively utilized to reduce the oxygen concentration in the master bag.

5. The oxygen half-life will be dependent upon the initial oxygen concentration in the package and the ambient temperature.

6. The permeability of packaging films having very high oxygen ingress rate is significantly reduced at sub-zero temperatures where the films act as an oxygen barrier.

7. The reduction of oxygen levels in master-bags containing oxygen scavengers with full bird or poultry parts has a significant role in the shelf-life extension of poultry.

8. The CO2 generators along with oxygen scavengers have a critical role for shelf life extension of chicken birds and chicken pieces as CO2 generation helps prevent bacterial growth, and CO2 levels is maintained in the master bag, however, for cost-purposes, ONLY oxygen scavengers shall be used in the master-bag application for poultry and increasing the CO2 volume during gas-flushing operation. However, with proper oxygen scavengers design and volume of CO2 in the master-bag, CO2 generators may not be needed for the shelf-life extension of poultry.

9. Shelf-life extension of poultry can be obtained with the current invention with or without treatment of PAA [peracetic acid] in the poultry processing lines and using different packaging formats [FIGS. 14-20].

Included within the scope of the present invention and the abovementioned examples are compositions, comprising various combinations of these substances and materials. Aspects of the present invention have been described by way of example only and it should be appreciated that modifications and additions may be made thereto without departing from the scope thereof.

INDUSTRIAL APPLICABILITY

The present invention finds specific industrial applicability in the meat distribution and retail industries. The automated machine disclosed herein used to package meat cuts achieves zero oxygen packaging in a central packaging facility for master bag storage and retail display. The storage and display times are significantly increased using the system.

FIG. 7 shows the basic steps employed in the invention organized in to four separate procedures or processes. Steps 705, 710, and 715 comprise the first procedure of determining the capacity of the $O_2$ scavenger and CO2 generator to use. Step 720 comprises the second procedure of determining placement of the $O_2$ scavenger and CO2 generator. Steps is 725, 730, and 735 are the third procedure of packaging, and steps 740, 745, and 750 are the fourth procedure of storage and display of the meat or poultry.

For determining the half-life process, in step 705, the master bag is selected and prepared. The master bag must exhibit low oxygen transmission-rates, preferably <10 $cc/m^2/day$ at 23° C. Typically, this will require a master bag composed of high oxygen barriers films such EVOH or foil, and the master bag must have good seal-strength.

The oxygen permeability of the bag must also be established. A master bag is filled with the appropriate quantity of 100% nitrogen (or any other inert gas) or 100% CO2 or a combination of >50% nitrogen (or other inert gas) plus other non-inert gases (e.g. CO2 and/or CO or other gases) and then the residual $O_2$ level in the bag is measured immediately after sealing, three hours after sealing, and 24 hours after sealing using different sampling sets of bags for each measurement.

In step 710, residual $O_2$ concentration in the bag is taken into consideration and an appropriate Arrhenius equation is used to calculate the half-life of oxygen in the master bag, and an appropriate $O_2$ scavenger with an optimum capacity is designed or selected. In step 715, the $O_2$ scavenger is chosen. The scavenger chosen must have sufficient capacity (10 cc-1000 cc) to rapidly absorb the $O_2$ to the required low level and achieve a zero oxygen storage atmosphere within 24 hours of sealing the master bag. The $O_2$ scavengers must also self-activate in the presence of $O_2$ at a >60% relative humidity (caused by the fresh meat cuts). The CO2 generators are activating by injecting small amount of water into the sachet containing chemicals to generate CO2.

Besides the half-life of residual $O_2$ concentration in the bag, an important consideration is the type of meat cuts. Beef and lamb/veal muscles, especially tender loins, have very poor color-stability, and metmyoglobin formation, with the concurrent discoloration, has the highest rate for these muscle-types. Hence, a very fast oxygen scavengers (capable of working at 0-4° C.) with an optimal capacity of 10-1000 cc (e.g. 10-1000 mL) per pound of meat (depending upon the location of meat muscle, i.e., loins, ribs, etc.) is desired in a master bag with residual oxygen concentration of less than 5%. Also, placement of the $O_2$ scavengers should be close to the meat cuts to avoid any discoloration due to oxygen-entrapment.

Pork, on the other hand, has relatively very high color stability. Fast oxygen scavengers (capable of working at 0-4° C.) with an optimal capacity of 10-500 cc (e.g. 10-500 mL) per pound of meat cut is desired in a master-bag with residual oxygen concentration of less than 5%. For pork products, oxygen scavengers can be placed outside the meat-trays within the master bag. For other meats (e.g. beef, lamb, and veal), the oxygen scavengers can either be inside the meat trays, or inside the master bag and outside the meat trays, depending on the muscle type. In either case, oxygen permeability of the meat trays must be sufficient for residual trapped oxygen to diffuse out of the meat trays.

The primary consideration is to have fast-type oxygen scavengers with the capability to reduce oxygen concentrations to 0 ppm (zero oxygen level) within 24 hours of packaging closure. Optimal oxygen scavenging capacity is between 10 cc to 1000 cc (e.g. 10 mL to 1000 mL) per pound of meat-cuts in a master-bag having residual oxygen concentration of less than 5% and resulting in a half-life for oxygen ranging from 0.6 to 2 hours.

The desired oxygen scavengers is chemical-based, because enzyme-based scavengers have been shown to have low oxygen absorption rates as shown in the data presented in this and the earlier Ser. No. 10/434,010 application. Iron chemical systems, from the chemical group of ferrous and ferric ions, are the preferred oxygen scavenging materials. However, other chemical groups such as magnesium and copper can be used. The material used is finely granulated to a powdered form and its capacity is determined by the amount of powdered material placed inside a sachet. The preferred composition of the scavenger material follows:

iron (<25%, preferred range 15-20%)
 carbon (<35%, preferred range 20-25%)
 vermiculite (<20%, preferred range 10-15%)
 deionized water (<10%, preferably 5%)
 salt (preferably NaCl, <10%, preferably 5%)

The desired capacity of oxygen scavengers used ranges from 10 cc to 1000 cc per pound of meat packaged in a master bag. The exact capacity and half-life is calculated based on the Arrhenius equation found in patent application Ser. No. 10/434,010. The scavengers need to function in the temperature range of −2.222° to 7.222° C. (28° to 40° F.).

For the next procedure of determining placement of the $O_2$ scavenger, in step 720 placement of the $O_2$ scavenger depends primarily on the meat type. Depending on the meat-type, the $O_2$ scavenger can be placed inside the meat-tray or outside the meat-tray in the master bag. For beef and lamb cuts, placing the $O_2$ scavenger inside is usually considered optimal. However, $O_2$ scavengers can be placed outside the meat-trays provided one or more pin-holes are made in the over-wrapping film surrounding the meat-tray, each hole having a diameter of less than 5 mm. It is important for the film over-wrapping to allow exchange and diffusion of atmosphere, or more specifically oxygen, between the interior and exterior of the meat tray when sealed in the master bag.

For poultry, CO2 generators are required to provide extended shelf life as poultry is highly susceptible for microbial growth.

For the third procedure of packaging the meat, in step 725 between 0.5-4.0 lbs of meat are placed on appropriate trays. Conventional foam trays can be used in the packaging. Tests performed using foam and plastic trays, both over-wrapped and lidded, showed no substantial difference.

In step 730, the meat trays are over-wrapped for eventual display in a meat case. The over-wrapping film must have high oxygen transmission rates on the order of >8000 $cc/m^2/24$ hours at 23° C. At least one pin-hole of <5 mm diameter must be made on the over-wrapping film that wraps the meat-trays to prevent oxygen entrapment inside the meat-trays or allow diffusion out of oxygen entrapped within the meat-trays (e.g. depending on whether the $O_2$ scavengers are located inside the tray or the mater bag). The pin-holes are required because despite the permeability of the film, the film still acts as an oxygen-barrier, and oxygen molecules become entrapped within the meat-tray causing discoloration to the meat. However, for pork, the pin-holes can be eliminated. This diffusion action permits trapped oxygen to defuse outside the tray and be absorbed by oxygen scavengers outside the tray, or conversely for residual oxygen trapped in a master bag lacking oxygen scavengers to diffuse into a tray for absorption by scavengers within a meat tray.

In step 735, single or multiple meat trays are placed into a master bag, which will include an $O_2$ scavenger of appropriate $O_2$ absorbing capacity. The master bag is gas-flushed (single or multiple flushings either with or without a vacuum to aid removing oxygenated air) using either 100% $N_2$ or 100% $CO_2$ or >50 $N_2$ and the balance with CO, $CO_2$ and other trace amounts of non-oxygen gases (e.g. He, $H_2$, $H_2O$, etc) to achieve a residual $O_2$ concentration of less than 5% inside the master bag. The $N_2$ atmospheric content preferably ranges between 56%-100%. A small percentage of CO (<5%) will aid in retaining color of the meat. The preferred CO content ranges between 0.1% to 5%. After the desired gas mixture is injected into the bag, it is sealed and the oxygen scavengers, both inside and outside the trays, absorb any residual oxygen.

The fourth procedure includes steps required for storage and distribution for display. In step 740, the master bags are placed in storage under temperatures in the range of 0° to −2.22° C. (e.g. 32°-28° F.). In step 745, the meat is distributed to appropriate grocers or grocer distribution centers with storage maintained under 40° F. Meat can be maintained in this storage and distribution packaging for up to 15 weeks depending on the type of meat. In step 750, the meat is removed from the master bags and placed in meat displays at the appropriate grocer under temperature conditions >0° C., typically for up to nine days.

FIG. 8 shows the arrangements of the elements of a meat tray for one embodiment for a meat tray. The tray 1705 can be constructed from any acceptable, standard material commonly used for meat trays, preferably styrofoam. The over-wrap 1710 likewise can be made from any conventional oxygen permeable plastic wrapping film. In this embodiment, the meat 1715 is placed on top of and in direct contact with the oxygen scavenger sachet, with an absorbent pad 1725 placed underneath the oxygen scavenger. FIG. 9 shows another embodiment. The meat tray 805 is covered by the plastic over-wrap 810. However, in this embodiment the meat 815 is placed on top of and in direct contact with the absorbent pad 820. The oxygen scavenger sachet 825 is placed underneath the absorbent pad 820. For both of these embodiments, oxygen scavenger sachets used attain enough absorption capacity to achieve an $O_2$ half-life of between 0.6 to 2.0 hours. It is preferred that the oxygen absorption capacity be at least 10 mL per pound of meat and attain a zero oxygen storage atmosphere within 24 hours of packaging.

FIG. 10 shows an embodiment for a master bag containing meat trays with the oxygen scavengers only found inside the meat trays sealed in the master bag. The master bag 905 will contain one or more meat trays 910. The atmosphere within the master bag 905 is flushed of oxygen and injected with a non-oxygen gas consisting primarily of 100% nitrogen or a nitrogen-rich (>50% nitrogen) gas mixture before sealing. FIG. 11 shows an embodiment of a master bag containing a cut of primal or sub-primal meat.

$O_2$ scavengers placed inside the master bag, typically possess $O_2$ absorbing capacity of ≥10 cc/lb (e.g. ≥10 mL/lb) of meat. In this embodiment, the master bag 1005 contains cuts of unwrapped primal or sub-primal meat 1010. The master bag 1005 is flushed of oxygen and injected with a non-oxygen gas consisting primarily of 100% nitrogen (or any other inert gas) or a combination of >50% nitrogen (or other inert gas) plus other non-inert gases (e.g. $CO_2$ and/or CO or other gases) before sealing.

Oxygen scavenger sachets 1015 with appropriate capacity are added to the master bag 1005 before sealing having a total oxygen absorbing capacity of ≥10 mL per pound of meat to achieve an $O_2$ half-life of between 0.6 to 2.0 hours. FIG. 12 shows another embodiment where meat trays and oxygen scavengers are sealed in a master bag. The master bag 1105 contains a plurality of meat trays 1110. Oxygen scavenger sachets 1115 are included inside the master bag 1105 before the master bag 1105 is flushed, injected with the desired gas mixture, (100% nitrogen, nitrogen-rich (>50% nitrogen), 100% CO2 with balance of $CO_2$ and CO), and then sealed.

The capacity of CO2 generating is determined based on the amount of poultry in the master-bag. Typically the amount of CO2 generation should be equal to 60-80% of the amount of poultry in the bag, i.e., if the amount of poultry is 30 lb in the master-bag, the capacity of CO2 generation should be 18-24 liter.

The invention also includes the apparatus used for packaging the master bags. The apparatus consists of horizontal form-fill-seal equipment designed to provide an integrated packaging system for retail-ready meat cuts in meat trays or primal or sub-primal meat cuts of the appropriate size. The preferred maximum size of product packaged by the machine is 28 inches long, 18 inches wide, and 6 inches high. The equipment should be constructed of stainless steel to facilitate cleaning. FIG. 13 shows a basic schematic of the packaging system using the machine.

In the machine schematic of FIG. 13, meat trays 1205 of the preferred maximum size are fed into the apparatus using a conveyor system 1207 powered by a servo motor that moves the meat trays 1205 through the apparatus. For most meat packaging applications, the appropriate oxygen scavenger sachets 1210 will be placed inside the meat tray and outside the meat tray inside the master bag, but for some chosen applications other placement configurations may be used (e.g. scavengers other in meat tray only, scavengers outside meat tray only, or no scavengers). A pin-hole of ≤5 mm should be punched in the over-wrap of the meat tray, or multiple holes to facilitate diffusion of trapped oxygen from the retail meat trays.

The meat trays 1205 enter a folding box 1211 which constructs the master bags. One or more 1205 meat trays enter the folding box 1211, which is supplied with the master bag material by a film pulley system 1212 supplying bag film material 1214 from a continuous sheet of material wrapped onto a roller system 1213. The folding box 1211 folds the fed master bag film material 1214 around the meat trays 1205 to form the master bag by heat-sealing the edges together to form a master bag. Alternatively, the continuous sheet roller system 1213 may consist of a number of prefabricated master bags coupled together by perforations so as to be easily separated and opened by the folding box 1211.

As the forming master bag passes through the folding box, a wrapper pre-heating mechanism 1215 heats the material to help shrink it onto the meat trays 1205, before reaching a set of propelling and sealing rollers 1216 that seal the end of the master bag. During this process, between the mechanisms of 1215 and 1216, simultaneously with the formation of the master bag, gas flushing is performed to evacuate air out of the master bag while the desired gas mixture is injected. The gas flushing can include applying a vacuum to the master bag to help evacuate ambient air from the master bag.

The gas mixture is supplied from a gas supply tank 1220 containing pre-mixed gases supported above the conveyor system by a support rack 1217, or the gas can be supplied from multiple tanks, or gas lines leading to an exterior tank of pre-mixed gases. Gas is supplied through a gas supply line 1218, with gas flow regulated by a solenoid valve 1219. The gas tank includes warning devices 1221 that can include pressure, temperature, and composition sensors. It is contemplated that two gas supplies lines will flow into the tank. A nitrogen gas line 1222 will supply pure $N_2$ to the gas tank, and may include a bypass to feed directly into the gas supply line 1218 into the apparatus. The $N_2$ supply line will provide all the nitrogen for the system, and this nitrogen gas flow may be in a gaseous or liquid state, preferably gaseous as cryogenic temperatures of liquid nitrogen can be problematic and would needlessly complicate the system without any real benefit. The other gas line will supply the mixture of other gases chosen by the user of the system ($CO_2$, CO, etc).

Alternatively, each gas type may use its own gas supply line, but it is contemplated that the gas feed for the other gases will be in a gaseous state and a safety valve 1223 is provided on this gas supply line 1224 for venting in the even that the pressure rises to an unsafe level inside the tank 1220. The preferable gas mixture for most meat packaging will be composed of >50 $N_2$ and <5% CO and the balance of the mixture $CO_2$. A safety system may be required for monitoring with these gas mixtures containing CO and $CO_2$, which can be dangerous at relative low concentrations (e.g. over 50 ppm for CO gas and over 5,000 ppm for $CO_2$).

The sides of the master bag are heat-sealed before gas flushing and the ends of the master bag are heat-sealed by a cross-reciprocating seal mechanism 1225 utilizing a specific dwell time, speed, pressure, and temperature. A servo motor controls the cross reciprocating seal. The parameters (speed of the conveyor and cross-sealing speed) depend on the size of the master bag. All of the functional components such as the servo motor, conveyor speed, cross-sealing speed, gas mixture control, bag sizing, and other similar functions, are preferably controlled by a Pentium-based computer control system operated by a windows style touch screen. At the end of the process, a master bag 1226 containing meat trays or primal cuts of meat is produced containing a desired gas mixture reduced to zero oxygen content for long-term storage of the meat cuts.

While the invention has been particularly shown and described with respect to preferred embodiments, it will be readily understood that minor changes in the details of the invention may be made without departing from the spirit of the invention.

DESCRIPTION OF THE DRAWINGS

The objects and features of the invention will become more readily understood from the following detailed description and appended claims when read in conjunction with the accompanying drawings in which like numerals represent like elements and in which:

FIG. 5C-I to 5C-II is an x-y graph detailing odor acceptability of meat, namely lamb chops, based on the amount of time the chops are displayed as described in Example 5;

FIGS. 5D-I and 5D-II is an x-y graph showing scores of off-odor intensity based on the amount of time the chops are displayed as described in Example 5;

FIG. 5E is an x-y graph depicting scores of retail appearance of meat, namely lamb chops based on time of retail display in plastic trays as described in Example 5;

FIG. 5F is an x-y graph depicting scores of retail appearance of meat, namely lamb chops based on time of retail display in foam trays as described in Example 5;

FIG. 5G is an x-y graph illustrating surface discoloration of meat, namely lamb chops in plastic trays based on time of retail display as described in Example 5;

FIG. 5H is an x-y graph detailing surface discoloration of meat, namely lamb chops, in foam trays based on time of retail display as described in Example 5;

FIG. 5I is an x-y graph showing color scores of meat, namely lamb chops in plastic trays, based on time of retail display as described in Example 5;

FIG. 7 is a schematic flow chart showing the method of the process used for packaging meat under the invention;

FIG. 8 is an embodiment of the arrangement of the elements of a meat tray;

FIG. 9 is another embodiment of the arrangement of the elements of a meat tray;

FIG. 10 is an embodiment of the arrangement of meat trays inside a master bag;

FIG. 11 is an embodiment of a master bag containing a large primal or sub-primal meat cut;

FIG. 12 is another embodiment of the arrangement of meat trays and oxygen scavengers inside a master bag; and FIG. 13 is a schematic drawing of an apparatus to package meat according to the disclosed method and process.

FIG. 14 Shelf-life extension process operation of poultry using "Zero-OxTech" process.

FIG. 15 Poultry packaged with Zero-OxTech process in Zero-OxTech bags.

FIG. 16 Poultry packaged with Zero-OxTech process in tray.

FIG. 17 Shelf-life data for PAA [Peracetic Acid]-treated poultry using Tewari's Zero-OxTech® process [Bag application].

FIG. 18 Shelf-life data for PAA [Peracetic Acid]-treated poultry using Tewari's Zero-OxTech® process [MAP TRAY application].

FIG. 19 Shelf-life data for Non-PAA [Peracetic Acid]-treated poultry using Tewari's Zero-OxTech® process [MAP TRAY application].

FIG. 20: Shelf-life data for PAA AND Non-PAA [Peracetic Acid]-treated poultry using Tewari's Zero-OxTech® process [REISER VACPAC application].

FIG. 21: APC's for Deli Birds over time using Zero-OxTech process.

FIG. 22: Anaerobic APC's for Deli Birds over time using Zero-OxTech process.

FIG. 23: Lactic Acid Bacteria for Deli Birds over time using Zero-OxTech process.

Figure 1:
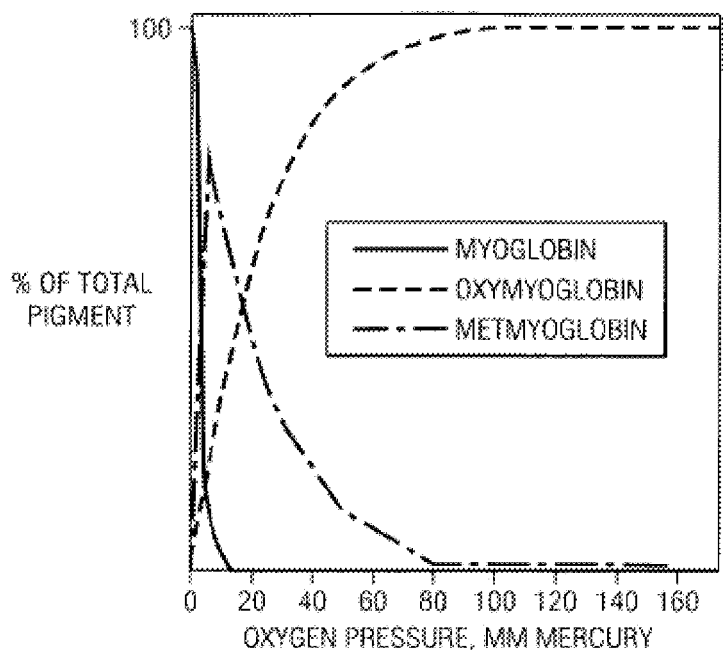
FIG. 1 is a x-y graph depicting the influence of oxygen partial pressure on three chemical states of myoglobin.
Figure 2A:
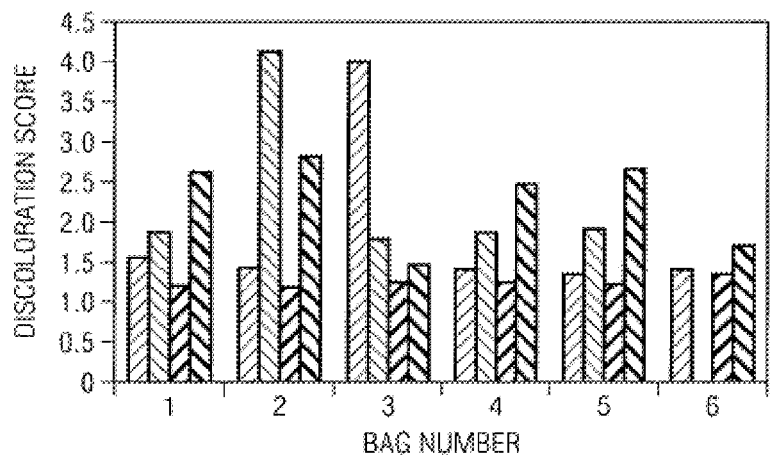
FIG. 2A is a table describing treatments for beef steaks and pork chops as described in Example 2.
Figure 2B:
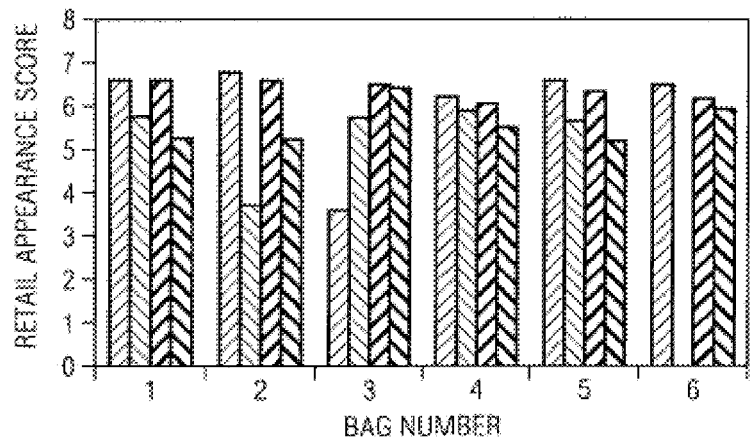
FIG. 2B is a table depicting oxygen concentration in master packs containing beef and pork stored at 2° C. in 100% nitrogen atmosphere over the course of seven days as described in Example 2.
Figure 2C:
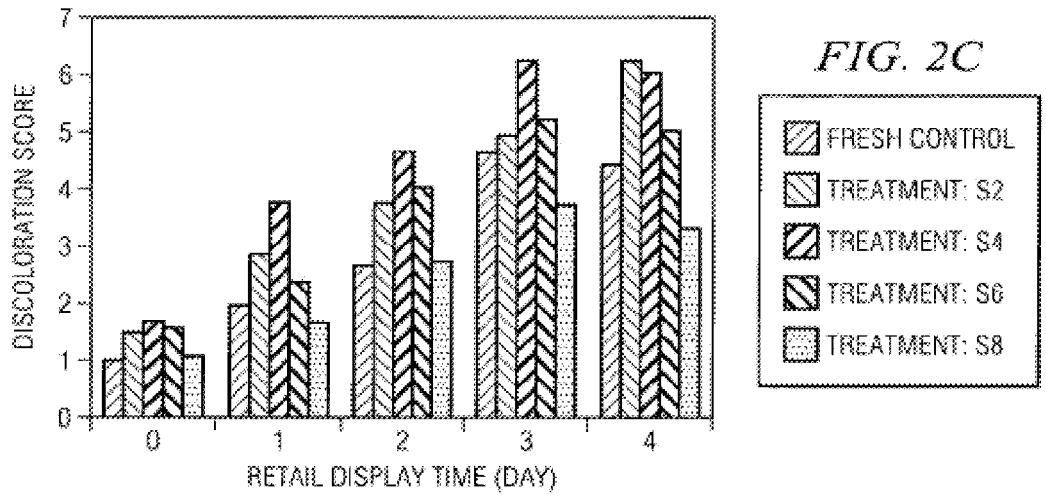
FIG. 2C is a table displaying mean color, surface discoloration and retail appearance scores and standard errors for pork chops and beef steaks after various treatments.
Figure 2D:
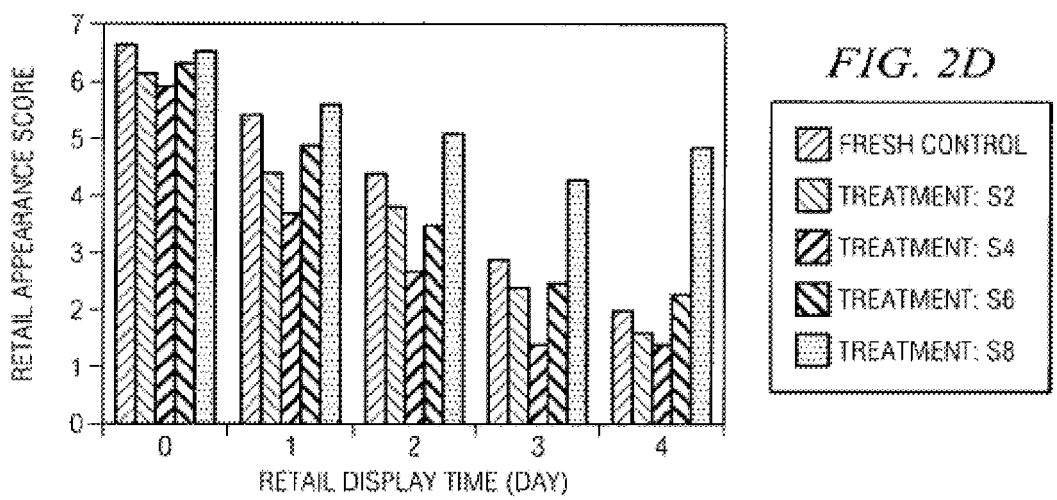
FIG. 2D is a table depicting mean values of the chemical states of myoglobin (% met-, % deoxy-, and % oxy-myoglobin) and standard errors of difference for pork chops and beef steaks after various treatments.
Figure 2E:
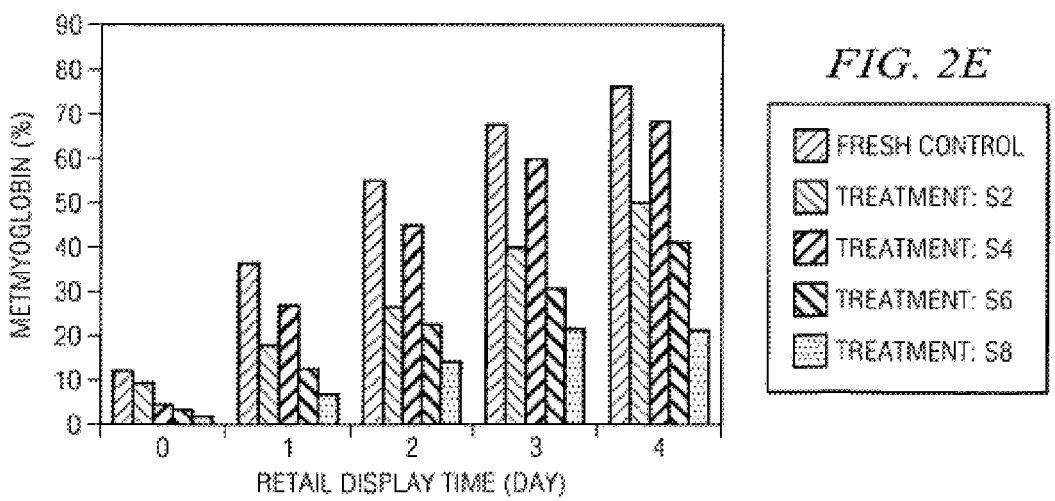
FIG. 2E is an x-y graph depicting a discoloration score given to bags undergoing various treatments as described in Example 2.
Figure 3A:
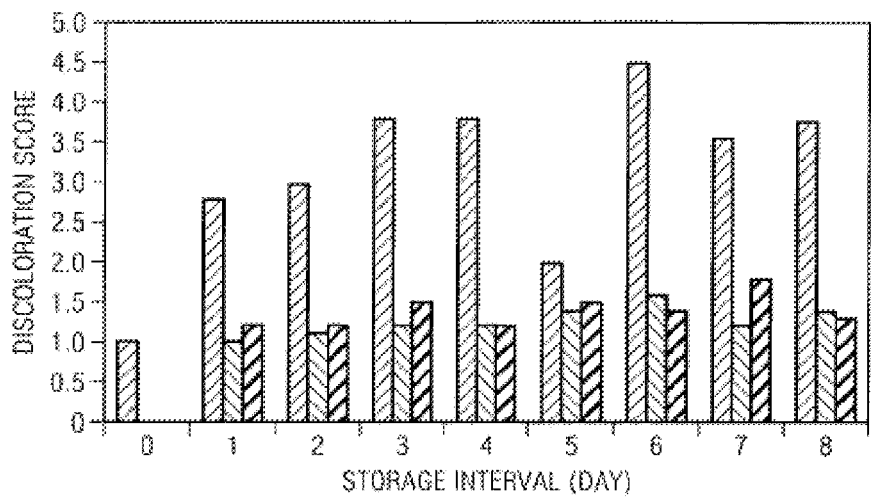
FIG. 3A is an x-y graph depicting a control and two experimental types given a discoloration score within storage intervals as described in Example 3.
Figure 3B:
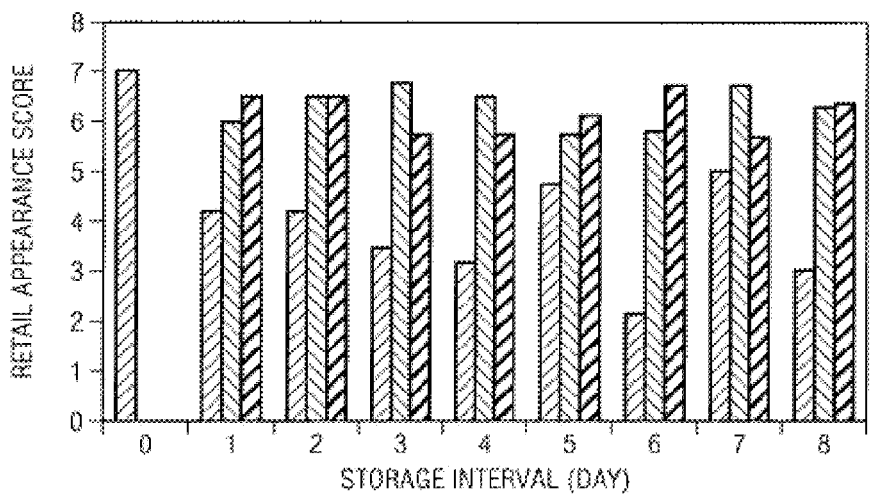
FIG. 3B is an x-y graph illustrating the control and two experimental types given a retail appearance score within storage intervals as described in Example 3.
Figure 3C:
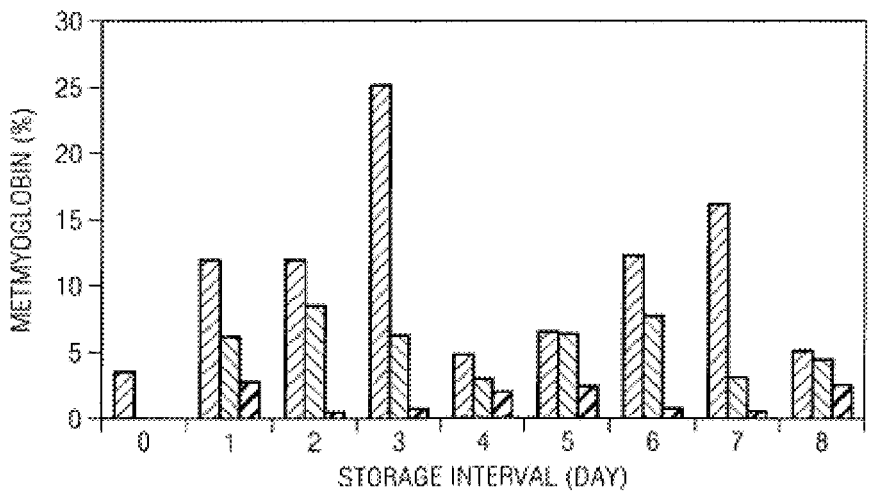
FIG. 3C is an x-y graph illustrating the control and two experimental types having a percentage of metmyoglobin taken during storage intervals as described in Example 3.
Figure 4A:
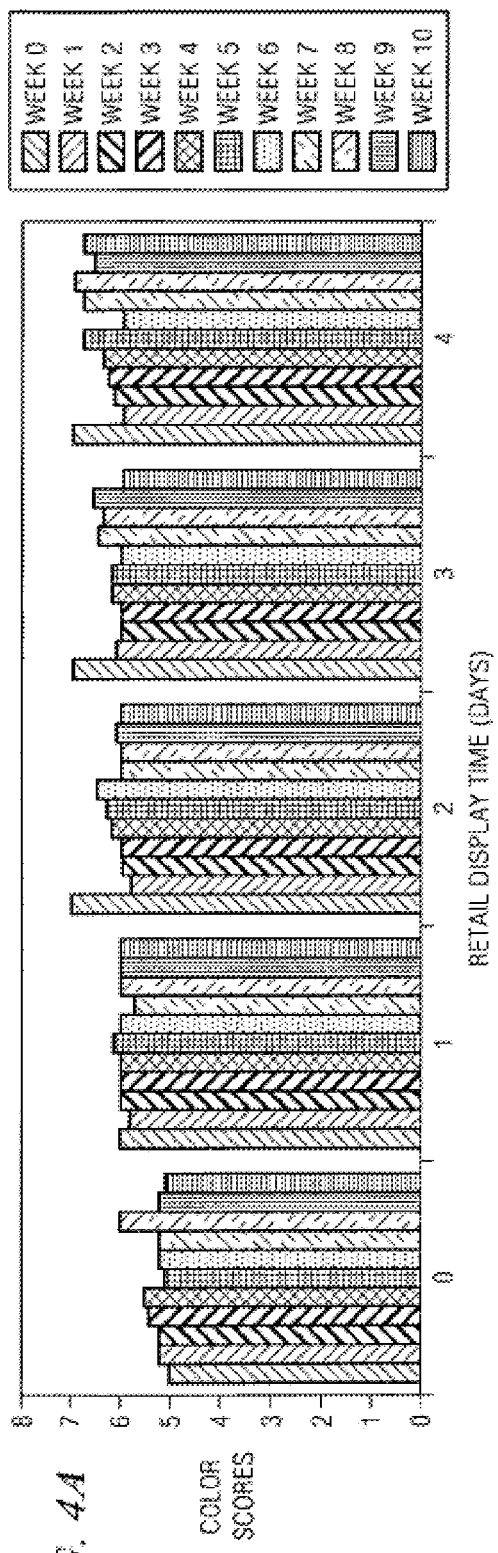
FIG. 4A is an x-y graph showing different weeks receiving color scores during retail display times as described in Example 4.
Figure 4B:
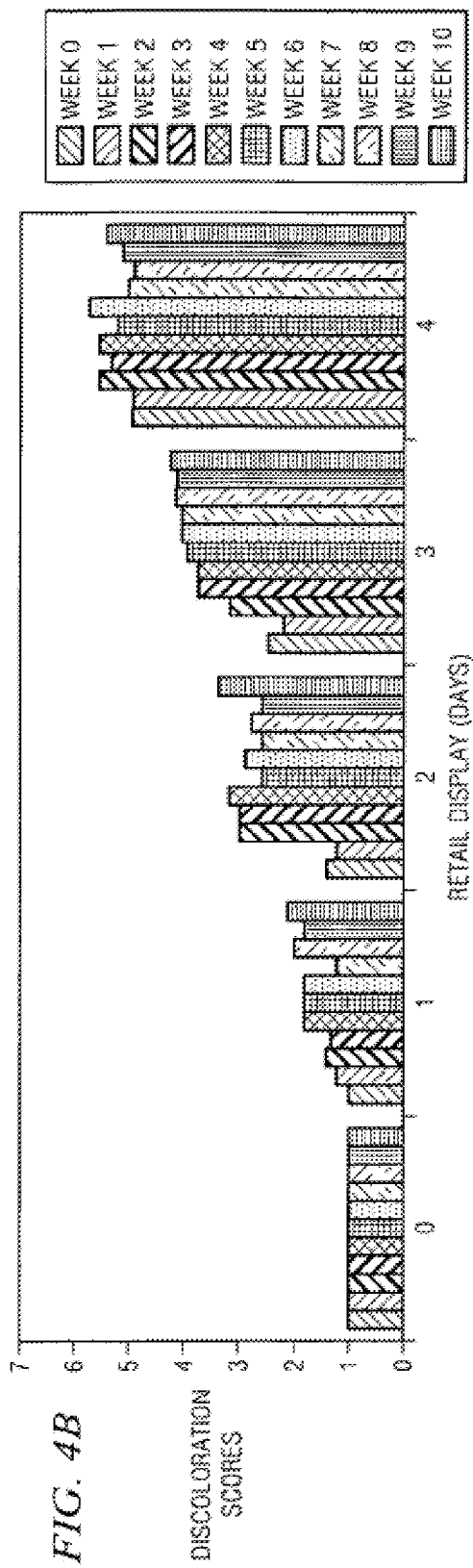
FIG. 4B is an x-y graph showing different weeks receiving discoloration scores during retail display times as described in Example 4.
Figure 4C:
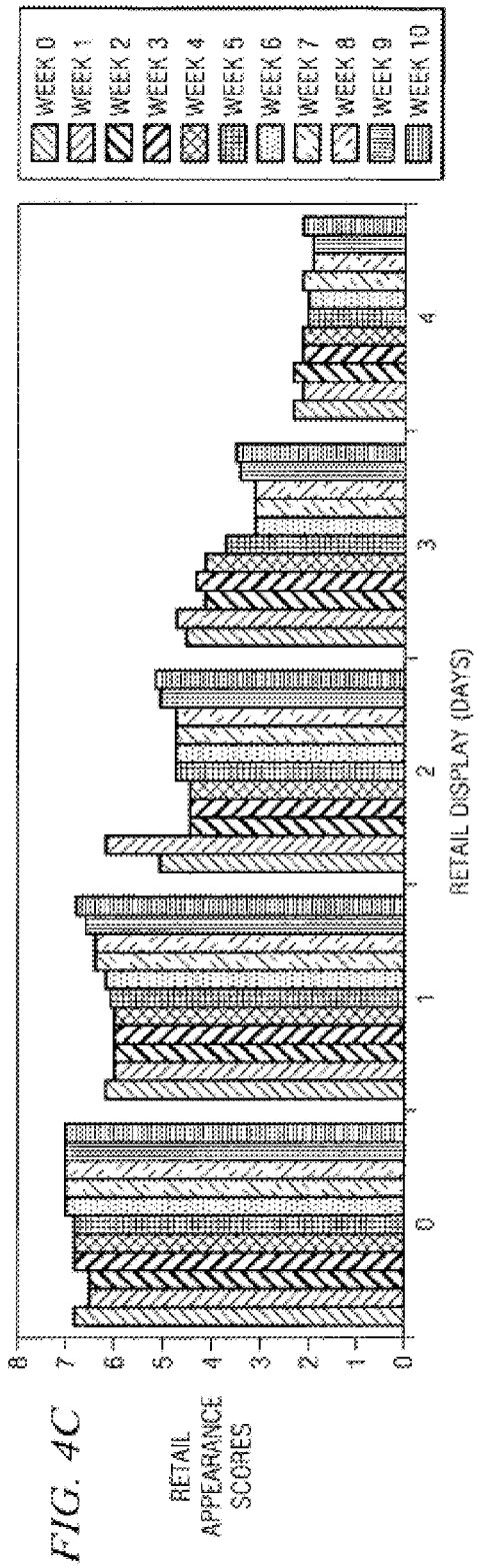
FIG. 4C is an x-y graph showing different weeks receiving retail appearance scores during retail display times as described in Example 4.
Figure 4E:
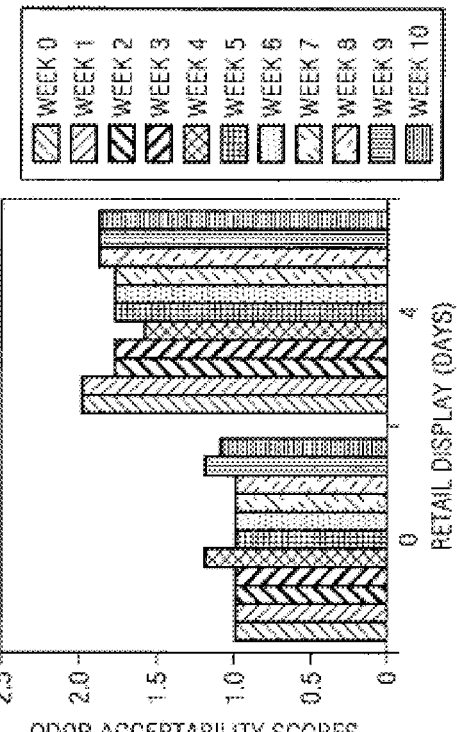
FIG. 4E is an x-y graph showing different weeks receiving odor acceptability scores during a course of days of retail display as described in Example 4.
Figure 4D:
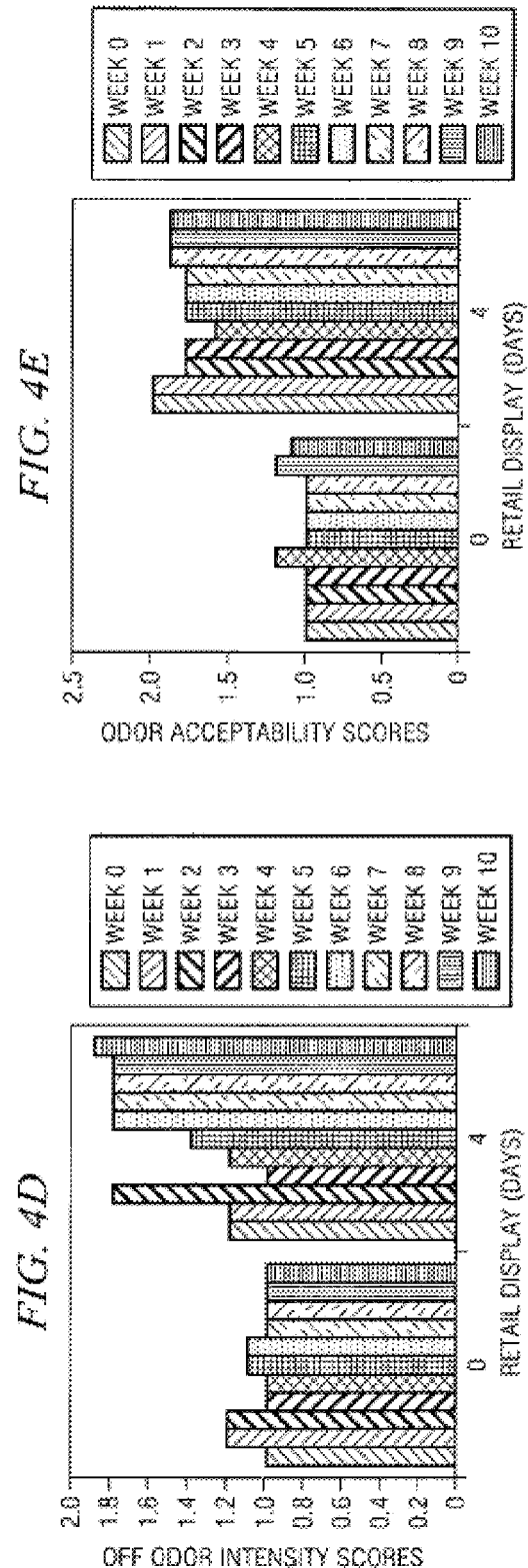
FIG. 4D is an x-y graph showing different weeks receiving off odor intensity scores during a course of days of retail display as described in Example 4.
Figure 4F:
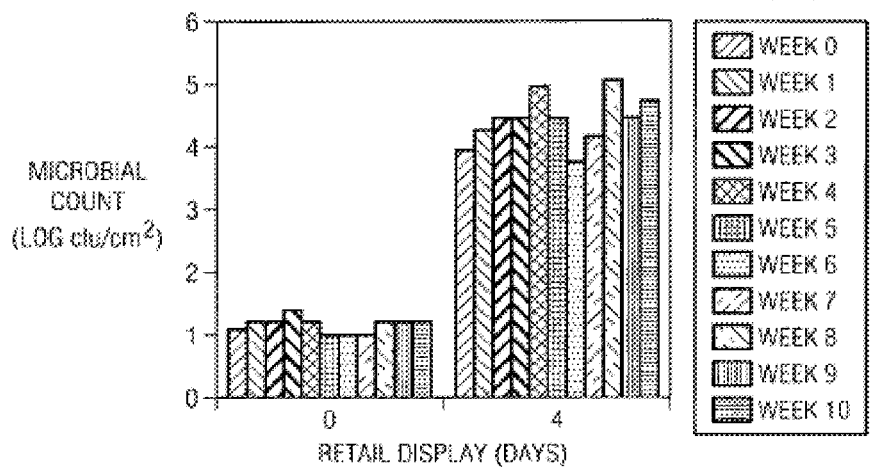
FIG. 4F is an x-y graph depicting different weeks showing a microbial count during a course of days of retail display as described in Example 4.
Figure 5A:
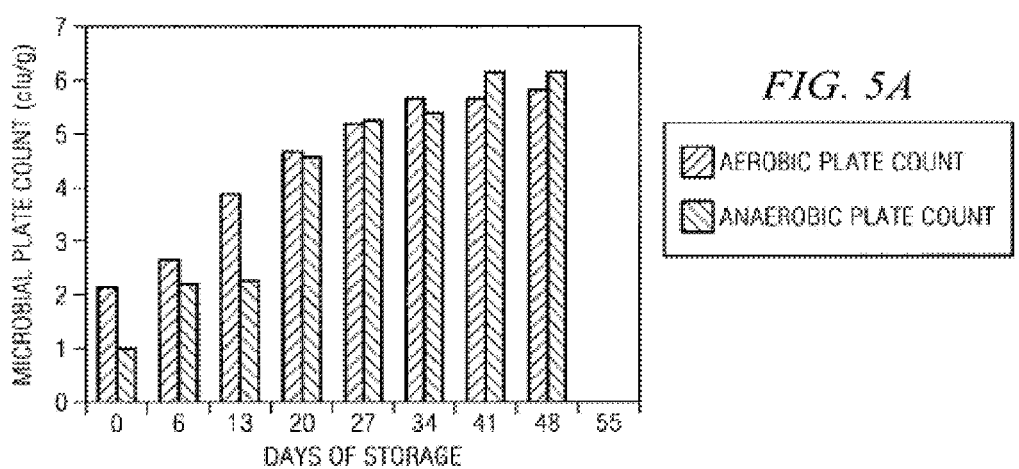
FIG. 5A is an x-y graph depicting a microbial plate count for meats, namely lamb chops stored on foam trays over a period of time as described in Example 5.
Figure 5B:
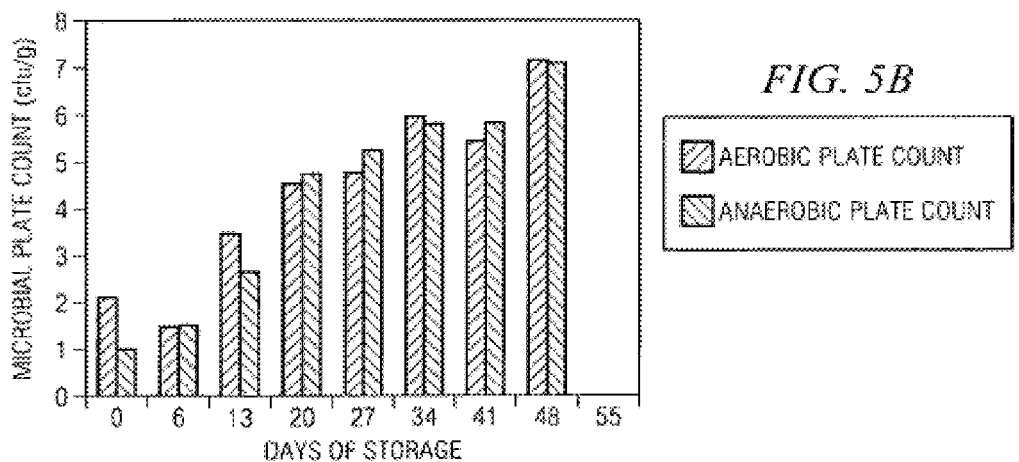
FIG. 5B is an x-y graph illustrating microbial plate count for meats, namely lamb chops stored on plastic trays over a period of time as described in Example 5.
Figure 5E:
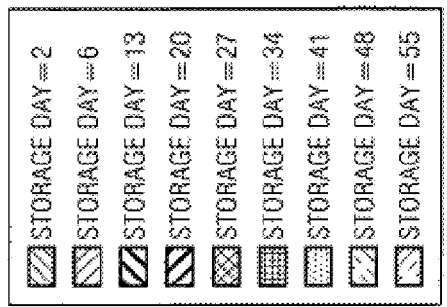
Figure 5E:
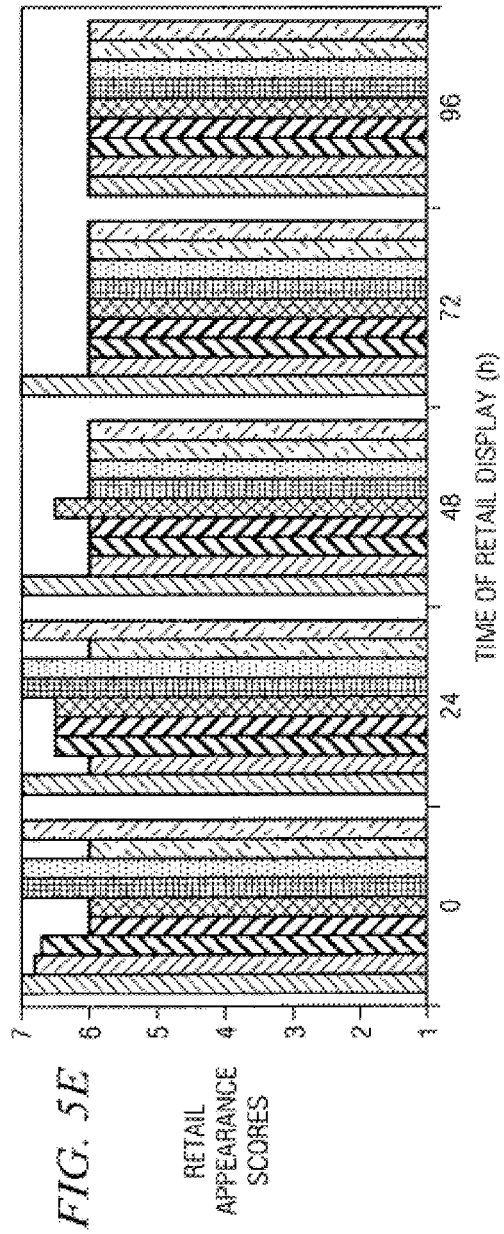
Figure 5F:
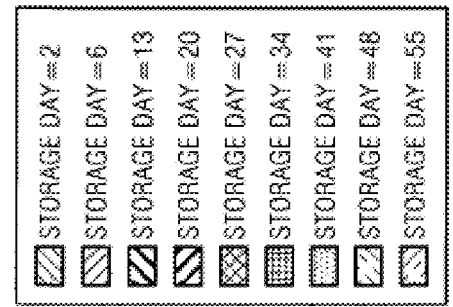
Figure 5F:
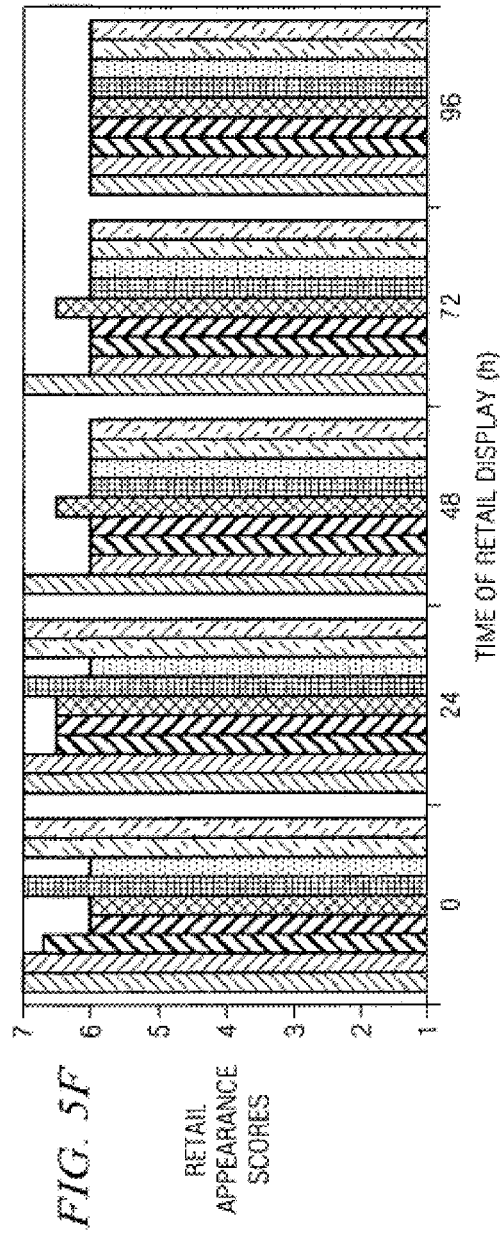
Figure 5G:
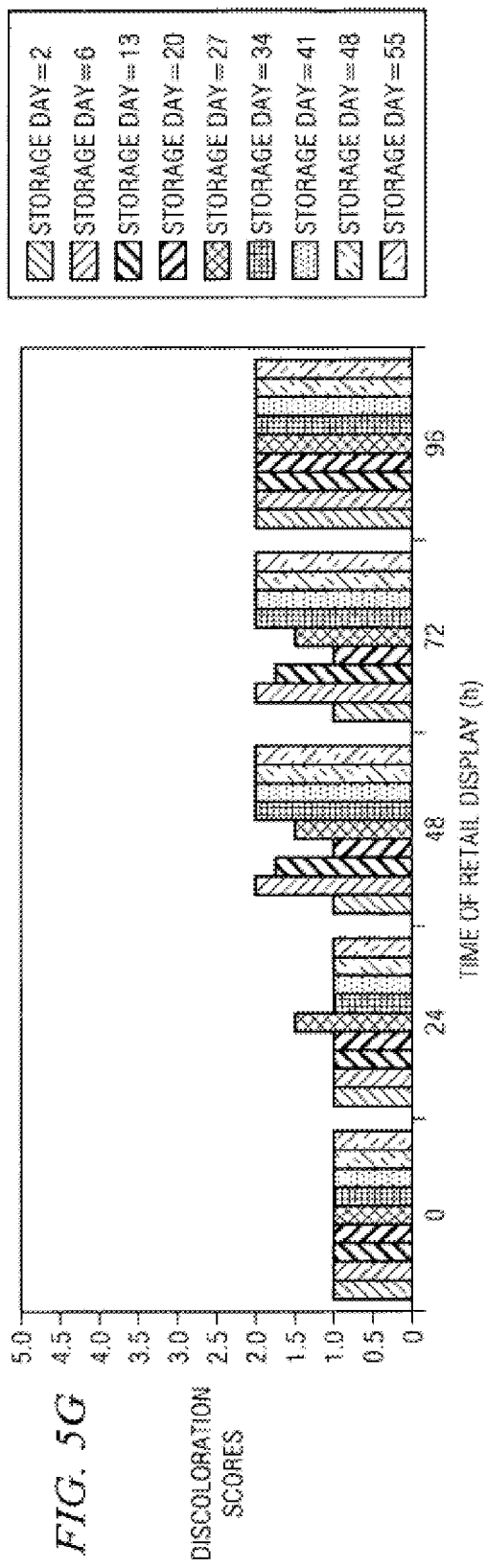
Figure 5H:
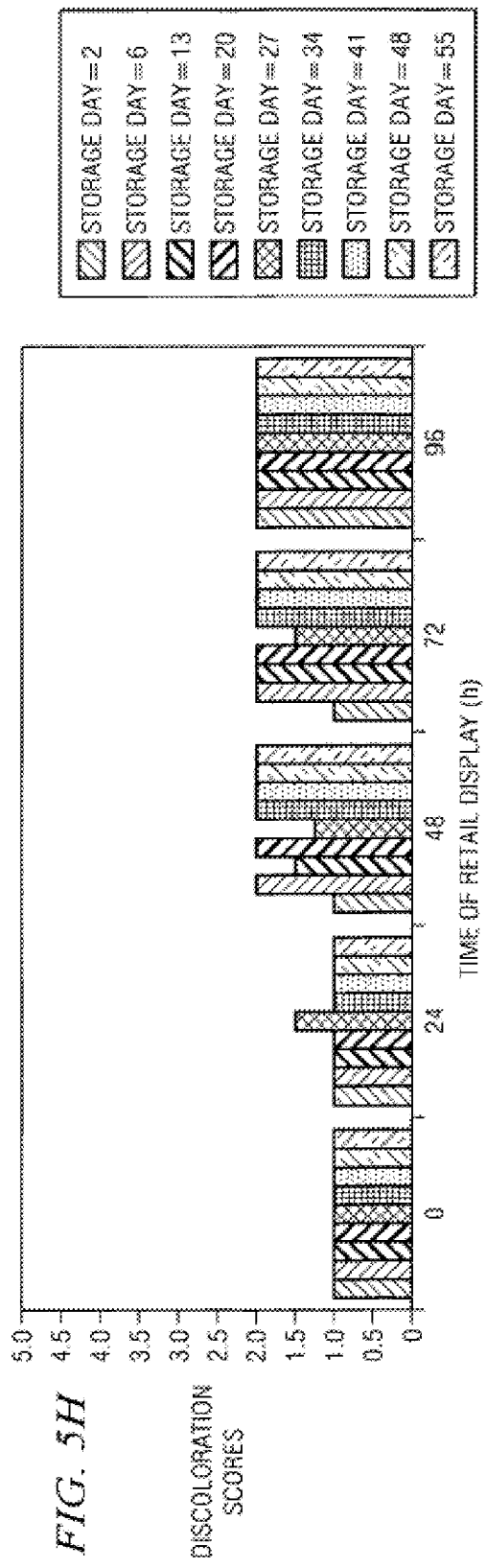
Figure 5I:
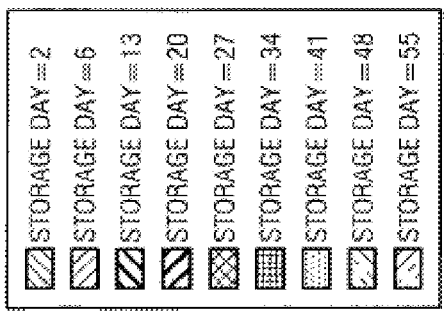
Figure 5I:
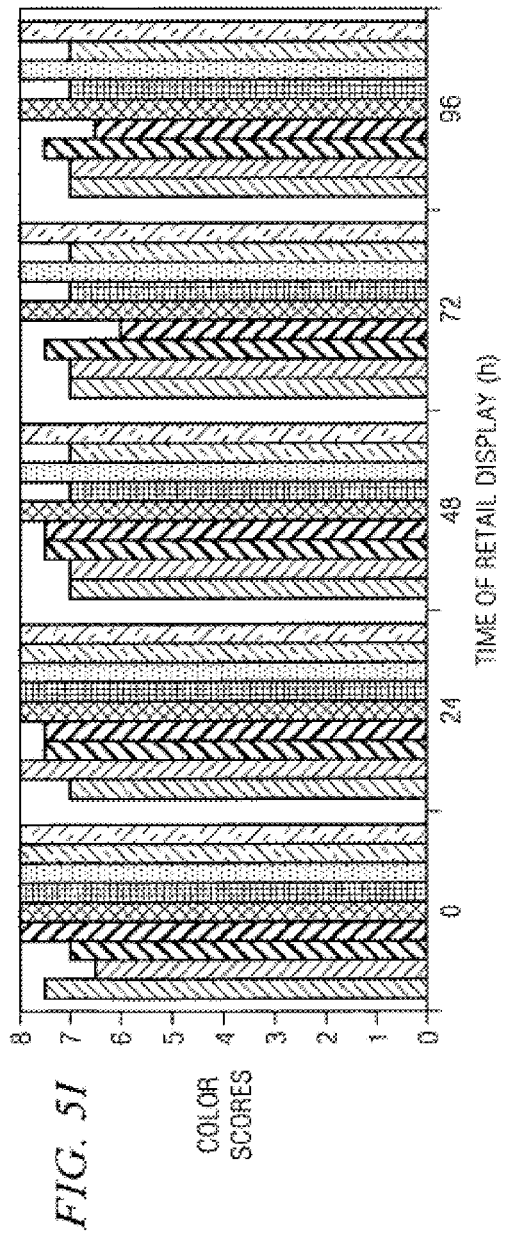
Figure 5J:
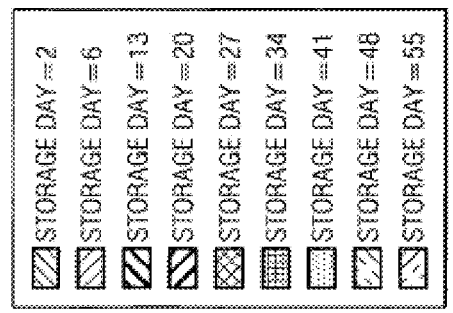
FIG. 5J is an x-y graph showing color scores of meat, namely lamb chops in foam trays, based on time of retail display as described in Example 5.
Figure 5J:
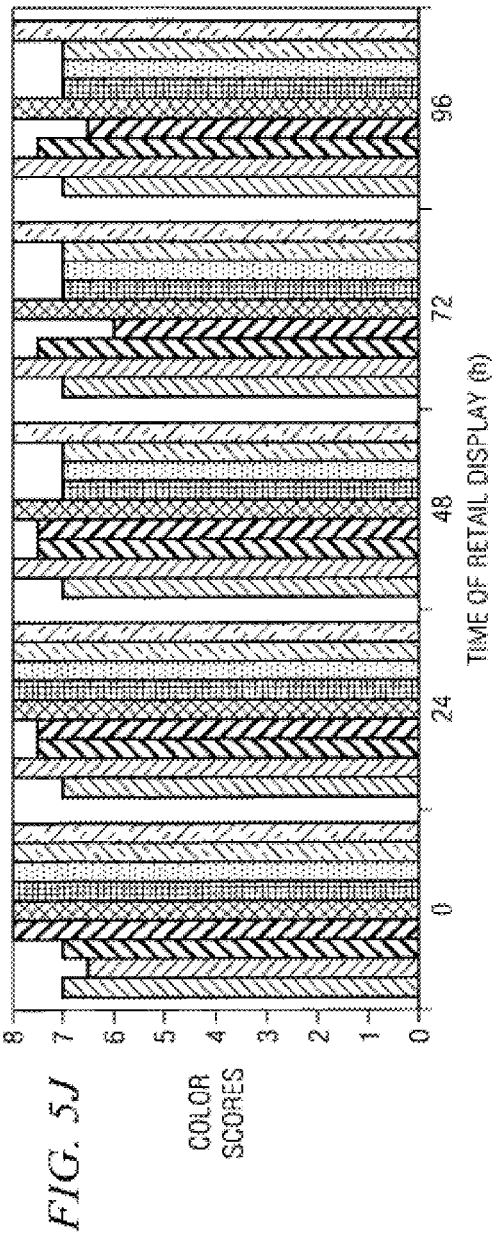
Figure 6A:
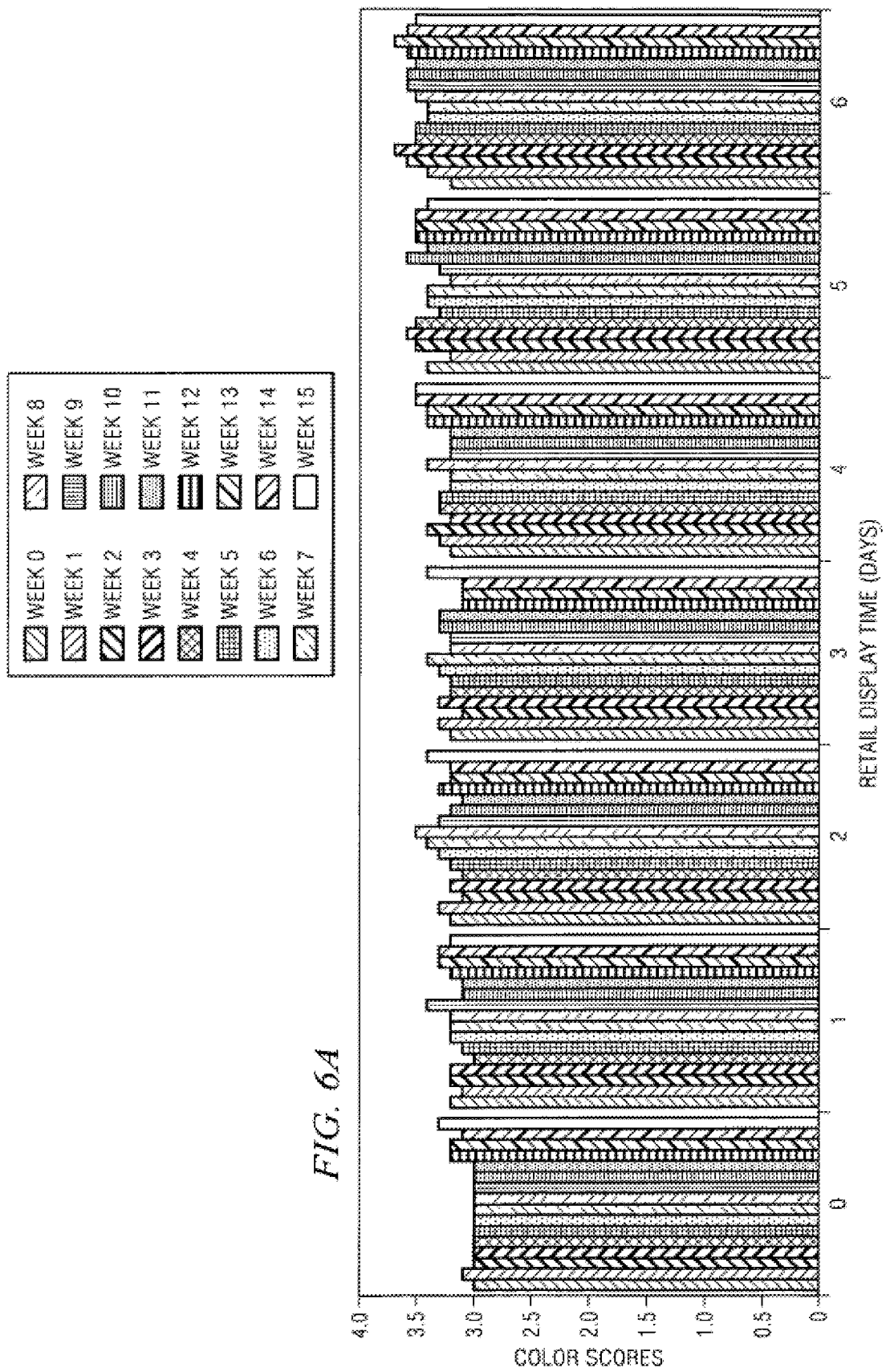
FIG. 6A is an x-y graph showing color score of meat, namely pork chops, based on time of retail display over a period of time as described in Example 6.
Figure 6B:
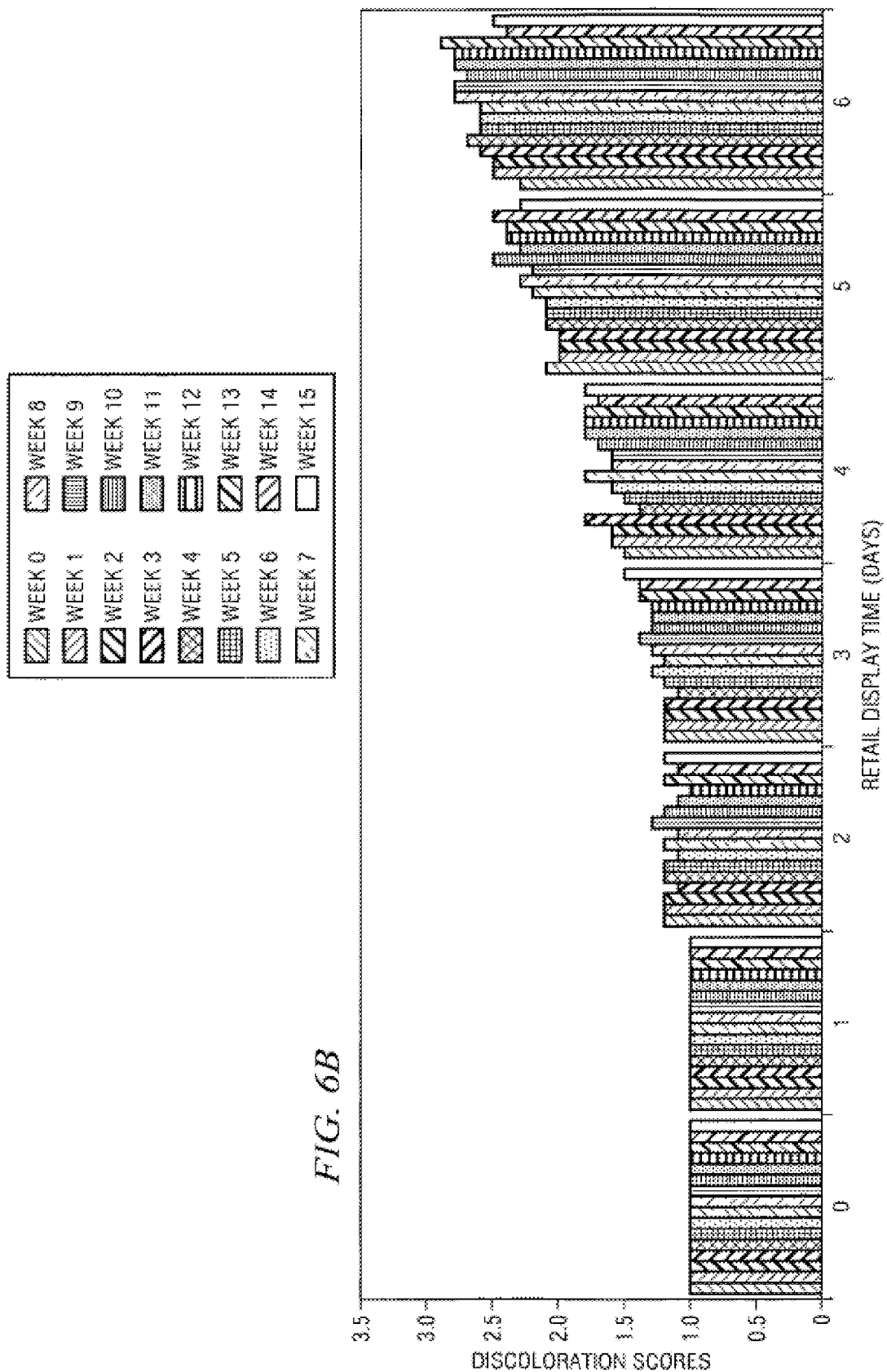
FIG. 6B is an x-y graph showing discoloration of meat, namely pork chops, based on time of retail display as described in Example 6.
Figure 6C:
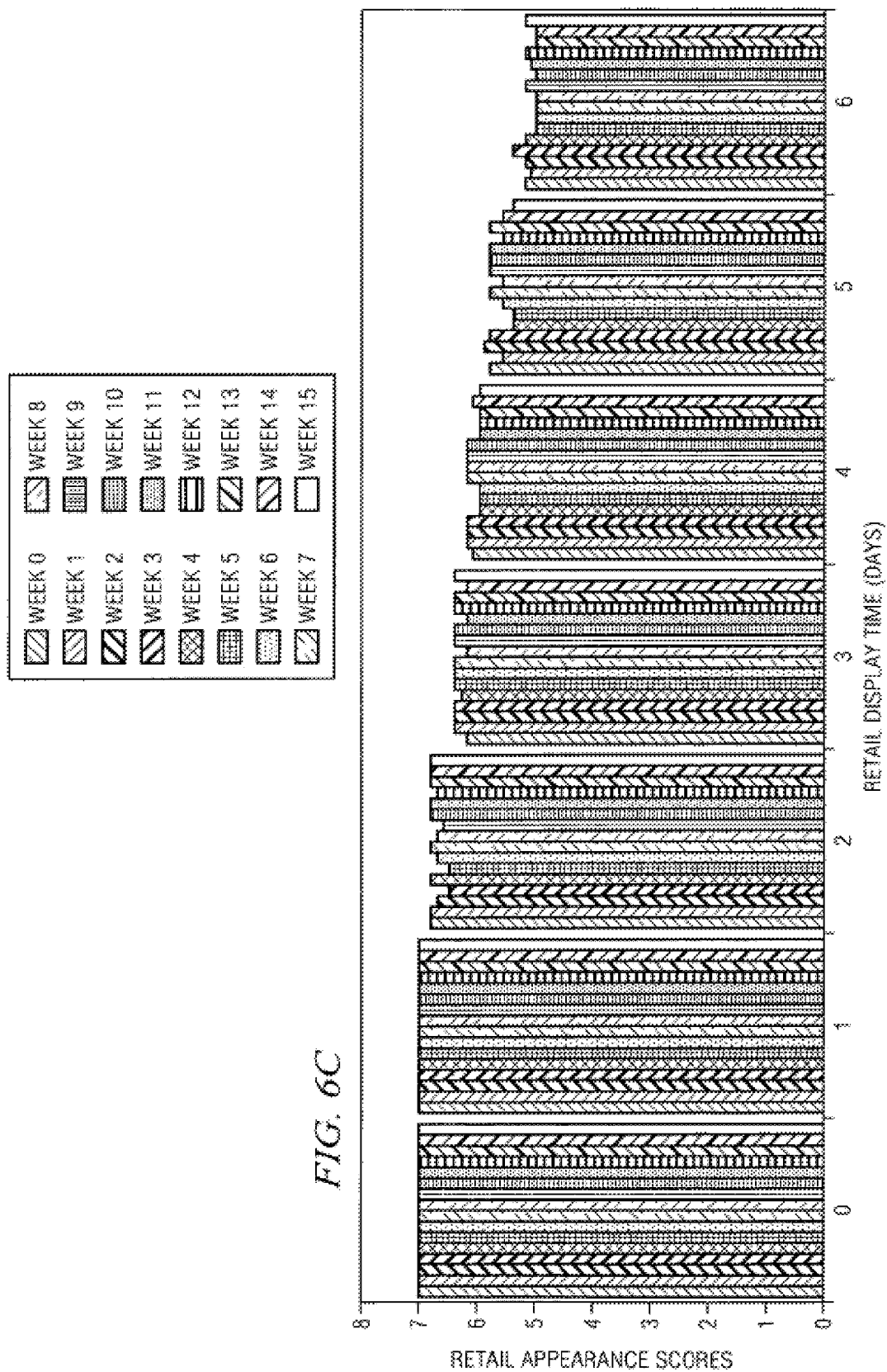
FIG. 6C is an x-y graph depicting scores of retail appearance of meat, namely pork chops based on time of retail display as described in Example 6.
Figure 6D:
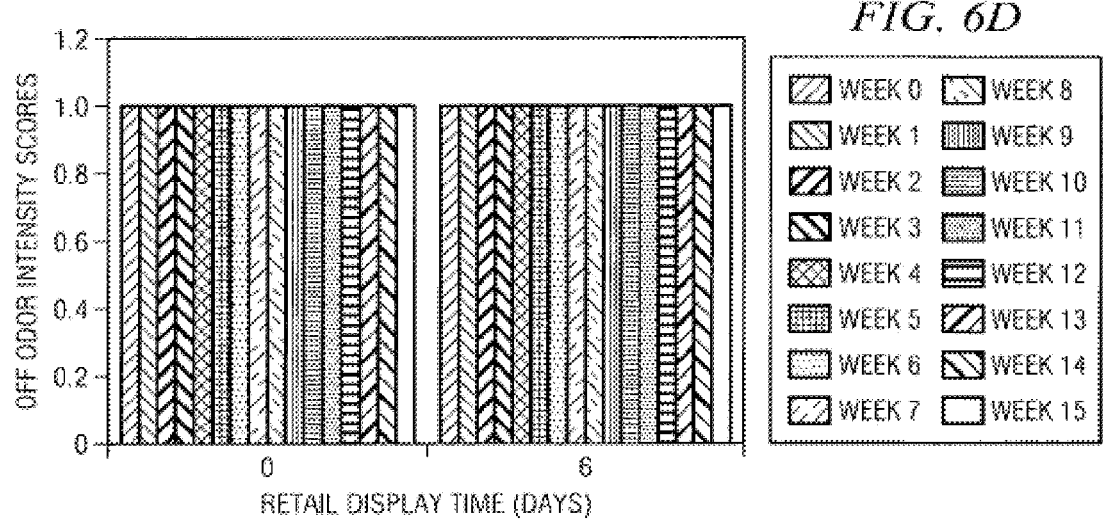
FIG. 6D is an x-y graph showing scores of off-odor intensity of meat, namely pork chops, based on the time of retail display as described in Example 6.
Figure 6E:
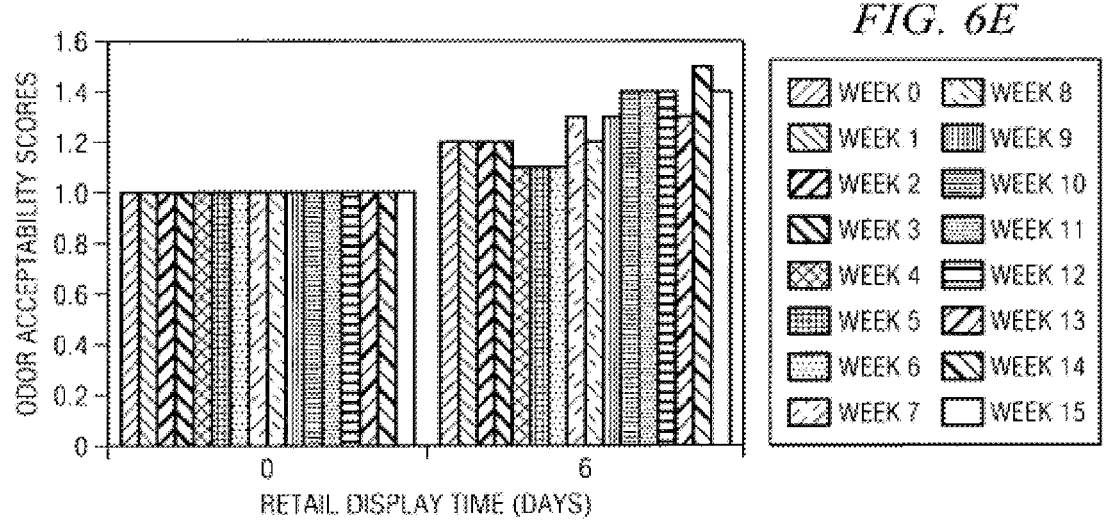
FIG. 6E is an x-y graph detailing odor acceptability of meat, namely pork chops, based on the amount of time the chops are displayed as described in Example 6.
Figure 6F:
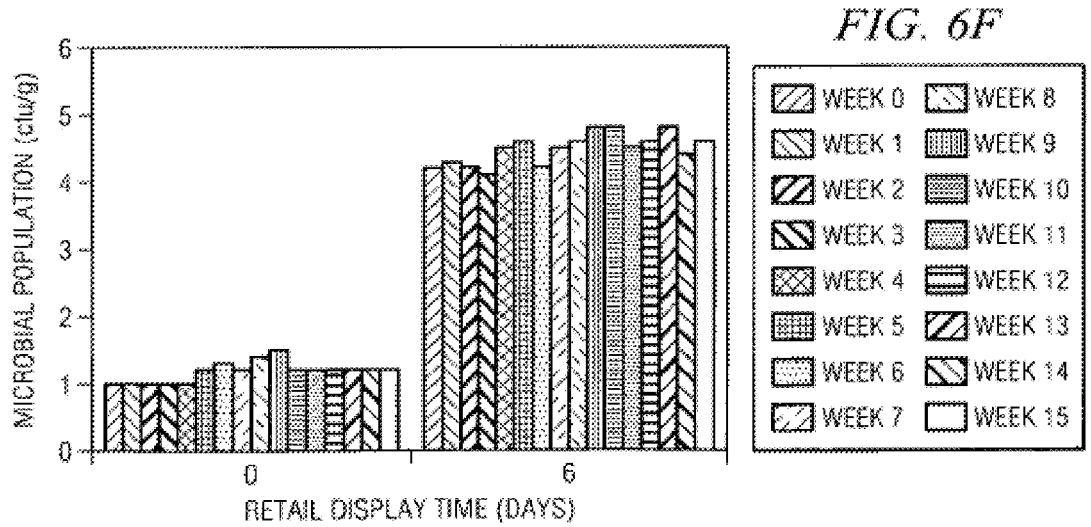
FIG. 6F is an x-y graph depicting microbial plate count for meats, namely pork chops, based on time the chops are displayed as described in Example 6.

I claim:

1. A packaging system for extending shelf life of meat and poultry, the packaging system comprising:
   a retail meat or poultry tray comprising
      a tray with a first set of one or more oxygen scavenger sachets;
      a first $CO_2$ generator; and
      an absorbent pad over-wrapped with a gas permeable plastic-based film permitting atmosphere exchange between an interior and an exterior of the meat or poultry tray;
      said first set of one or more oxygen scavenger sachets containing a first iron-based oxygen absorbing material self-activated in an atmosphere of greater than 70% relative humidity; and
      said first $CO_2$ generator being activated by injecting a pre-determined amount of water into a first set of one or more chemical containing sachets;
   a first plurality of full poultry birds or bird pieces with a second set of one or more oxygen scavengers sachets and a second $CO_2$ generator, said second set of one or more oxygen scavenger sachets containing a second iron-based oxygen absorbing material self-activated in an atmosphere of greater than 70% relative humidity, said second $CO_2$ generator being activated by injecting a pre-determined amount of water into a second set of one or more chemical containing sachets;
   a second plurality of full poultry birds or bird pieces with a third set of one or more oxygen scavengers sachets, said third set of one or more oxygen scavenger sachets containing a third iron-based oxygen absorbing material self-activated in an atmosphere of greater than 70% relative humidity; and
   a master bag containing the retail meat or poultry tray, the first plurality of full poultry birds or bird pieces, or the second plurality of full poultry birds or bird pieces, said master bag flushed prior to sealing to remove oxygenated air from an interior of the master bag to obtain an initial atmosphere equal to or less than 5% oxygen and injected with an oxygen-free, $CO_2$ gas or greater than 50% inert gas;
   wherein an oxygen absorption capacity of the first set of one or more oxygen scavenger sachets, the second set of one or more oxygen scavenger sachets, and the third set of one or more oxygen scavenger sachets are sufficient to achieve a half-life for 5% residual oxygen of equal to or less than 10.0 hours and reach a zero oxygen storage atmosphere within 96 hours after sealing said master bag; and
   wherein the first $CO_2$ generator and the second $CO_2$ generator are formed by a combination of malic acid and sodium carbonate to generate an appropriate amount of $CO_2$ in a range of at least 100 mL per pound of meat or poultry within a period of 7 days after sealing said master bag.

2. The packaging system of claim 1, wherein each of the first set of one or more oxygen scavenger sachets, the second set of one or more oxygen scavenger sachets, and the third set of one or more oxygen scavenger sachets comprises:
   a porous bag with an active surface area between 4 to 64 square inches and porosity levels ranging from 20 to 120 Gurley second;
   chemical granules ranging from 0.001 mm to 1.5 mm in diameter; and
   a total weight of absorbing chemical between 1 gram to 300 grams.

3. The packaging system of claim 2, wherein the chemical granules comprise:
   less than 25% iron;
   less than 35% carbon;
   less than 20% vermiculite;
   less than 10% de-ionized water; and
   less than 10% NaCl salt.

4. The packaging system of claim 3, wherein the chemical granules comprise less than 10% zeolites.

5. The packaging system of claim 1, wherein the first set of one or more oxygen scavenger sachets, the second set of one or more oxygen scavenger sachets, and the third set of one or more oxygen scavenger sachets sealed within the master bag obtain an absorption capacity of at least 10 mL per pound of meat or poultry.

6. The packaging system of claim 1, wherein each of the first $CO_2$ generator and the second $CO_2$ generator comprises:
   a porous bag with an active surface area between 4 to 256 square inches and porosity levels ranging from 20 to 120 Gurley second;
   chemical granules ranging from 0.001 mm to 3.0 mm in diameter; and
   a total weight of $CO_2$ generating material between 10 to 500 gm.

7. The packaging system of claim 6, wherein the chemical granules comprise:
   less than 80% sodium carbonate; and
   less than 30% malic acid.

8. The packaging system of claim 1, wherein the first $CO_2$ generator and the second $CO_2$ generator sealed within the master bag are activated by injecting 5-50 mL of water prior to placement of the $CO_2$ generators in the master bag.

9. The packaging system of claim 1, wherein the first $CO_2$ generator and the second $CO_2$ generator sealed within the master bag obtain a $CO_2$ generating capacity of at least 100 mL per pound of meat or poultry within 7 days after sealing said master bag.

10. The packaging system of claim 1, wherein the injected gas comprises carbon dioxide or nitrogen.

11. The packaging system of claim 1, wherein the injected gas comprises:
    100% $CO_2$;
    greater than 50% inert gas and balance $CO_2$; or
    greater than 50% $CO_2$ and balance inert gas.

12. The packaging system of claim 1, wherein the master bag comprises oxygen scavenger sachets placed outside the retail meat or poultry tray.

* * * * *